United States Patent
Shim et al.

(10) Patent No.: US 9,857,944 B2
(45) Date of Patent: Jan. 2, 2018

(54) USER TERMINAL AND DRIVING METHOD THEREOF, CONTROL DEVICE AND DRIVING METHOD THEREOF, AND CONTROL SYSTEM OF CONTROLLED DEVICE

(71) Applicant: SAMSUNG ELECTRONICS CO., LTD., Suwon-si (KR)

(72) Inventors: Jung-hyun Shim, Yongin-si (KR); Seung-uk Lee, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 290 days.

(21) Appl. No.: 14/312,212

(22) Filed: Jun. 23, 2014

(65) Prior Publication Data

US 2014/0380234 A1    Dec. 25, 2014

Related U.S. Application Data

(60) Provisional application No. 61/837,771, filed on Jun. 21, 2013.

(30) Foreign Application Priority Data

Mar. 12, 2014    (KR) .......................... 10-2014-0029141

(51) Int. Cl.
G06F 3/048        (2013.01)
G06F 3/0482       (2013.01)
(Continued)

(52) U.S. Cl.
CPC .......... *G06F 3/0482* (2013.01); *G06F 3/0488* (2013.01); *G06F 3/04842* (2013.01);
(Continued)

(58) Field of Classification Search
CPC ........ G06F 3/048–3/0488; G06F 3/147; G06F 3/0416; G06F 19/3406; H05B 37/0218; G09G 3/3406
See application file for complete search history.

(56) References Cited

U.S. PATENT DOCUMENTS

| | | | |
|---|---|---|---|
| 6,948,154 B1 * | 9/2005 | Rothermel | G06F 17/246 717/128 |
| 2009/0072945 A1 * | 3/2009 | Pan | H05B 37/0218 340/5.1 |

(Continued)

FOREIGN PATENT DOCUMENTS

| | | |
|---|---|---|
| JP | 2001053767 A | 2/2001 |
| KR | 1020120110826 A | 10/2012 |

(Continued)

OTHER PUBLICATIONS

Communication dated Oct. 2, 2014, issued by the International Searching Authority in counterpart International Application No. PCT/KR2014/005541.

*Primary Examiner* — Claudia Dragoescu
(74) *Attorney, Agent, or Firm* — Sughrue Mion, PLLC

(57) ABSTRACT

A user terminal and a driving method thereof, a control device and a driving method thereof, and a control system of a controlled device are provided. The user terminal includes: a communication interface configured to communicate with a plurality of controlled devices which are operated based on individually set setting values; a user interface configured to receive an adjustment value for collectively controlling the plurality of controlled devices as a group; and a controller configured to individually adjust each of the setting values based on a ratio which relates to the received adjustment value, and to control the plurality of controlled devices based on the adjusted setting values.

22 Claims, 143 Drawing Sheets

(51) Int. Cl.
    *G06F 3/0484*     (2013.01)
    *G06F 3/0488*     (2013.01)
    *H04L 29/08*     (2006.01)
    *H04W 4/08*     (2009.01)
    *H05B 37/02*     (2006.01)

(52) U.S. Cl.
    CPC ........ *G06F 3/04847* (2013.01); *H04L 67/125* (2013.01); *H04W 4/08* (2013.01); *H05B 37/0245* (2013.01)

(56) References Cited

U.S. PATENT DOCUMENTS

2012/0051560 A1\*   3/2012   Sanders ................... H03G 1/02
    381/105
2013/0087628 A1\*   4/2013   Nelson ................. F24F 11/0012
    236/51

FOREIGN PATENT DOCUMENTS

| WO | 2006111934 A1 | 10/2006 |
| WO | 2012030562 A1 | 3/2012 |

\* cited by examiner

90A

90C

FIG. 3
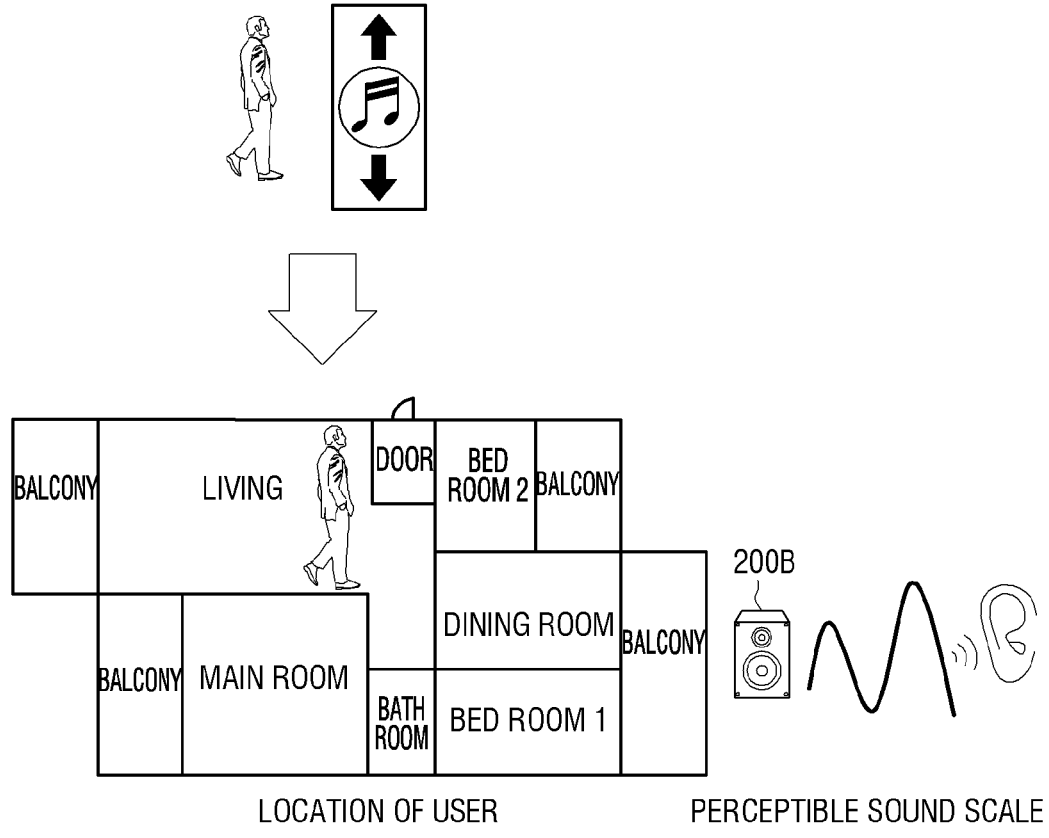
(a)
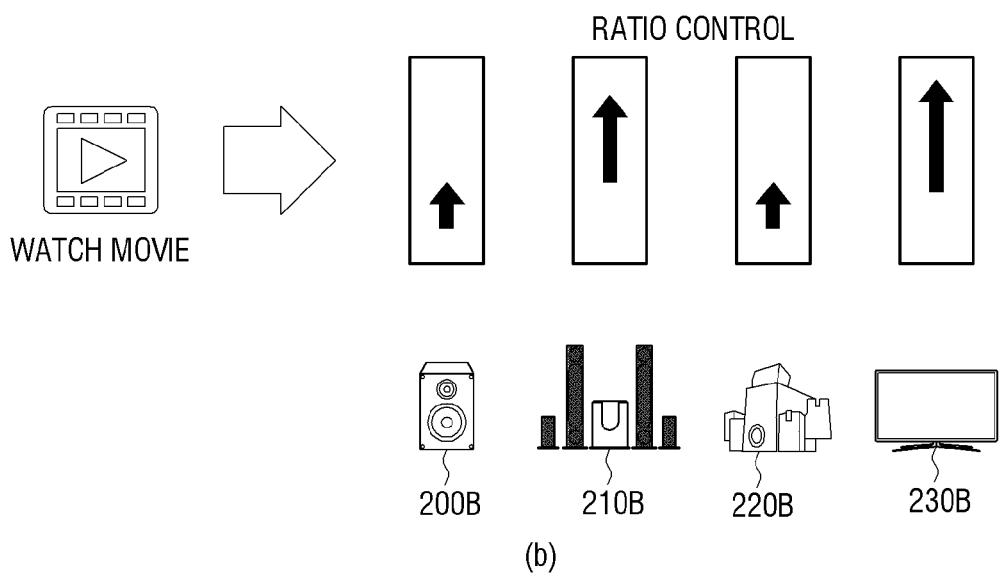
(b)

FIG. 4
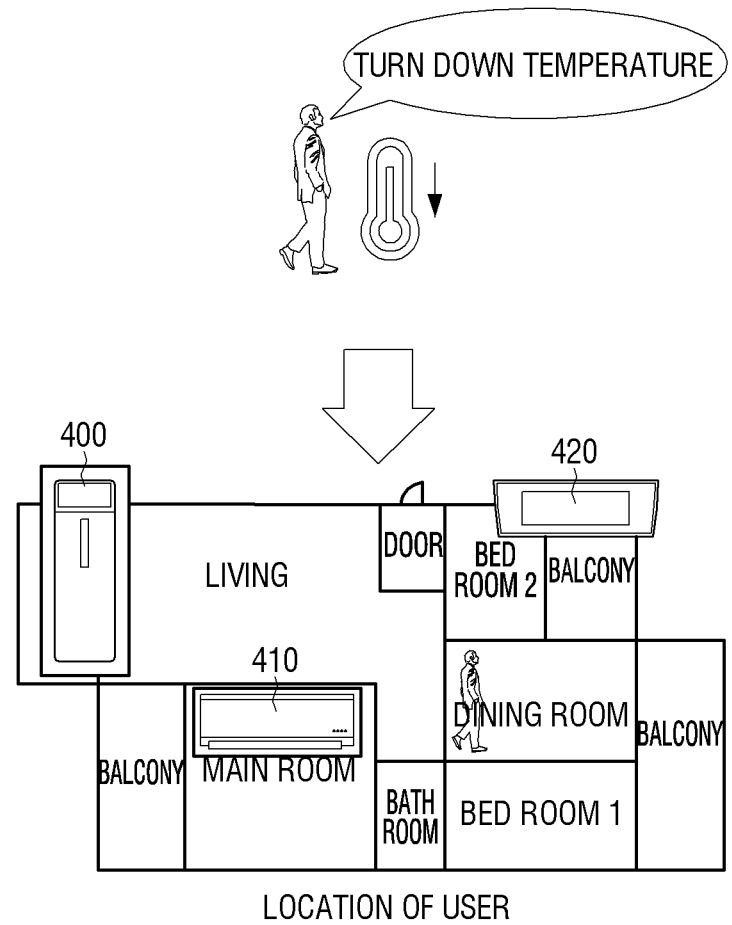
LOCATION OF USER
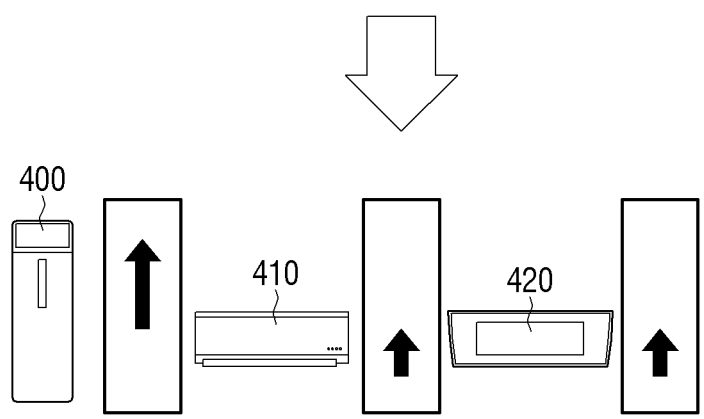

100

100

120

FIG. 13
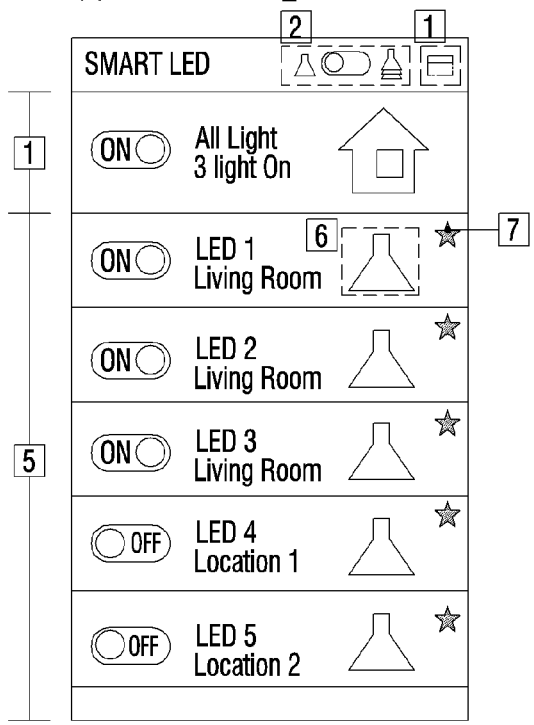
(A) INDIVIDUAL LED_QUICK VIEW
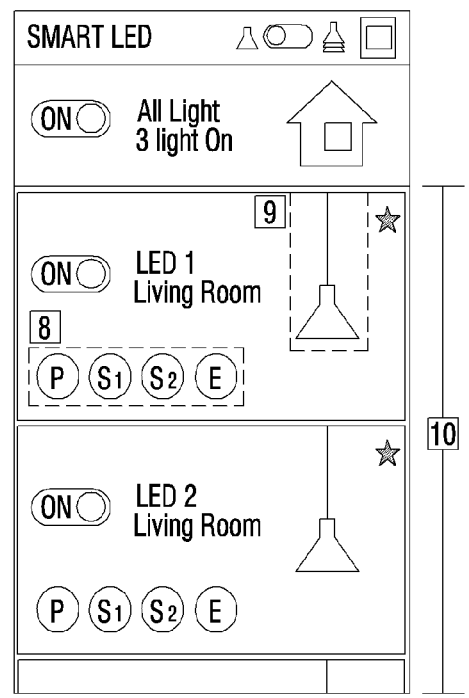
(B) INDIVIDUAL LED_DETAIL VIEW
(d) H/W Menu key
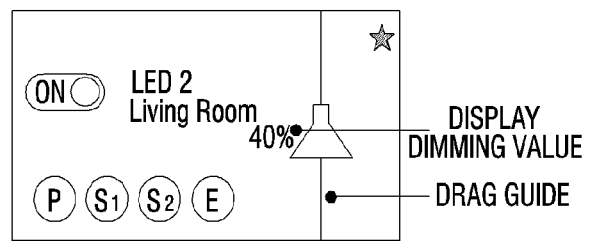
(C) DISPLAY WHILE ADJUSTING DIMMING BY DRAGGING

FIG. 14
(A) INDIVIDUAL LED_QUICK VIEW
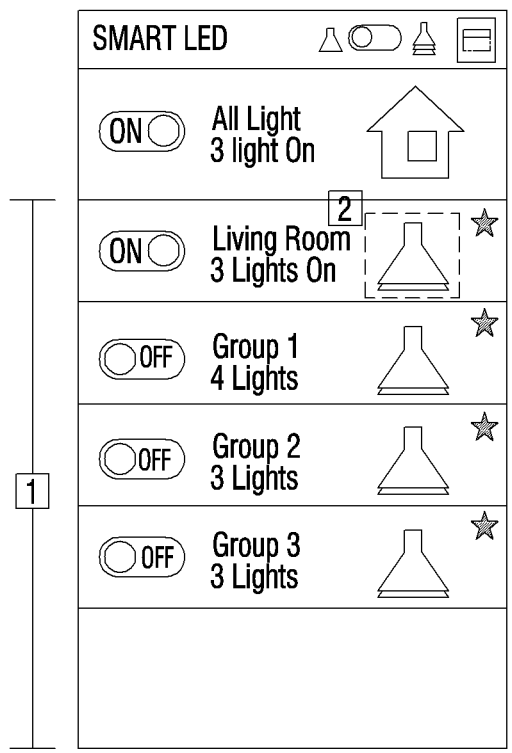
(B) INDIVIDUAL LED_DETAIL VIEW
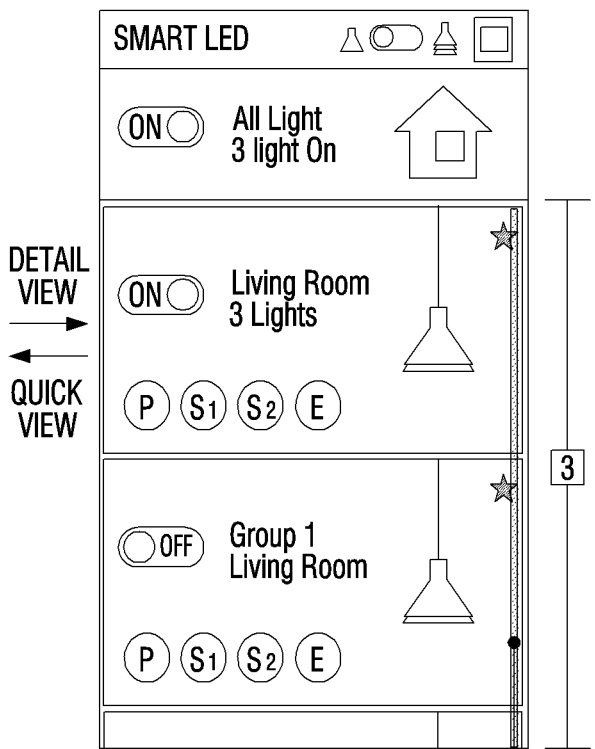
(c)
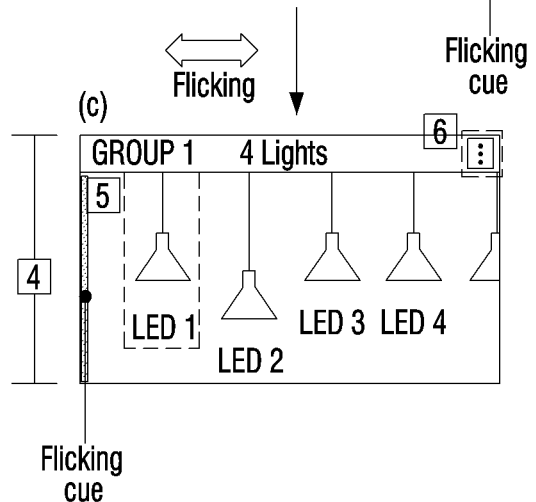

FIG. 17
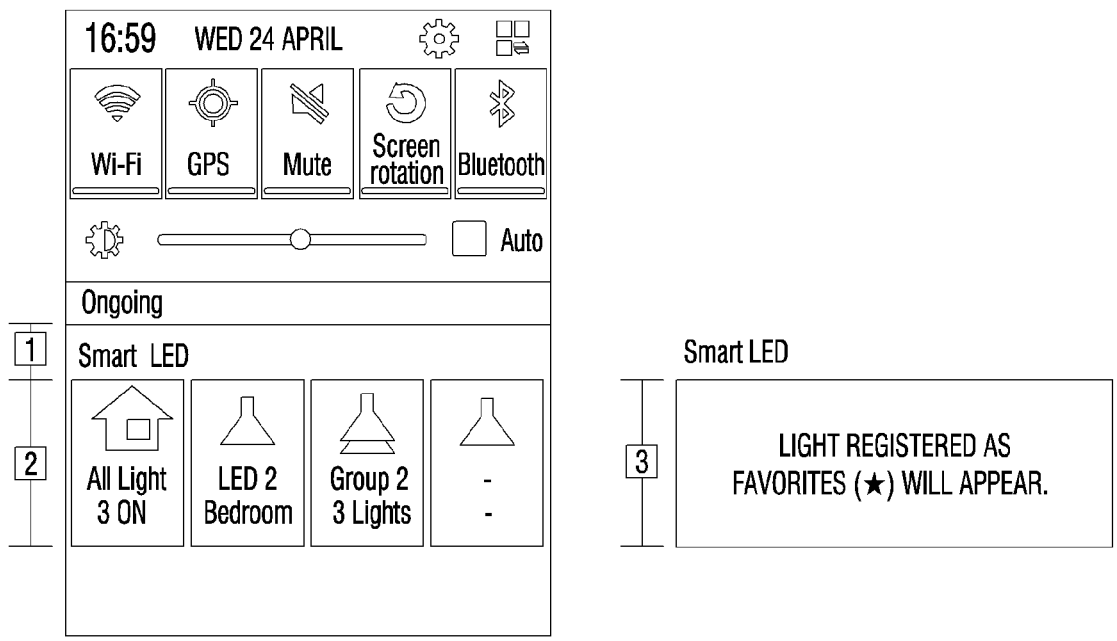

FIG. 27A

FIG. 27B
| | |
|---|---|
| ‹ 💡 Set LED | ✎ \| 🗑 |
| LED 1<br>LIVING ROOM |  |
| LED 2<br>BED ROOM |  |
| LED 3<br>BATH ROOM |  |
| LED 4<br>SAM'S ROOM |  |
| LED 5<br>KITCHEN |  |
| LED 6<br>LOCATION 4 |  |
| LED 7 |  |

| ≪ 💡Set LED | Delete all |
|---|---|
| ⊖ LED 1<br>LIVING ROOM | 🔦 |
| ⊖ LED 2<br>BED ROOM | 🔦 |
| ⊖ LED 3<br>BATH ROOM | 🔦 |
| ⊖ LED 4<br>SAM'S ROOM | 🔦 |
| ⊖ LED 5<br>KITCHEN | 🔦 |
| ⊖ LED 6<br>LOCATION 4 | 🔦 |
| ⊖ LED 7 | 🔦 |

FIG. 33

Optional title  1
                2
Cancel  OK     3

(a)

List + Checkboxes

| Optional title | |
|---|---|
| Menu item 1 | ☐ |
| Menu item 1 | ☑ |
| Cancel | OK |

(b)

List + Radio buttons

| Optional title | |
|---|---|
| Menu item 1 | ○ |
| Menu item 1 | ◉ |
| Cancel | OK |

(c)

Text fields

| Optional title | |
|---|---|
| Menu item 1 | ☐ |
| Cancel | OK |

(d)

Seek Bars

○ Brightness
☐ Automatic brightness
Cancel  OK (e)

Volumes
Ringtone & notifications
Alarms
OK (f)

Picker

Set time
7  29
7 : 30  AM
9  41  PM
Cancel  OK (g)

FIG. 34
Alerts without title bars
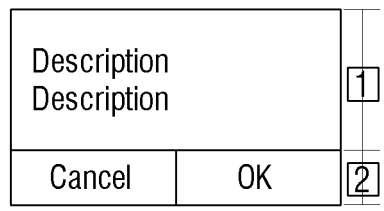
(a)
Alerts with title bars
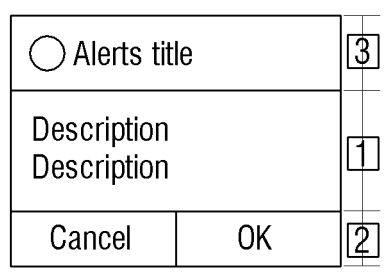
(b)

FIG. 35

Icon + List

| Popup title | 1 |
|---|---|
| ◯ Menu item 1 | |
| ◯ Menu item 2 | |
| ◯ Menu item 3 | 2 |
| ◯ Menu item 4 | |
| ◯ Menu item 5 | |
| ◯ Menu item 6 | |

(a)

List + Radio buttons

| Font size | | 1 |
|---|---|---|
| Small | ◯ | |
| Normal | ⬤ | 2 |
| Large | ◯ | |
| Huge | ◯ | |

(b)

FIG. 36
Toast  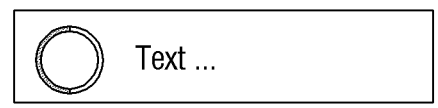
(a)                          (b)
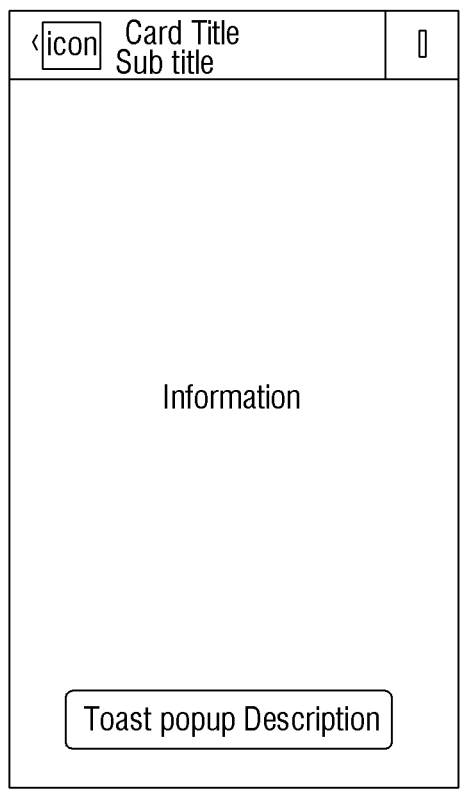 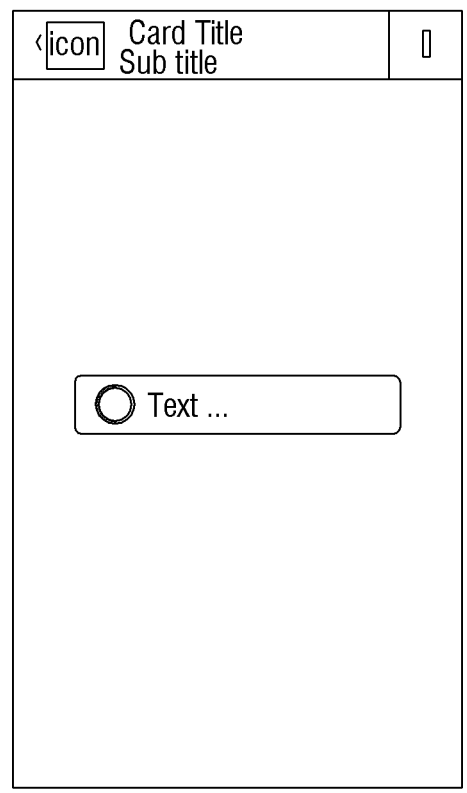
(c)                          (d)

FIG. 38
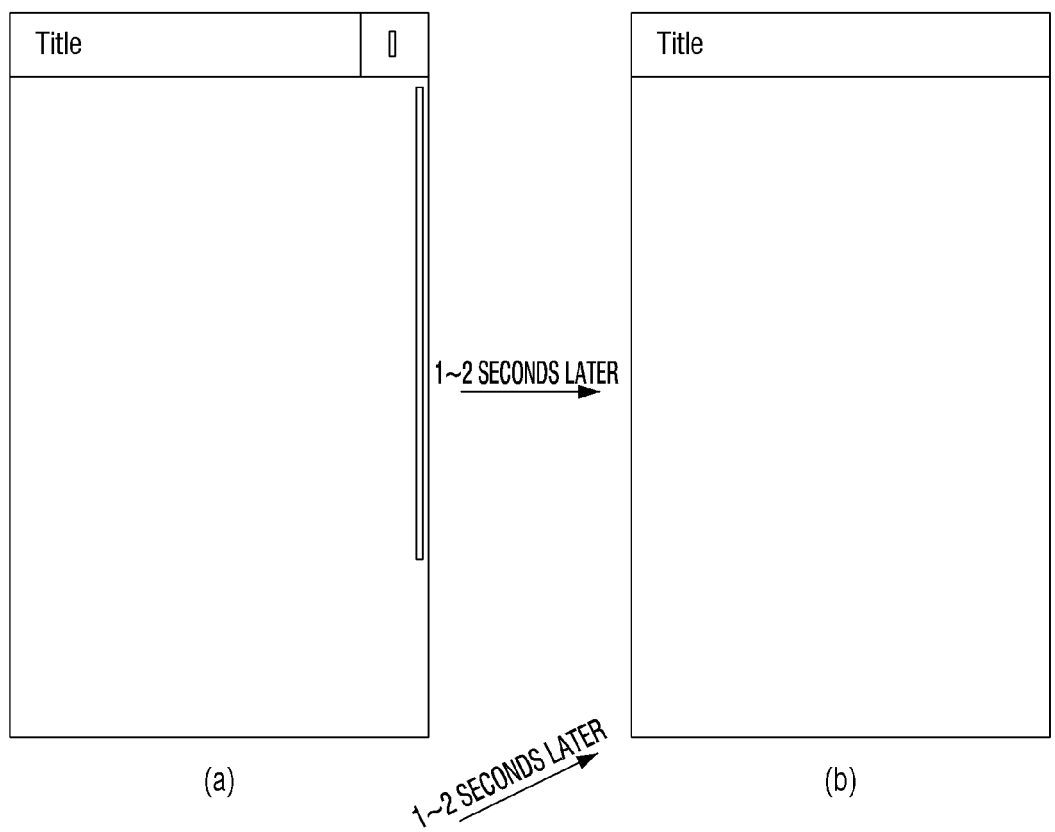
(a)     1~2 SECONDS LATER     (b)
1~2 SECONDS LATER
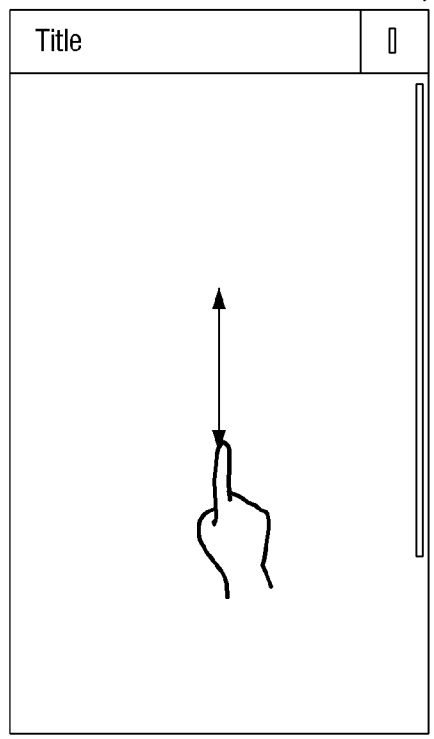
(c)

FIG. 90
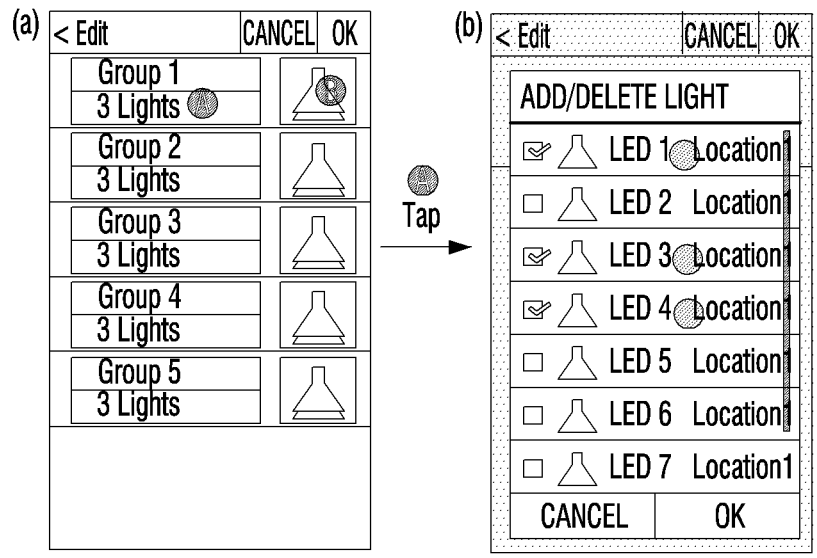
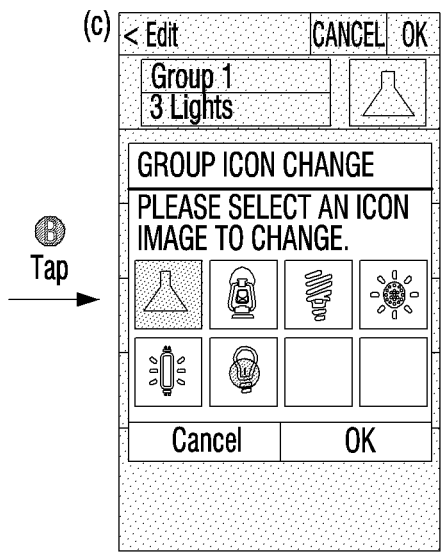

FIG. 91A

[Table 1]

| No. | Name | Explanation |
|---|---|---|
| 1 | Quick/Detail View Button | Quick view/detail view change button |
| 2 | Individual/Group View Change Tab | Individual view/group view change tab |
| 3 | Settings | Move to a setting page. |
| 4 | All Control list | Area for collectively controlling installed LEDs(On/Off)<br>-display switch-on when even one light is turned on.<br>-provide favorites as default and favorites cannot deleted.<br>-display a title: All Light (uncorrectable)d<br>Display a subtitle: n Lights On (number of turned-on lights)<br> use a BG distinguished from the other area.<br>※Subtitle area when the light is turned on: All Lights Off<br> : when a light is turned on<br> When light is turned off |
| 5 | Individual List Area (Quick View) | Area for controlling individual LEDs (On/Off)<br>- display a title: LED n (correctable in settings)<br>-display a subtitle: place name (Default: Location 1/Correctable in settings) |
| 6 | Light Icon | Icon in a lamp shape (On/Off)<br> display brightness variably according to light brightness<br>-Long Tap: change a light icon |

FIG. 91B

[Table 1] (Continued)

| 7 | Favorites | Favorites toggle button<br>-Favorites registered at the quick panel when being added (up to favorites can be registered) |
|---|---|---|
| 8 | Detailed Setting Status Icon | Indicate each details setting value<br>-each details setting value is displayed in the form of an icon to serve as an indicator<br> |
| 9 | Dimming Adjustment Lamp | Adjust dimming by moving up/down a lamp-shaped button (provided only in the detail view).<br>The lamp icon should be clearly distinguished from a light icon which is not adjustable (a trigger which is capable of interacting is required).<br>-Drag Up/Down: change light dimming (Dimming is reduced by moving down a light)<br>-Long Tap: change a light icon |
| 10 | Individual List Area (Detail View) | Area for controlling individual LEDs (On/Off, diming change)<br>Title, subtitle (same as the quick view)<br>Represent the individual LEDs in the form of a card in the detail view<br>-Detailed Setting Activation Button (please see item 8 above) |
| | Hidden Interaction | Pinch in: change to the quick view<br>Pinch out: change to the detail view |

FIG. 92A

[Table 2]

| No. | Name | Explanation |
|---|---|---|
| 1 | Group List Area (Quick View) | Area for controlling group LEDs (On/Off)<br>- display a title: Group n (a place name is default when there is a place name)<br>-display a subtitle: n Lights (the number of lights in the group) |
| 2 | Group Light Icon | Icon in the shape of a lamp (not adjustable)<br>-Long tap: changing a light icon<br>[GUI] provide an icon distinguished from an individual LED |
| 3 | Group List Area (Extended View) | Area for controlling an individual LED (On/Off, dimming change)<br>-Title, Subtitle (in the same way as the quick view) |
| 4 | Group Light Individual View | Area for controlling individual lights belonging to the group (On/Off, addition/deletion of a dimming adjustment light, change of a light order)<br>-activated when flicking is performed on the group list (extension view)<br>-when lights up to 4 is exposed and 5 or more lights are exposed, expose the fifth light on the right side by half.<br>-The group diming collective control indicates average dimming of lights in the group, and individual lights of different dimming are operated according to a relative ratio<br>※Only one view can be activated in one screen: When a group light individual view of a different group is activated, the group light individual view previously activated is changed to the group list (extended). |

FIG. 92B

[Table 2] (Continued)

| 5 | Individual Light | -Drag Up/Down: change light dimming (dimming is reduced by moving down the light)<br>-Long tap: change to a light edit mode (the light can be deleted and the light order can be edited) |
|---|---|---|
| 6 | More Menu | Light Addition/deletion more menu<br>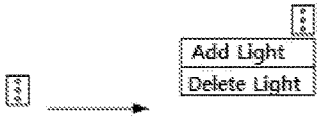<br>Select More Menu |
| Hidden Interaction | | Pinch in: change to the quick view<br>Pinch out: change to the detail view |

FIG. 93A

[Table 3]

| No. | Name | Explanation |
|---|---|---|
| 1 | Indicator | provide main information for each group |
| 2 | Group Light Individual View | Area for controlling individual lights belonging to the group<br>-Lights up to 6 can be exposed on one screen on a group basis<br> (determined through GUI)<br>-When there is the maximum number or more lights in the same group, the lights are displayed as follows:<br>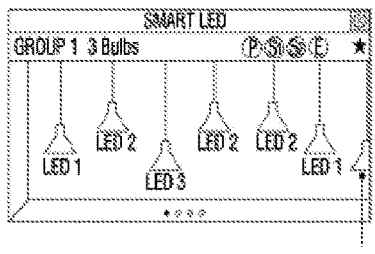<br>The right side wall image of the background disappears and only half of the light is exposed. |
| 3 | Title (group) | Group title name (default: the group title name can be modified in setting Group n by the user)<br>-When place information common to the LEDs of the group, the place name is exposed as default.<br>-Subtitle area: n Lights (the number of lights in the group) |
| 4 | Detailed Setting Status Icon | Indicate each details setting value<br>-each details setting value is displayed in the form of an icon to serve as an indicator<br> |

FIG. 93B

[Table 3] (Continued)

| 5 | Dimming Adjustment Lamp | Adjust dimming by moving up/down a lamp-shaped<br>-Drag Up/Down: (※drag is used to be distinguished from flicking)<br>-Long Tap: change a light icon |
|---|---|---|
| 6 | More Menu | Light Addition/deletion more menu<br>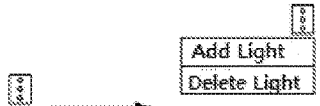<br>Select More Menu |
| 7 | Favorites | Favorites toggle button<br>-Favorites registered at the quick panel when being added (favorites up to 4 can be registered) |

FIG. 94A

[Table 4]

| No. | Name | Explanation |
|---|---|---|
| 1 | Title | Title of a selected LED (or group) |
| 2 | Pattern | Pattern Preset and Customizing Pattern Function<br>-Preset Selection: Reflect result of preset<br>-Multi Selection is impossible (1 item must be selected)<br>-"+" button selection: Provide pattern drawing pop-up window.<br>-Use of Left/Right Flickering to identify 5 or more Presets<br>※Pattern generated by the user can be selected by Long Press |
| 3 | MOOD | Customized Preset Toggle Button for Dimming Setting<br>-Multi Selection is impossible<br>-All Preset is released when the user adjusts dimming<br>-Types of Preset<br>Sleep Movie Cook Reading |
| 4 | Schedule | Light On/Off Scheduling Function<br>-Scheduling Time Area Selection: Schedule Setting Pop-up (correction mode)<br>-New Schedule Selection: Schedule Setting Pop-up (new window mode)<br>※ Each list can be deleted by Long Press |
| 5 | Event NOTI | -Notification Setting Function Through Light<br>-Person's name (or phone number) Selection: Number Input/Contact Information Selection Pop-up<br>-Pattern Selection: Pattern Selection Pop-up<br>-New Event Selection: Event Generation Pop-up<br>※ Each list can be deleted by Long Press |

FIG. 94B

[Table 4] (Continued)

| 6 | LED Image | LED Image Preset Button(the number of buttons is defined in GUI)<br>-First image is selected as default<br>-Multi selection is not possible (1 item must be selected)<br> Represent an image suitable for a pendant type light |
|---|---|---|
| 7 | BG Image | BG Image Preset Button<br>-First image is selected as default<br>-Multi Selection is not possible (1 item must be selected) |
| 8 | Baby Care | -On/Off Setting |
| 9 | Night Care | -On/Off Setting |

FIG. 95

[Table 5]

| No. | Name | Explanation |
|---|---|---|
| 1 | Title Area | Quick Panel Smart LED Title |
| 2 | Control Area (Portrait View) | Area for controlling individual LEDs (On/Off)<br>-Lights added as favorites are registered at the quick panel (lights up to 4 can be registered)<br>-All lights cannot be changed<br>-Individual LED: display LED name and place<br>-Group: display group name and number of LEDs |
| 3 | Control Area (Guide Message) | A guide message provided when there is no light registered as favorites |
| 4 | Control Area (Landscape View) | Identical to the control area portrait view |

FIG. 96

[Table 6]

<Touch Gesture>

| Notation | Explanation |
|---|---|
| ● | Tap<br>Touch lightly with finger and then raise finger |
| ◎ | Double Tap<br>Tap twice in a row |
| ● | Long Tap<br>Touch with finger more than a predetermined time and then raise finger. |
| ●→ | Drag<br>Touch and then move finger while still touching. |
| ●→ | Swipe<br>Touch and then move finger rapidly in a predetermined direction at a predetermined speed. |
| ●→ ←● | Pinch in<br>Touch with two fingers and then move fingers closer together. |
| ←● ●→ | Pinch out<br>Touch with two fingers and then move fingers further apart. |

FIG. 97
[Table 7]
<Touch Feedback Status>
| Notation | Explanation |
|---|---|
|  | Normal<br>Item basic status |
| 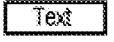 | Focused<br>Item is selected. |
|  | Selected<br>Item is selected. |
| 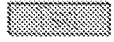 | Disabled<br>Inactivation status |
|  | Disabled and focused<br>Inactivated item is selected. |

FIG. 98

[Table 8]

<Screen Definition & Work Flow>

| Notation | Explanation |
|---|---|
| ⟶ | Normally proceed by a user manipulation. |
| ⟶ | Automatically proceed regardless of a user manipulation. |
| ⟶ | Abnormally proceed due to error/exceptive status processing. |
| ■ | Display a work flow order. |
| ▢ | Display an item written in a screen layout. |
| YYYY-MM-DD (v0.1) Corrected Item ⟹ | -Notify an update page<br>-Display on a right upper end of a document.<br>Notation of screen change when a screen manipulation is performed<br><br>UP ⟶ Down ⬇   Left ⟶ Right ⟹<br>Down ⟶ UP ⬆   Right ⟶ Left ⟸ |
| ⊲1 | Write comments on a specific area of a document or a question and an item to be corrected. |
| ⬛ Text | Indicate a start and an end of a flowchart. |
| Text | Indicate input/selection values of a flowchart. |
| ◇ Text ◇ | Write a conditional sentence of a flowchart |
| 0.0.0 Screen ID | Display a screen of a flowchart. |

USER TERMINAL AND DRIVING METHOD THEREOF, CONTROL DEVICE AND DRIVING METHOD THEREOF, AND CONTROL SYSTEM OF CONTROLLED DEVICE

CROSS-REFERENCE TO RELATED APPLICATION(S)

This application claims the benefit of U.S. Provisional Patent Application No. 61/837,771, filed on Jun. 21, 2013, in the United States Patent and Trademark Office, and priority from Korean Patent Application No. 10-2014-0029141, filed on Mar. 12, 2014 in the Korean Intellectual Property Office, the disclosures of which are hereby incorporated by reference in their entireties.

TECHNICAL FIELD

Apparatuses and methods consistent with exemplary embodiments relate to a user terminal and a driving method thereof, a control device and a driving method thereof, and a control system of a controlled device, which can sensately control a lighting device, a sound device, a temperature control device, and a blind device via a Graphic User Interface (GUI) displayed on a screen of the user terminal such as a smartphone.

BACKGROUND

An incandescent lamp or fluorescent lamp consumes much power for its illumination efficiency, and has a relatively short operational life. In particular, the fluorescent lamp may cause a serious environmental pollution problem due to mercury discharged when the fluorescent lamp is discarded. Therefore, an eco-friendly light emitting diode (LED) which consumes less power and has a semi-permanent life has received widespread interest. In particular, the LED has merits in that its dimming and color can be easily adjusted.

It is common that a light is only turned on or off via a remote controller or an on/off switch. However, in recent years, the light has become so developed that a status of each light can be checked, a plurality of lights can be controlled, and a light can be remotely controlled simply by using a smartphone.

However, a related-art light control method is limited to turning on or off a light and adjusting color and dimming by executing an application which is stored in a smartphone. Therefore, there is a problem that recent consumer demand for controlling the lights more sensately is not satisfied.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a user terminal and a driving method thereof, a control device and a driving method thereof, and a control system of a controlled device, which can easily control a plurality of controlled devices.

According to an aspect of an exemplary embodiment, there is provided a user terminal including: a communication interface configured to communicate with each of a plurality of controlled devices which are operated based on individually set setting values; a user interface configured to receive an adjustment value for collectively controlling the plurality of controlled devices as a group; and a controller configured to individually adjust each of the setting values of the plurality of controlled devices based on a ratio which relates to the adjustment value, and to control the plurality of controlled devices based on the adjusted setting values.

The controller may be further configured to calculate an average value based on the setting values, to calculate at least one from among a ratio of the received adjustment value to the calculated average value and a ratio of the received adjustment value to a value which is obtainable by subtracting the calculated average value from a maximum setting value, and to individually adjust each of the setting values based on the calculated at least one ratio.

The user interface may be further configured to display a user interface (UI) window which displays the plurality of controlled devices as a group and displays a collective control object which is usable for collectively controlling operations of the controlled devices, and, in response to the displayed collective control object being adjusted by a user manipulation, the controller may be further configured to determine the adjustment value based on an adjustment status of the collective control object.

The UI window may additionally display an individual control object which is usable for individually controlling one device from among the plurality of controlled devices, and, in response to a lock being set for the displayed individual control object, the controller may be further configured to not adjust the setting value of the one device which corresponds to the individual control object for which the lock is set.

In response to the collective control object being adjusted to a minimum, the controller may be further configured to adjust each of the setting values to a respective minimum, and in response to the collective control object being adjusted to a maximum, the controller may be further configured to adjust each of the setting values to a respective maximum, and, in response to a user reset request, the controller may be further configured to reset each of the setting values which have been adjusted to at least one from among the respective minimum and the respective maximum to the corresponding setting values which had been set prior to being adjusted.

In response to each of the setting values having a same value, the controller may be further configured to adjust each of the setting values based on an absolute value of the adjustment value.

The controller may be further configured to additionally adjust each of the setting values based on a result of sensing a respective environmental quality of each individual one of the plurality of controlled devices.

Each one of the plurality of controlled devices may include at least one from among a lighting device, a sound device, a blind device, and a temperature control device, and each of the setting values may include at least one from among a target dimming value, a target volume, a blind adjustment status, and a target temperature.

According to an aspect of another exemplary embodiment, there is provided a control device including: a communication interface configured to communicate with each of a plurality of controlled devices which are operated based on respective individually set setting values, and with a user terminal; and a controller configured to, in response to an adjustment value for collectively controlling the plurality of controlled devices as a group being received from the user terminal, individually adjust each of the setting values based on a ratio which relates to the received adjustment value, and to control the plurality of controlled devices based on the adjusted setting values.

The controller may be further configured to calculate an average value based on the setting values, to calculate at least one from among a ratio of the received adjustment value to the calculated average value and a ratio of the received adjustment value to a value which is obtainable by subtracting the calculated average value from a maximum setting value, and to individually adjust each of the setting values based on the calculated at least one ratio.

The user terminal may be configured to display a UI window which displays the plurality of controlled devices as a group and displays a collective control object which is usable for collectively controlling operations of the controlled devices, and, in response to the displayed collective control object being adjusted by a user manipulation, the controller may be further configured to determine the adjustment value based on an adjustment status of the collective control object.

The UI window may additionally display an individual control object which is usable for individually controlling one device from among the plurality of controlled devices, and, in response to a lock being set for the displayed individual control object, the controller may be further configured to not adjust the setting value of the one device which corresponds to the individual control object for which the lock is set.

In response to the collective control object being adjusted to a minimum by the user manipulation, the controller may be further configured to adjust each of the setting values to a respective minimum, and in response to the collective control object being adjusted to a maximum by the user manipulation, the controller may be further configured to adjust each of the setting values to a respective maximum, and, in response to a user reset request, the controller may be further configured to reset each of the setting values which have been adjusted to at least one from among the respective minimum and the respective maximum to the corresponding setting values which had been set prior to being adjusted.

In response to each of the setting values having a same value, the controller may be further configured to adjust each of the setting values based on an absolute value of the adjustment value.

The controller may be further configured to additionally adjust each of the setting values based on a result of sensing a respective environmental quality of each individual one of the plurality of controlled devices.

Each one of the plurality of controlled devices may include at least one from among a lighting device, a sound device, a blind device, and a temperature control device, and each of the setting values may include at least one from among a target dimming value, a target volume, a blind adjustment status, and a target temperature.

According to an aspect of another exemplary embodiment, there is provided a driving method which is executable by a user terminal for collectively controlling a plurality of controlled devices which are set as a group, the method including: displaying an individual control object via which respective setting values for each of the plurality of controlled devices are individually set; displaying a collective control object which indicates an average value of the respective setting values of the plurality of controlled devices; and, in response to the displayed collective control object being adjusted based on an adjustment value which is received by the user terminal, adjusting the displayed individual control object based on an adjustment ratio which relates to the collective control object.

The adjustment ratio may include at least one from among a ratio of the adjustment value to an average value which is calculated based on the respective setting values and a ratio of the adjustment value to a value which is obtainable by subtracting the calculated average value from a maximum setting value.

The adjusting the individual control object may include, in response to each of the respective setting values of the plurality of controlled devices having a same value, adjusting the individual control object based on an absolute value of the adjustment value.

The adjusting the individual control object may include additionally adjusting the individual control object based on a result of sensing a respective environmental quality of each individual one of the plurality of controlled devices.

The method may further include setting a lock for the individual control object, and the adjusting the individual control object may include refraining from adjusting the individual control object for which the lock is set.

According to an aspect of another exemplary embodiment, there is provided a driving method which is executable by a control device for controlling a plurality of controlled devices, the method including: receiving, from a user terminal, an adjustment value for collectively controlling the plurality of controlled devices as a group; individually adjusting each of a plurality of setting values which are individually set for a respective one of the plurality of controlled devices based on a ratio which relates to the received adjustment value; and controlling the plurality of controlled devices based on the adjusted setting values.

The individually adjusting may include calculating an average value based on the plurality of setting values, calculating at least one from among a ratio of the received adjustment value to the calculated average value and a ratio of the received adjustment value to a value which is obtainable by subtracting the calculated average value from a maximum setting value, and individually adjusting each of the plurality of setting values based on the calculated at least one ratio.

The method may further include, in response to the adjustment value being received from the user terminal, determining whether each of the plurality of setting values has a same value, and the controlling the plurality of controlled devices may include, in response to a determination that each of the plurality of setting values has a same value, adjusting each of the plurality of setting values based on an absolute value of the received adjustment value.

According to an aspect of another exemplary embodiment, there is provided a control system of a first controlled device including: a plurality of controlled devices configured to operate based on individually set setting values; and a controller configured to, in response to an adjustment value for collectively controlling the plurality of collected devices as a group being received from a user terminal, individually adjust each of the setting values based on a ratio which relates to the received adjustment value, and to control the plurality of controlled devices based on the adjusted setting values.

According to the exemplary embodiments, the lighting device, sound device, temperature control device, and blind device can be sensately controlled via the GUI displayed on the screen of the user terminal such as a smartphone.

BRIEF DESCRIPTION OF THE DRAWINGS

The above and/or other aspects will be more apparent by describing in detail exemplary embodiments, with reference to the accompanying drawings, in which:

FIGS. 2A, 2B, 2C, 2D, 3, and 4 are views which illustrate various examples to which the control system of FIG. 1 applies;

FIG. 13 is a view which illustrates a driving screen of a light control implemented in the user terminal of FIG. 1;

FIG. 14 is a view which illustrates a portrait view of a group list;

FIG. 17 is a view which illustrates a quick panel screen;

FIGS. 18 to 29L are views schematizing a driving screen of a light control;

FIGS. 31 to 41 are views which schematically illustrate regulations of a UI, according to an exemplary embodiment FIGS. 42 to 90 are views which illustrate a UI driving screen, according to an exemplary embodiment;

FIGS. 91A and 91B show a table that summarizes the detailed functions related to FIG. 13;

FIGS. 92A and 92B show a table that summarizes the detailed functions related to FIG. 14;

FIGS. 93A and 93B show a table that summarizes the detailed functions related to FIG. 15;

FIGS. 94A and 94B show a table that summarizes the detailed functions related to FIG. 16;

FIG. 95 shows a table that summarizes the detailed functions related to FIG. 17; and FIGS. 96 to 98 show tables that summarize notation regulations of the UI.

DETAILED DESCRIPTION

Figure 1:
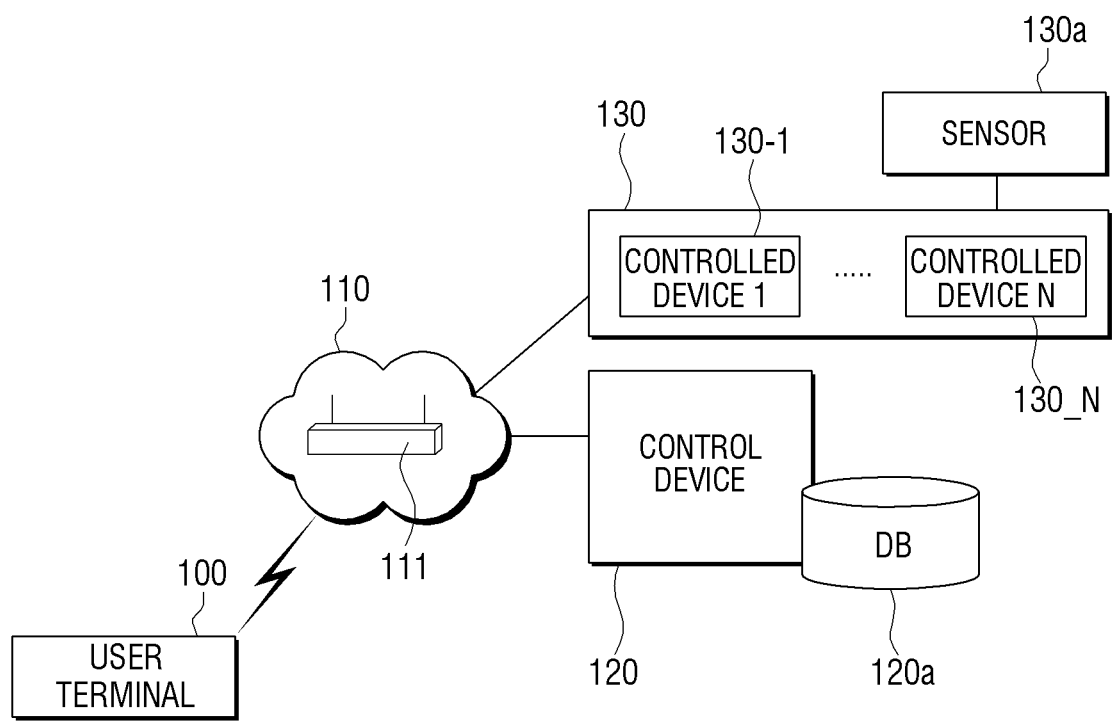
FIG. 1 is a view which illustrates a control system, according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. In addition, functions or elements known in the related art are not described in detail, since they would obscure the exemplary embodiments with unnecessary detail.

Figure 5:
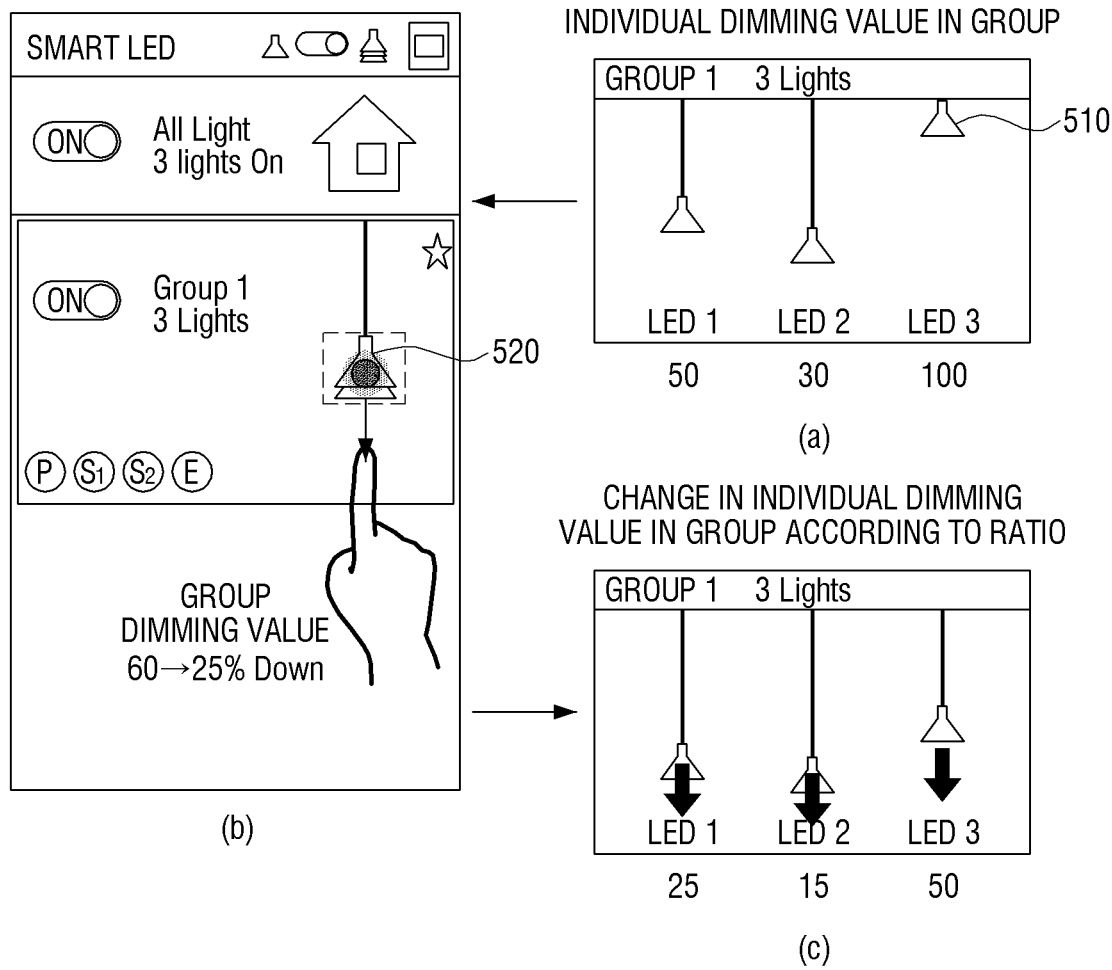
FIGS. 5 and 6 are views which illustrate an operation of controlling a light by using a user terminal of FIG. 1.
Figure 6:
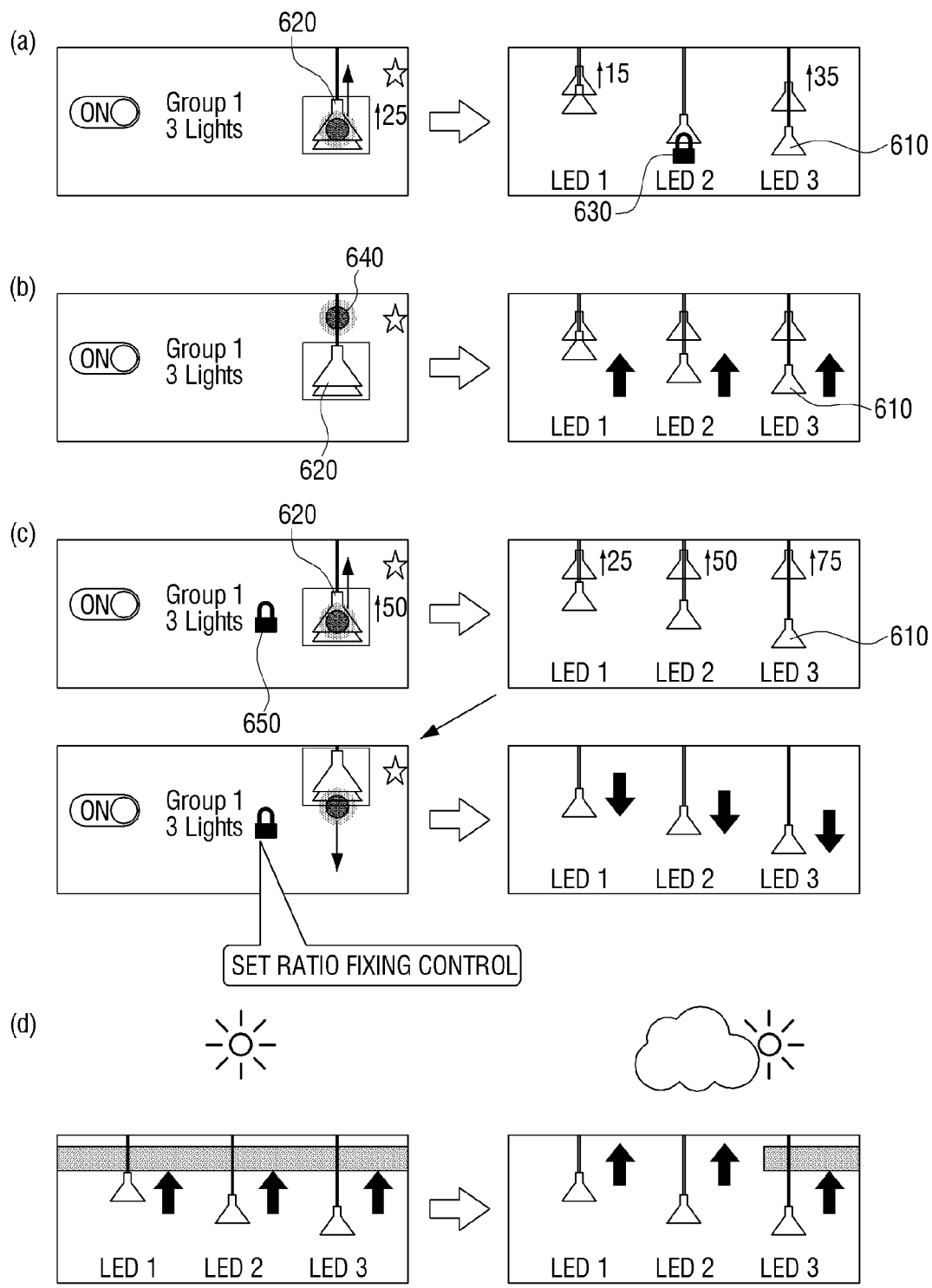

FIG. 1 is a view which illustrates a control system of a controlled device (hereinafter, referred to as a control system) according to an exemplary embodiment, FIGS. 2A, 2B, 2C, 2D, 3, and 4 are views which illustrate various examples to which the control system of FIG. 1 applies, and FIGS. 5 and 6 are views which illustrate an operation of controlling a light by using a user terminal of FIG. 1.

As shown in FIG. 1, the control system 90 according to an exemplary embodiment includes a part or all of a user terminal 100, a communication network 110, a control device 120, and a plurality of controlled devices 130.

The term "including a part or all" herein means that some elements, such as a sensor 130a, may be omitted, and/or that some elements, such as the control device 120, are not limited to hardware and software forms, and may be integrated into another element, such as the user terminal 100 or a controlled device 130. For example, when the user terminal 100 can perform the function of the control device 120, the user terminal 100 may directly control the plurality of controlled devices 130. However, for better understanding of exemplary embodiments, the control system 90 of FIG. 1 illustrates all of the elements.

The controlled device 130 refers to any type of device which can be controlled by the control device 120. The controlled device 130 may include any one or more of various kinds of devices which relate to an environment where the control system 90 is installed or a characteristic of the control system 90. For example, when the control system 90 is installed in an environment such as a house or office, the controlled device 130 may include any one or more of various types of devices which are usable in that environment, such as various lighting devices, an air conditioning and heating system, home appliances, and/or a blind.

Figure 2A:
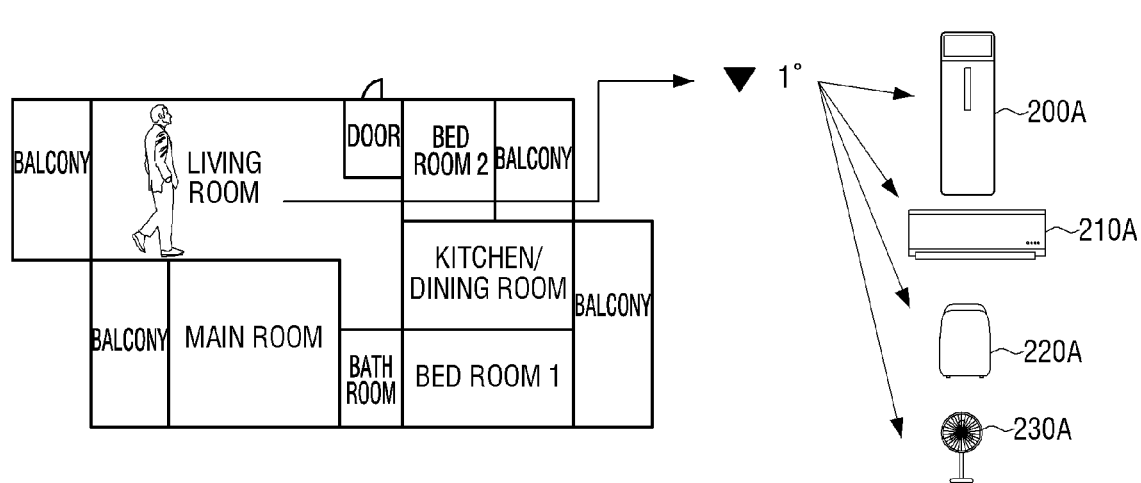
Figure 2B:
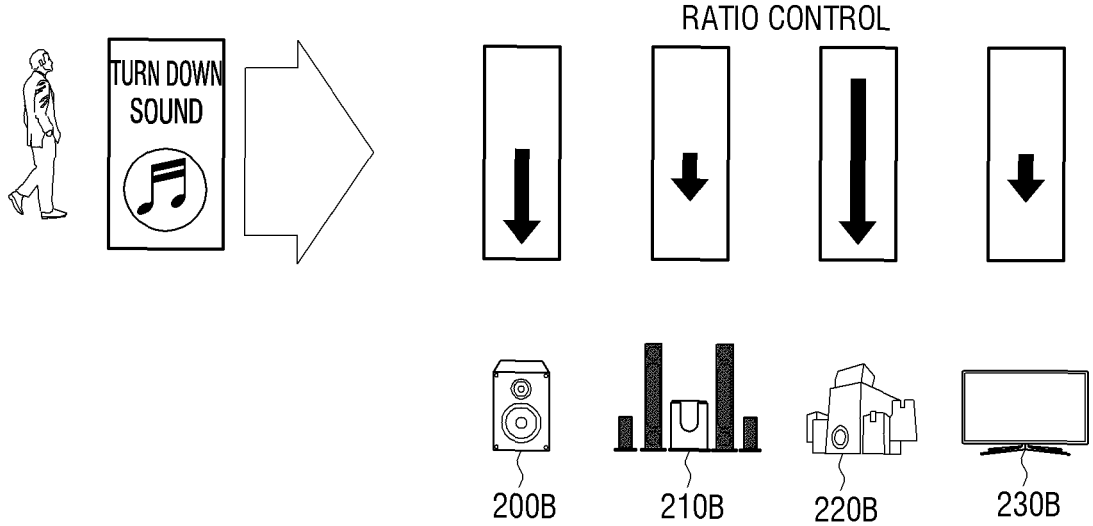
Figure 2C:
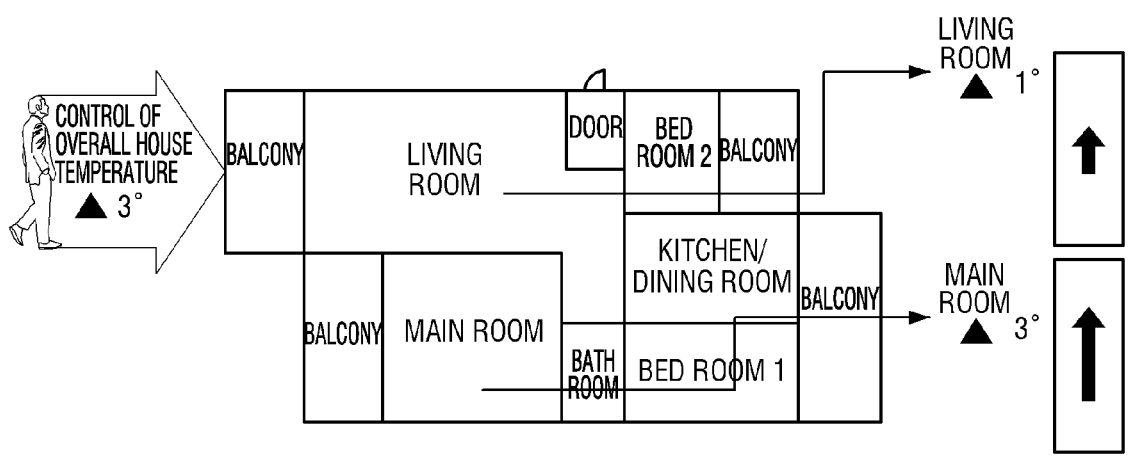
Figure 2D:
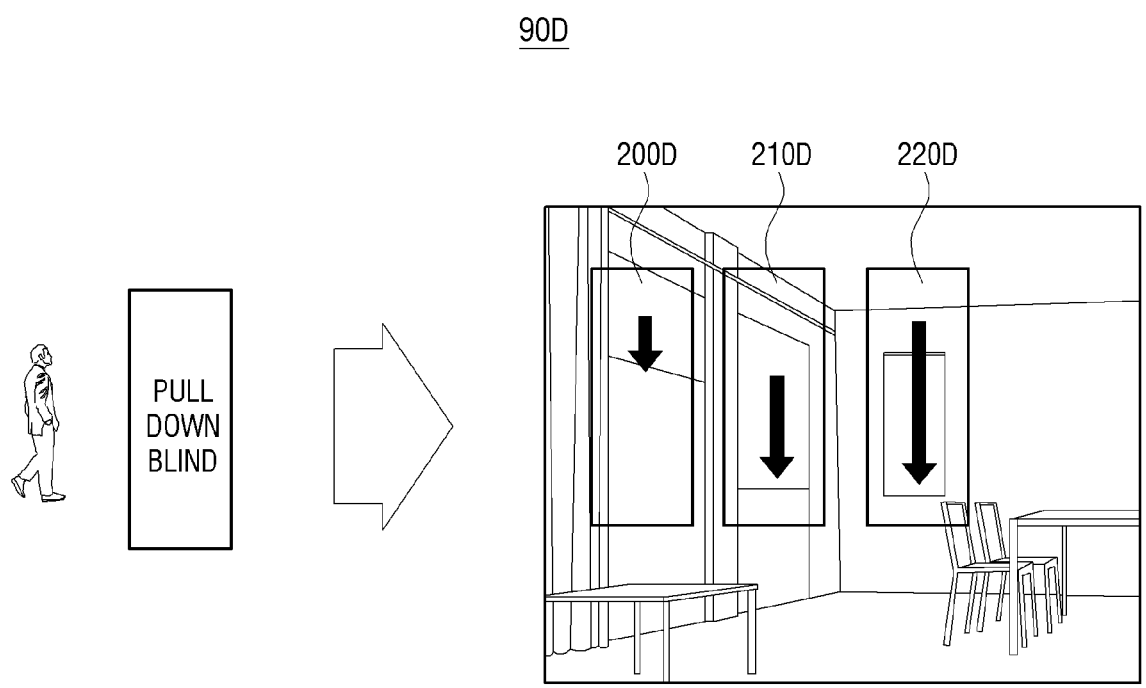

The control system 90 according to an exemplary embodiment includes not only a lighting system, but also a system 90A which controls various electronic devices simultaneously by automatically calculating a ratio (or a magnification factor) as shown in FIG. 2A, a sound control system 90B as shown in FIG. 2B, a system 90C which controls an overall temperature in a house as shown in FIG. 2C, and a blind control system 90D as shown in FIG. 2D.

These systems collectively (or en bloc) control the controlled devices, such as electronic devices or sound devices, which are grouped, based on a ratio which relates to an adjustment value adjusted by a user. In particular, in response to the controlled devices being collectively controlled in one group in a state in which the user individually sets respective setting values for each of the controlled devices, the setting values are adjusted based on a ratio which is determined based on an adjusted value. For example, in response to the user turning down the volume for a corresponding group in a state in which a target volume is set for each sound device, the target volumes of the sound devices are adjusted based on a ratio which relates to the turned-down volume. In addition, when a target temperature is set for each space in a house as shown in FIG. 2C, the target temperature is adjusted by a collective control. When a target condition, such as a height of a blind, is set for each window as shown in FIG. 2D, the height may be adjusted or a blocking direction of the blind for blocking light may be changed based on a collectively controlled ratio.

More specifically, in response to the user collectively controlling a plurality of air conditioning devices 200A, 210A, 220A, 230A which are installed in a house as the plurality of controlled devices 130 of FIG. 1 in order to decrease temperatures by about 1° via the user terminal 100 or the control device 120 of FIG. 1 in the control system 90A shown in FIG. 2A, the user terminal 100 or control device 120 may provide different ratio values to the air conditioning devices 200A, 210A, 220A, and 230A in order to rapidly implement the setting designated by the user. Accordingly, the ratio for controlling several devices simultaneously can be automatically calculated in any case.

In addition, in the control system 90B shown in FIG. 2B, in response to the user collectively controlling the sounds of the plurality of sound devices 200B, 210B, 220B, 230B via the user terminal 100 or control device 120 of FIG. 1 in order to do different things while the plurality of sound devices 200B, 210B, 220B, 230B installed in the house as the plurality of controlled devices 130 of FIG. 1 are operated, the user terminal 100 or the control device 120 provides different volume levels to each of the sound devices 200B, 210B, 220B, and 230B such that the sound devices 200B, 210B, 220B, and 230B are ratio-controlled based on the transmitted volume levels. The ratio-controlling refers to re-adjusting (or re-setting) a predetermined value of each sound device 200B, 210B, 220B, and 230B by considering a ratio which relates to a collectively adjusted adjustment value.

For example, in the temperature control system 90C shown in FIG. 2C, in response to the user collectively controlling the overall temperature of the house to be increased by about 3° C. via the user terminal 100 or control device 120 of FIG. 1, the air conditioning or heating devices installed in each room may be controlled with reference to a pre-set temperature by reflecting a relative value, that is, a different respective adjustment value, based on the collectively adjusted ratio. In particular, in response to the overall temperature being collectively controlled to be increased by 3° C., a temperature of a living room may be increased by 1° C. and a temperature of a main room may be increased by 3° C. based on a respective pre-set value for each room.

The control method of the control system 90 of the blind device shown in FIG. 2D is not significantly different from those described above. In particular, in response to the user collectively pulling down the plurality of blind devices 200D, 210D, 220D via the user terminal 100 or control device of FIG. 1, the blind devices 200D, 210D, and 220D are ratio-controlled with reference to a respective blind height which has been set by considering an amount of light entering a corresponding window with time, such that the blind devices are pulled down based on different respective adjustment values. The same method applies when the blind devices are pulled up.

According to an exemplary embodiment, the control system 90 may adjust each individually set setting value by additionally considering surroundings, i.e., a respective environmental quality, of each of the controlled devices in changing the setting value according to the ratio. In other words, the control system 90 may increase a volume adjusting ratio of a sound device of a space where the user is located in comparison with other devices by considering the presence/absence of the user as shown in top view (a) of FIG. 3, or may adjust the volume variably based on the collectively adjusted ratio by considering a viewing mode, that is, considering whether the mode is a television (TV) viewing mode or a movie viewing mode as shown in bottom view (b) of FIG. 3. In addition, in response to the user collectively decreasing the temperature of the house via the air conditioning device or heating device as shown in FIG. 4, the collectively adjusted ratio may be variably reflected by considering the location of the user.

More specifically, in response to the user collectively adjusting the sounds of the plurality of sound devices 200B to 230B in the control system 90B of FIG. 2B, the sound devices 200B, 210B, 220B, and 230B are controlled based on the ratio which relates to the collected adjusted adjustment values. However, the sound device 200B of the living room where the user is located is controlled by reflecting a value which is higher than the adjustment value of the ratio. As described above, the control system 90B of FIG. 2B may ratio-control based on a result of detecting surroundings and/or a respective environmental quality, such as, for example, a presence and/or absence of the user.

In addition, the sound devices 200B, 210B, 220B, and 230B of FIG. 2B may operate at different ratios based on a type of content executed in the user terminal 100 of FIG. 1 or a representative sound device of the plurality of sound devices 200B to 230B. Accordingly, a dynamic operation as shown in bottom view (b) of FIG. 3 can be performed. For example, the sound device 230B, such as a TV, may operate according to a relatively high volume adjusting ratio in comparison with the other sound devices 200B and 220B.

In addition, the control systems 90A and 90C shown in FIGS. 2A and 2C may control the air conditioning or heating devices installed in the house based on any one or more of various variables such as surroundings, a location of the user, an area of a corresponding space, a location of the air conditioning or heating device, an external temperature, an amount of used energy, and/or any other suitable variable, as shown in FIG. 4. Accordingly, dynamic grouping and ratio control can be performed based on a purpose of use of the user, and the temperature can be adjusted to reach a target temperature of the user. For example, each air conditioning device 400, 410, and 420 may operate with a different air volume as shown in FIG. 4. In particular, the air volume of the air conditioning device 400 of the large living room may be set to a higher value than those of the air conditioning devices 410 and 420 of the other small rooms.

As described above, the control system 90 of FIG. 1 may be modified in various forms and exemplary embodiments are not limited to the above-described exemplary embodiments. Hereinafter, however, a lighting system will be described by way of an example for the convenience of explanation.

Referring back to FIG. 1, the user terminal 100 according to an exemplary embodiment includes a mobile phone such as a smartphone, a tablet personal computer (PC), a laptop computer, a desktop PC, a Personal Digital Assistant (PDA), and/or any other suitable device which performs wired and/or wireless communication. The user terminal 100 accesses the communication network 110 and communicates with the control device 120. In this case, the user terminal 100 may communicate with the control device 120 via an access point 111 in the communication network 110. When the user terminal 100 can perform the operation of the control device 120, the user terminal 100 may directly control the plurality of controlled devices 130.

According to an exemplary embodiment, the user terminal 100 collectively controls the plurality of controlled devices 130 as a group (or unit group) via an interface with the user. To achieve this, the user terminal 100 may execute an application (or a program) stored therein. For example, when the plurality of controlled devices 130 are lighting devices, the user terminal 100 may display a UI window on the screen by executing the application as shown in views (a), (b), and (c) of FIG. 5. The UI window includes an individual control object 510 which is usable for controlling each of the lighting devices individually, and a collective control object 520 which is usable for controlling the plurality of lighting devices as a group. The user may group certain lighting devices (e.g., LED 1, LED 2, and LED 3) and individually set a target dimming value for each lighting device via the UI window, as shown in view (a) of FIG. 5. Accordingly, the collective control object 520 shown in view (b) of FIG. 5 indicates an average of the individually set target dimming values. Thereafter, in response to the user changing the target dimming value by adjusting the collective control object 520 as shown in view (b) of FIG. 5, the user terminal 100 changes the individually set setting values of the lighting devices by reflecting a ratio which relates to the adjustment value, as shown in view (c) of FIG. 5.

For example, it is assumed that the user individually sets the lighting devices to have respective dimming values of 50, 30, and 100 lux by adjusting the individual control object 510 of the UI window as shown in view (a) of FIG. 5. In this case, the collective control object 520 of the UI window displays "60" lux which is calculated as an average of the individually set dimming values, as shown in view (b) of FIG. 5. Thereafter, in response to the user changing 60 lux to 30 lux by adjusting the collective control object 520, the light devices indicate 25, 15, and 50 lux, respectively. In other words, because the collective control object 520 reduces the average dimming value of 60 lux by 50% to 30 lux, each of the lighting devices reduces its respective individually set dimming value by 50% by reflecting the ratio of the adjustment value adjusted by the collective control object 520.

During the above-described process, the user terminal 100 may additionally perform any one or more of various functions. View (a) of FIG. 6 illustrates an example in which a locking function is set for a lighting device designated by the user by using the collective control object. The lighting device for which the locking function is set does not operate in response to a manipulation or an adjustment of the collective control object. As shown in view (a) of FIG. 6, a locking object 630 may be displayed on an individual control object 610 which corresponds to the locking device for which the locking function is set, and only the other individual control objects 610 are controlled by reflecting the ratio of the collectively controlled adjustment value. In addition, in response to the user performing a tapping operation 640 on a collective control object 620 in order to perform a collective control adjustment based on an absolute value rather than a rate, as shown in view (b) of FIG. 6, the respective setting values of each of the individual control objects 610 are controlled based on the absolute value of the adjustment value of the collective control object 620. Furthermore, in response to the user adjusting the collective control object 620 to the maximum in order to operate each of the individual lighting devices at its respective maximum dimming value as shown in view (c) of FIG. 6, each of the individual control objects 610 is adjusted to the corresponding maximum. Then, in response to a predetermined time elapsing or a separate command which is received from the user, the individual control objects 610 are reset to their respective original statuses. In this case, a memory object 650 may be displayed on the screen. As a result, the user terminal 100 may continue to perform the ratio control according to an exemplary embodiment. The above-described method may apply in the same way when each of the individual control objects 610 is adjusted to the respective minimum. In addition, the user terminal 100 may limit the adjustable maximum value based on a respective environmental quality of each of the lighting devices, as shown in view (d) of FIG. 6. For example, in response to an amount of light which enters from the outside exceeding a threshold value, the lighting device placed closest to the window does not exceed the maximum value, even if the lighting device belongs to the group which is operated by the collective control.

To perform the above-described functions, the user terminal 100 receives information which relates to the plurality of controlled devices 130 registered at the control device 120, for example, the lighting devices, via an initial loading operation. Accordingly, the user terminal 100 shares the information which relates to the plurality of controlled devices 130 with the control device 120, so that the user can grasp the plurality of controlled devices 130 which are installed in a certain space at a glance, via the user terminal 100. In addition, when collectively controlling the plurality of controlled devices 130, the user terminal 100 may provide group information which is set by the user regarding the plurality of controlled devices 130 and respective setting values of the individual controlled devices 130-1 to 130-N to the control device 120, in order to share the information with the control device 120. Accordingly, in response to the user terminal 100 providing the group information and additional information related to an increase and decrease of the dimming value to the control device 120 together with the adjustment value collectively controlled by the user, the control device 120 may control the plurality of controlled devices 130 by reflecting the additional information. Of course, during this process, the user terminal 100 may provide the adjustment value in the form of a ratio value rather than an absolute value. For example, when the adjustment value indicates an increasing value by 20 lux, the increasing value information is provided not with information which is based on the value 20 but instead with a ratio value which is based on the 20 lux value.

In the above-described exemplary embodiments, the user terminal 100 adjusts the individual control object 510 and the collective control object 520 by performing a dragging operation on the UI window which is displayed on the screen for the convenience of manipulation, as shown in views (a), (b), and (c) of FIG. 5. However, the controlling operation is not limited to the dragging operation. For example, the adjustment value may be changed by manipulating a button which is provided adjacent to the collective control object 520. In addition, the adjustment value may be changed by a voice control and/or by a motion control. In this case, the user terminal 100 may analyze a voice which is collected via a microphone in order to change the adjustment value, and/or may analyze an image which is received via a camera in order to change the adjustment value. In the case of the motion control, a direction and a range of the adjustment value may be determined by using a hand motion and a motion speed.

The communication network 110 of FIG. 1 includes all of the wired and wireless communication networks. The wired network includes Internet, such as a cable network or a Public Switched Telephone Network (PSTN), and the wireless communication network includes Code Division Multiple Access (CDMA), Wideband (W)-CDMA, Global System for Mobile communications (GSM), Evolved Packet Core (EPC), Long Term Evolution (LTE), and Wibro networks. Accordingly, when the communication network 110 is a wired communication network, the user terminal 100 may access an exchange office of a telephone office, and, when the communication network 110 is a wireless communication network, the user terminal 100 may access a Serving GRPS Support Node (SGSN) and/or a Gateway GRPS Support Node (GGSN) which is operated by a mobile network operator and may process data, or may access any one or more of various relay bases, such as Base Station Transmission (BTS), NodeB, e-NodeB, and/or any other suitable type of relay base, and may process data. According to an exemplary embodiment, the communication network 110 may serve to transmit data which is processed by the user terminal 100 for collectively controlling the plurality of controlled devices 130 to the control device 120.

The communication network 110 includes a small base station, such as a femtocell or picocell base station, which is mainly installed in buildings, that is, the access point 111. The femtocell and picocell base stations are distinguished from each other based on the corresponding maximum number of the user terminals 100 that the base station can access. The access point 111 includes a short-range communication module to communicate within a short range, such as Zigbee and/or Wi-Fi. The short-range communication may be performed according to any one or more of various standards, such as Bluetooth, Zigbee, Infrared Data Association (IrDA), Radio Frequency (RF) such as Ultra High Frequency (UHF) and Very High Frequency (VHF), Ultra Wideband (UWB), and/or any other suitable standard, in addition to Wi-Fi. Accordingly, the access point 111 extracts a location of a data packet, designates a best communication path to the extracted location, and transmits the data packet which was received from the control device 120 to the user terminal 100 via the designated communication path. Although the access point 111 is connected with the control device 120 in a wired manner in FIG. 1, the access point 111 may be connected with the control device 120 wirelessly.

For example, in response to the user terminal 100 accessing the access point 111 of the communication network 110, for example, a wireless router, in a certain space like a house, the access point 111 may transmit the data processed by the user terminal 100 to the control device 120. The access point 111 may transmit data provided by the control device 120 to the user terminal 100. In particular, in response to the user terminal 100 accessing the access point 111 of the communication network 110 and executing an application for collectively controlling the plurality of controlled devices 130, the user terminal 100 and the control device 120 may perform a loading operation via the access point 111. Accordingly, the user terminal 100 and the control device 120 may share the information which relates to the plurality of controlled devices 130.

The control device 120 controls the plurality of controlled devices 130 based on a command of the user terminal 100. To achieve this, the control device 120 interworks with a database (DB) 120a. The DB 120a stores a variety of information which is useful and/or necessary for controlling the plurality of controlled devices 130. For example, the control device 120 may store the variety of information, such as device IDs and location information relating to the plurality of controlled devices 130 which are installed in a certain space. For example, the control device 120 may acquire device IDs by communicating with the plurality of controlled devices 130 using Near Field Communication (NFC), and, in response to the individual controlled devices 130_1 to 130_N of the acquired device IDs being normally installed, the control device 120 may register the individual controlled devices 130_1 to 130_N at the DB 120a. The registering process may be used more advantageously to distinguish control areas when the control device 120 is used as a communication device. For example, this is because the user should not control lighting devices in a neighboring house in the same apartment complex. In addition, the registered individual controlled devices 130_1 to 130_N may be deleted via the user terminal 100 or by using NFC. For example, in response to the same ID being acquired again for the registered device ID, the registered device may be deleted. Furthermore, the DB 120a may store the group information which is set for the plurality of controlled devices 130 by the user via the user terminal 100, and may store information which relates to respective individual setting values of the individual controlled devices 130_1 to 130_N and an average of the individual setting values in the group.

Accordingly, in response to group information which relates to a specific group and an adjustment value for collectively controlling the plurality of controlled devices 130 belonging to the specific group being received from the user terminal 100, the control device 120 may calculate a ratio by using the received adjustment value. Of course, in response to the adjustment value being provided from the user terminal 100 in the form of a ratio value, the calculating process may be omitted. Thereafter, the control device 120 adjusts the setting values of the plurality of controlled devices 130 belonging to the corresponding group based on the calculated ratio value, and then stores corresponding information in the DB 120a. In addition, the control device 120 controls the plurality of controlled devices 130 belonging to the same group based on the adjusted setting values. For example, when the plurality of controlled devices 130 are lighting devices, the control device 120 may generate a control signal for adjusting dimming values of the lighting devices, and may provide the control signal to the plurality of controlled devices 130. In this case, the control signal may be a switching signal for adjusting a level of a voltage applied to the plurality of controlled devices 130, or may be a Pulse Width Modulation (PWM) signal for adjusting a time during which a current is applied.

In addition, the control device 120 may adjust the setting values of the plurality of controlled devices 130 by reflecting any one or more of various functions which are set via the user terminal 100 by using the collective control. For example, in response to a lock being set for a specific controlled device 130_1~130_N, the control device 120 may not change the setting value of the controlled device 130_1~130_N for which the lock is set, and may instead maintain a previous status. In addition, when the control is set to be performed based on an absolute value rather than a ratio value, the control device 120 may calculate an absolute value of the received adjustment value, and then may adjust each of the setting values of the plurality of controlled devices 130 based on the calculated absolute value. This has been described above with reference to FIG. 6 and thus a redundant explanation is omitted.

According to an exemplary embodiment, the control device 120 may automatically determine whether the control method is a ratio control method or a control method which is based on using an absolute value, and may operate in the control method using the absolute value according to a result of the determining. For example, in response to the adjustment value being received from the user terminal 100, the control device 120 determines whether each of the setting values of the plurality of controlled devices 130 individually set by the user has a same value. In response to the setting values being the same value, the control device 120 adjusts the setting values of the plurality of controlled devices 130 by the absolute value. For example, referring to view (b) of FIG. 6, the control device 120 may selectively use a manual method in which the user sets a value or an automatic method described above in order to control the plurality of controlled devices 130 by using the absolute value.

In addition, the control device 120 may adjust the setting values by reflecting a result of sensing performed by the sensor 130*a* which interworks with the individual controlled devices 130_1 to 130_N. For example, the sensor 130*a* may sense the presence/absence of the user as shown in FIGS. 3 and 4, or may sense an amount of light which enters through a window as shown in FIG. 6. The control device 120 may adjust the setting values based on a result of the sensing performed by the sensor 130*a*. For example, as shown in FIG. 6, when the maximum dimming value is set for a lighting device which is located where a relatively large amount of light enters, the control device 120 controls the setting value of the lighting device not to exceed the maximum dimming value.

According to an exemplary embodiment, the control device 120 may be included in a communication device of the communication network 110. In particular, the control device 120 may be included in the communication network 110 in the form of a bridge, a hub, a router, and/or a repeater which can share several lines in a general network environment, rather than in the form of an individual device which is separated from the communication network 110 as shown in FIG. 1. The hub differs from the wireless router in that the hub is a physical layer device for distributing only several ports, and the bridge is the same as the repeater in that the bridge connects two LANs as a data link layer device, but is different from the repeater in its capability of adjusting an amount of traffic. The repeater serves to amplify a weak signal. The bridge may re-generate data similarly as the repeater, but is different from the repeater in that the bridge re-generates the data in different locations. In this aspect, the bridge may be a combination of the repeater and the hub. The router connects different network layers. The router operates as an Internet Protocol (IP) node and sets a path with reference to routing data according to the IP. Accordingly, when the hub and the repeater are first layer devices, the bridge is a second layer device and the router is a third layer device. These communication devices may be improved to perform the operation of the control device 120 according to an exemplary embodiment.

The plurality of controlled devices 130 may include any one or more of lighting devices, sound devices, blind devices, and temperature control devices. According to an exemplary embodiment, the lighting device may include a light-emitting diode (LED). The LED is able to control dimming, that is, brightness, and thus requires a current source or a power source to control the same. In particular, the LED may be driven by constant voltage or constant current. Accordingly, each lighting device may include a separate driver to be driven by the constant voltage or the constant current. The driver may operate according to a control signal provided by the control device 120. For example, the brightness of the lighting device may be adjusted by adjusting a level of voltage applied to the LED under the control of the control device 120. In addition, the brightness is increased by increasing an amount of current by adjusting a driving time during which the LED operates, that is, a pulse width. As described above, the plurality of controlled devices 130 may be controlled by the control device 120 in any one or more of various ways, such as by controlling the constant voltage or constant current.

In addition, the individual controlled devices 130_1 to 130_N may operate according to a result of the sensing performed by the sensor 130*a*. According to an exemplary embodiment, the sensor 130*a* may be provided for each of the plurality of individually controlled devices 130_1 to 130_N. The sensor 130*a* may include any one or more of various types of sensors which are configured to detect surroundings and/or environmental qualities of the individual controlled devices 130_1 to 130_N. Of course, the sensor is related to the ratio control operation. For example, the sensor 130*a* may include an infrared ray operation sensor configured to determine the presence/absence of the user, or may include a light sensor configured to determine an amount of light which enters from the outside.

For example, when the plurality of controlled devices 130 are lighting devices, the sensor 130*a* may provide information which relates to the amount of light entering from the outside to the control device 120, and the control device 120 may operate the lighting devices in any one or more of various ways according to a result of the sensing provided from the sensor 130*a*. For example, when a lighting device connected with the sensor 130*a* is set to be turned off in response to the amount of light exceeding a threshold value, the control device 120 may turn off the corresponding lighting device in response to the amount of light exceeding the threshold value as a result of the sensing of the sensor 130*a*. In this case, the control device 120 controls only the other lighting devices of the same group by adjusting the setting values based on the ratio value. In addition, when the user limits the maximum adjustable value according to the result of the sensing of the sensor 130*a* as shown in view (d) of FIG. 6, the control device 120 may adjust the setting value only up to the maximum value of the corresponding lighting device, regardless of the ratio value.

In the above-described exemplary embodiments, the user terminal 100 interworks with the control device 120 via the communication network 110 in order to control the plurality of controlled devices 130. However, this should not be considered as limiting. For example, according to an exemplary embodiment, when the user terminal 100 includes a hardware element such as a memory or a software element of the control device 120 and performs the operation of the control device 120, the user terminal 100 can directly control the plurality of controlled devices in any case. In addition, when the control device 120 is integrated into the plurality of controlled devices 130, the user terminal 100 may directly control the plurality of controlled devices 130.

Figure 7A:
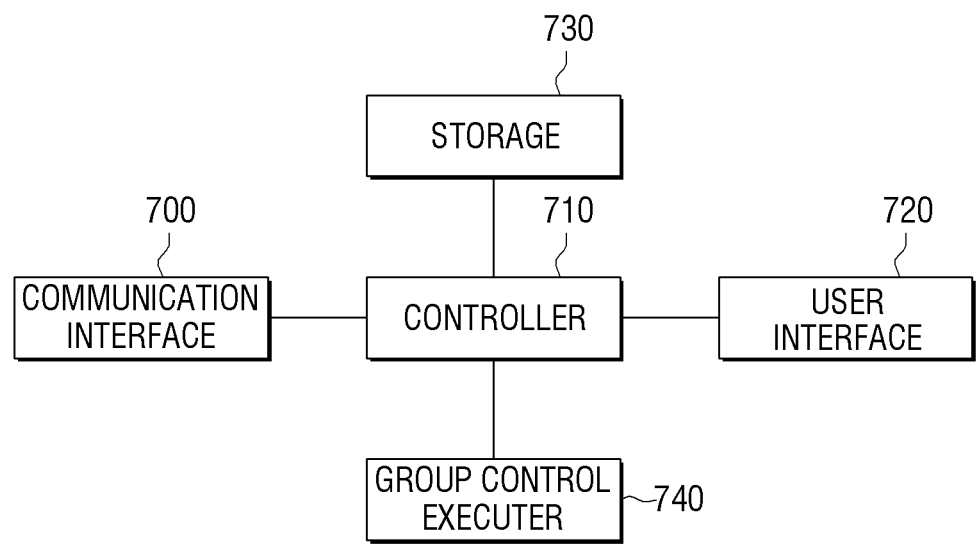
FIGS. 7A and 7B are block diagrams which illustrate various configurations of the user terminal of FIG. 1.
Figure 7B:
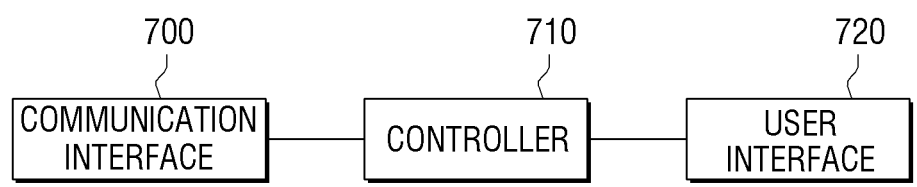

FIGS. 7A and 7B are block diagrams which illustrate a configuration of the user terminal of FIG. 1.

Referring to FIG. 7A in conjunction with FIG. 1, the user terminal 100 according to an exemplary embodiment is configured to interwork with the control device 120 of FIG. 1, for example, and includes a part or all of a communication interface 700, a controller 710, a user interface 720, a storage 730, and a group control executer 740.

The term "including a part or all" herein may mean that some elements, such as the storage 730, may be omitted and/or that some elements, such as the group control executer 740, may be integrated into the controller 710 as shown in FIG. 7B. For better understanding of exemplary embodiments, the user terminal 100 includes all of the elements.

The communication interface 700 communicates with the control device 120. According to another exemplary embodiment, the communication interface 700 may communicate with each individual device of the plurality of controlled devices 130. In particular, when the user terminal 100 directly controls the plurality of controlled devices 130 without intervention of the control device 120, the communication interface 700 may communicate with each one of the plurality of controlled devices 130.

The controller 710 performs an overall operation to control the communication interface 700, the user interface 720, the storage 730, and the group control executer 740 of the user terminal 100. For example, in response to a user command to control the plurality of controlled devices 130 being received via the user interface 720, the controller 710 may operate the group control executer 740 based on the user command. In addition, in response to the user changing the adjustment value for collectively controlling the plurality of controlled devices 130 of FIG. 1 via the user interface 720, the controller 710 may control the communication interface 700 to provide information which relates to the adjustment value to the control device 120. In this case, the controller 710 may provide group information stored in the storage 730 and additional information relating to whether the adjustment value is an increasing value or decreasing value, in conjunction with the adjustment value. Furthermore, the controller 710 may control the communication interface 700 to provide information which relates to any one or more of various functions set by the user via the user interface 720 to the control device 120. When a lock is set or a control method using an absolute value rather than a ratio value is set, the controller 710 may control the communication interface 700 to provide corresponding setting information to the control device 120.

The user interface 720 may include a display and a button inputter. For example, when the user interface 720 is configured as a display of a touch screen method, a user command may be received by means of a user's touch. In this case, the button inputter may be omitted. When the user interface 720 is not configured as the display of the touch screen method, data generated by driving of the group control executer 740 may be displayed on the screen and the user command may be provided via the button inputter. The button inputter may include any one or more of various buttons, such as a direction button and/or a number button.

The storage 730 stores a variety of information which is processed in the user terminal 100. According to an exemplary embodiment, the storage 730 may share information relating to the plurality of controlled devices 130 by communicating with the control device 120, and may store the shared information. For example, in response to the user grouping the individual controlled devices 130_1 to 130_N of FIG. 1 via the user terminal 100, the user terminal 100 may store basic information, such as group information which is usable for collectively controlling the plurality of controlled devices 130 in a specific group.

The group control executer 740 may store an application for collectively controlling the plurality of controlled devices via the control device 120 of FIG. 1, and may execute the application stored under the control of the controller 710 based on a user's request. In response to the application being executed, the user interface 720 may display the UI screen on the screen as shown in views (a), (b), and (c) of FIG. 5. The UI will be explained in detail below. The group control executer 740 may generate an adjustment value in order to provide an adjustment value to be collectively adjusted by the user to the control device 120, or may generate a ratio value in order to provide a ratio value for the adjustment value to the control device 120. The adjustment value or ratio value generated in this way may be transmitted to the communication interface 700 under the control of the controller 710.

In addition, the user terminal 100 may include any one or more of various function blocks. For example, when the user terminal 100 controls the plurality of controlled devices 130 via voice recognition and/or motion recognition, the user terminal 100 may include a microphone and a camera, and may include an analysis module for analyzing information acquired by the microphone and the camera. Various modifications can be made to the exemplary embodiment, provided that the plurality of controlled devices 130 can be grouped and the plurality of controlled devices 130 in the group can be collectively controlled. Therefore, the present disclosure is not limited to the above-described exemplary embodiments.

Figure 8A:
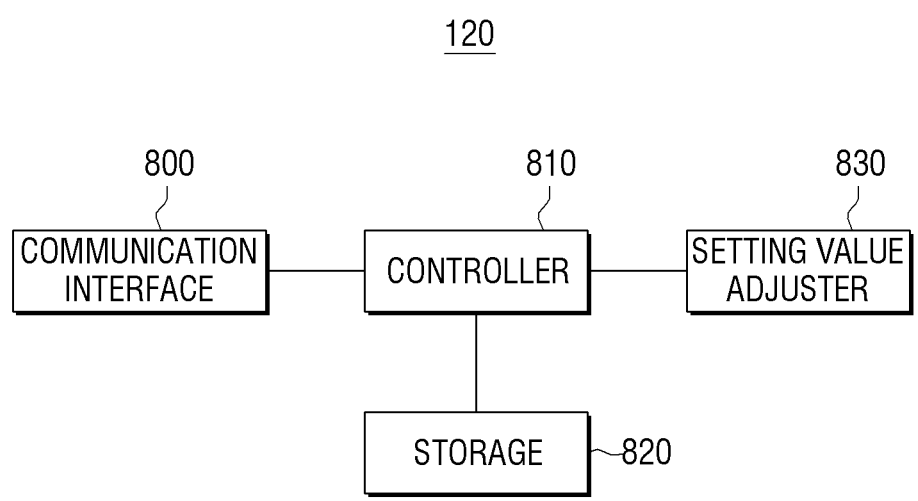
FIGS. 8A and 8B are block diagrams which illustrate various configurations of a control device of FIG. 1.
Figure 8B:
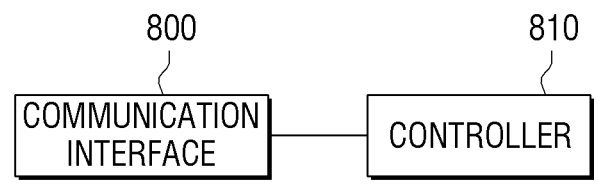

FIGS. 8A and 8B are block diagrams which illustrate a configuration of the control device of FIG. 1.

Referring to FIG. 8A in conjunction with FIG. 1, the control device 120 according to an exemplary embodiment is configured to interwork with the user terminal 100 of FIG. 1, and includes a part or all of a communication interface 800, a controller 810, a storage 820, and a setting value adjuster 830.

The term "including a part or all" herein may mean that some elements, such as the storage 820, may be omitted and/or that some elements, such as the setting value adjuster 830, may be integrated into the controller 810, as shown in FIG. 8B. For better understanding of exemplary embodiments, the control device 120 includes all of the elements.

The communication interface 800 communicates with the user terminal 100 and the plurality of controlled devices 130. The communication interface 800 may receive an adjustment value which is adjustable by the user in order to collectively control the plurality of controlled devices 130, and may also receive a variety of additional information corresponding to the adjustment value by communicating with the user terminal 100. In addition, the communication interface 800 may receive information relating to any one or more of various setting functions set by the user on the user terminal 100. In addition, the communication interface 800 may receive a result of sensing performed by the sensor 130a of FIG. 1 via the plurality of controlled devices 130. In addition, the communication interface 800 may register the individual controlled devices 130_1 to 130_N by using NFC. For example, the controller 810 registers each of the individual controlled devices 130_1 to 130_N at the storage 820 or the separate DB 120a, and then, in response to respective signals being received from the individual controlled devices 130_1 to 130_N, the controller 810 may determine that the individual controlled devices 130_1 to 130_N are installed. In this case, the controller 810 may use respective device IDs of the individual controlled devices 130_1 to 130_N.

The controller 810 may control an overall operation of the communication interface 800, the storage 820, and the setting value adjuster 830 of the control device 120. For example, in response to an adjustment value being received from the user terminal 100 via the communication interface 800, the controller 810 may transmit the adjustment value to the setting value adjuster 830. Of course, in response to the adjustment value being provided in the form of a ratio value, the controller 810 may transmit the adjustment value to the setting value adjuster 830. In response to a request of the setting value adjuster 830, the controller 810 may provide setting value information which relates to each of the individual controlled devices 130_1 to 130_N of FIG. 1 belonging to the same group, which is stored in the storage 820 or the separate DB 120*a*. Thereafter, the controller 810 may store setting value information which is adjusted by the setting value adjuster 830 in the storage 820 and/or in the DB 120*a*.

In addition, the controller 810 controls the plurality of controlled devices 130 based on the setting values adjusted by the setting value adjuster 830. To achieve this, the controller 810 may generate control signals for controlling the plurality of controlled devices 130 and may provide the control signals to the plurality of controlled devices 130. For example, in response to a dimming value of a light of a specific individual controlled device from among the plurality of controlled devices 130_1~130_N being adjusted to be decreased, the controller 810 may generate a control signal for reducing a level of applied voltage and may provide the control signal. In particular, various levels of voltages may be applied to the individual controlled devices 130_1 to 130_N. The controller 810 may provide a switching signal as the control signal in order to select a specific level of voltage.

The storage 820 may temporarily store the information which is processed in the control device 120. In practice, the control device 120 may store information which is necessary for collectively controlling the plurality of controlled devices of FIG. 1 in the DB 120*a* which interworks with the control device 120. However, the control device 120 may store the information which needs to be temporarily stored for rapid information processing in the storage 820, and may use the information afterward.

The setting value adjuster 830 adjusts (or calculates) the respective setting values of the individual controlled devices 130_1 to 130_N, which are pre-set by the user. In this process, in response to the user terminal 100 providing the adjustment value in the form of an absolute value, the setting value adjuster 830 may calculate a ratio value by using the adjustment value. In this case, the setting value adjuster 830 may use information which relates to an average of a specific group. In particular, when the adjustment value is a decreasing value, the setting value adjuster 830 may calculate a ratio of the adjustment value to the average, and, when the adjustment value is an increasing value, the setting value adjuster 830 may calculate a ratio of the adjustment value to a value which is obtainable by subtracting the average from the maximum adjustable value.

In response to the ratio value being calculated as described above, the setting value adjuster 830 adjusts each of the respective setting values of the individual controlled devices 130_1 to 130_N according to the calculated ratio. In response to the ratio value being directly received from the user terminal 100, the setting value adjuster 830 adjusts only the pre-set setting values of each of the individual controlled devices 130_1 to 130_N. In this case, the setting value adjuster 830 may reflect a variety of setting information provided by the controller 810 in adjusting the setting values. For example, in response to a lock being set, the setting value adjuster 810 may not adjust the setting value of the individual controlled device 130_1~130_N for which the lock is set. The setting values adjusted by the setting value adjuster 830 may be provided to the controller 810.

Figure 9:
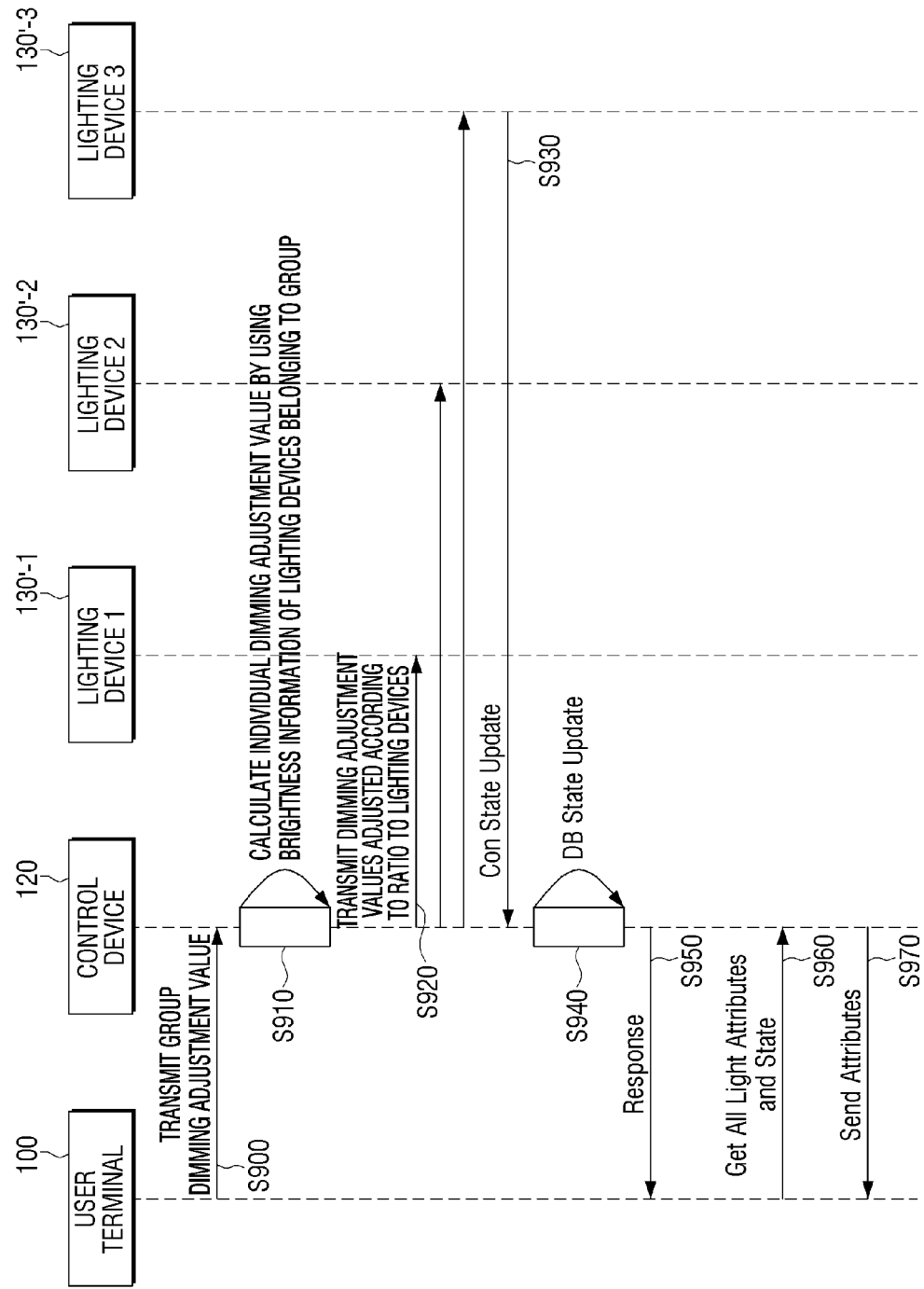
FIG. 9 is a view which illustrates a process for controlling a lighting device, according to an exemplary embodiment.
Figure 10A:
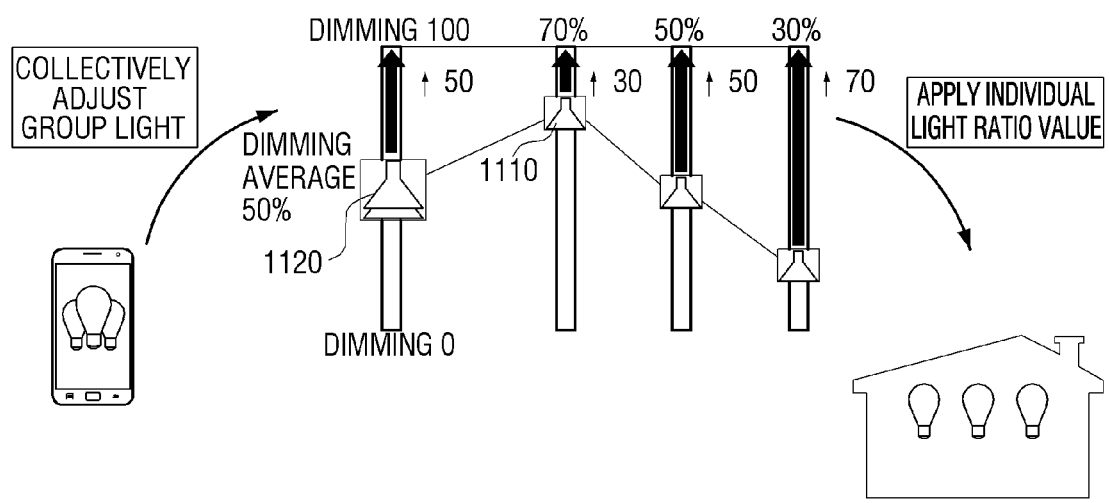
FIGS. 10A and 10B are views schematizing the process for controlling the light device of FIG. 9.
Figure 10B:
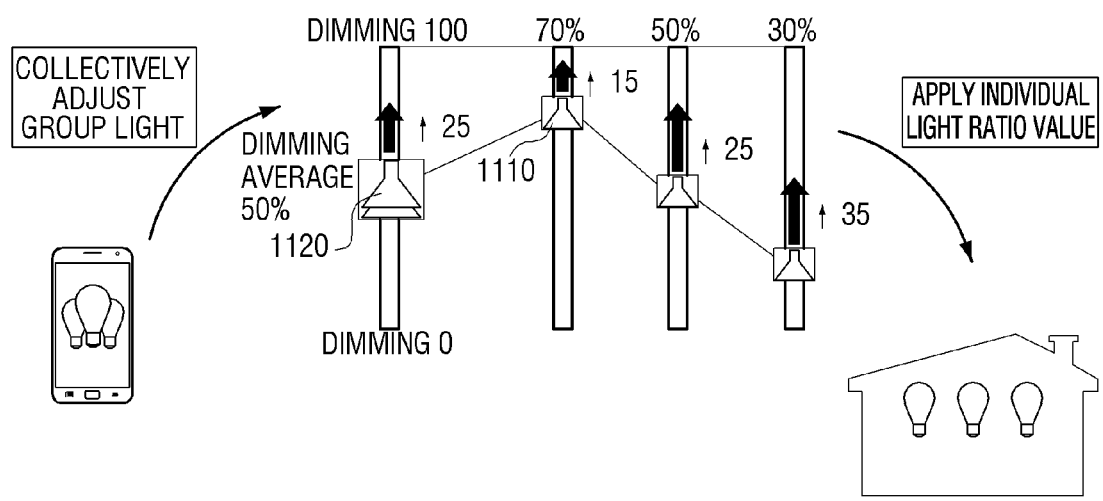

FIG. 9 is a view which illustrates a collective control process of a lighting device, according to an exemplary embodiment, and FIGS. 10A and 10B are diagrams which illustrate the collective control process of the lighting device of FIG. 9.

Referring to FIG. 9 in conjunction with FIG. 1, in operation S900, the user terminal 100 according to an exemplary embodiment provides a group dimming adjustment value, that is, an adjusted dimming value, to the control device 120. The user terminal 100 may display a UI window on the screen based on a user's request. The UI displays an individual control object 1110 and a group control object 1120, as shown in FIGS. 10A and 10B. The individual control object 1110 indicates pre-set setting values of lighting devices 130'-1, 130'-2, and 130'-3 of FIG. 9, and the group control object 1120 indicates an average of the pre-set setting values. Therefore, the adjusted dimming value is a value which is obtained by adjusting the average.

In operation S910, the control device 120 calculates individual dimming adjustment values of each of the lighting devices 130'-1, 130'-2, and 130'-3 by using the received dimming adjustment value. More specifically, the control device 120 calculates a ratio which relates to the received dimming adjustment value and adjusts each of the pre-set dimming values individually by reflecting the calculated ratio value.

In operation S920, the control device 120 provides the dimming values which are adjusted according to the ratio to each of the lighting devices 130'-1, 130'-2, and 130'-3. More specifically, the control device 120 may provide control signals indicating the adjusted dimming values. However, when the lighting devices 130'-1, 130'-2, and 130'-3 include their respective controllers, the control device 120 may transmit information relating to the adjusted dimming values to each of the lighting devices 130'-1, 130'-2, and 130'-3, and each of the lighting devices 130'-1, 130'-2, and 130'-3 may adjust a respective brightness by using the information on the adjusted dimming values.

Thereafter, in operation S930, the lighting devices 130'-1, 130'-2, and 130'-3 may inform the control device 120 that the adjusted dimming values are normally received.

Accordingly, the control device 1120 updates the DB 120*a* interworking therewith with new information relating to the adjusted dimming values in operation S940, and may inform the user terminal 100 of the new information relating to the adjusted dimming values in operation S950.

In addition, in operation S960, the user terminal 100 may request information which relates to attributes and statuses of the lighting devices 130'-1, 130'-2, and 130'-3 by communicating with the control device 120, and in operation S970, the control device 120 may provide the information in response to the request.

Hereinafter, a ratio control method according to an exemplary embodiment will be explained in detail with reference to FIGS. 10A and 10B. The user terminal 100 may display the UI window which includes the individual control objects 1110 and the group control object 1120 on the screen as shown in FIG. 10A. In response to the user adjusting the group control object 1120 to the maximum in FIG. 10A, the control device 120 controls each of the lighting devices 130'-1, 130'-2, and 130'-3 to have the maximum dimming value, regardless of the ratio control. Accordingly, all of the individual control objects 1110 and the group control object 1120 on the screen of the user terminal 100 indicate the maximum value. Thereafter, in response to a user request to continuously perform the ratio control operation, the control device 120 returns to the previous status. To achieve this, the control device 120 may refer to the previous setting value information stored in the DB 120*a*.

Conversely, the user may increase the dimming value by 25 out of the adjustable remaining dimming value of 50 by adjusting the group control object 1120 as shown in FIG. 10B. This means that the dimming value increases by 50% of the value which is obtained by subtracting the average from the maximum value. Therefore, the control device 120 controls each of the individual lighting devices 130'-1, 130'-2, and 130'-3 at the ratio of ½ and thus increases the pre-set dimming values by 50%. Accordingly, the individual control objects 1110 indicating the dimming values of 70, 50, and 30 on the UI of the user terminal 100 are changed to indicate the dimming values of 85, 75, and 65.

Figure 11:
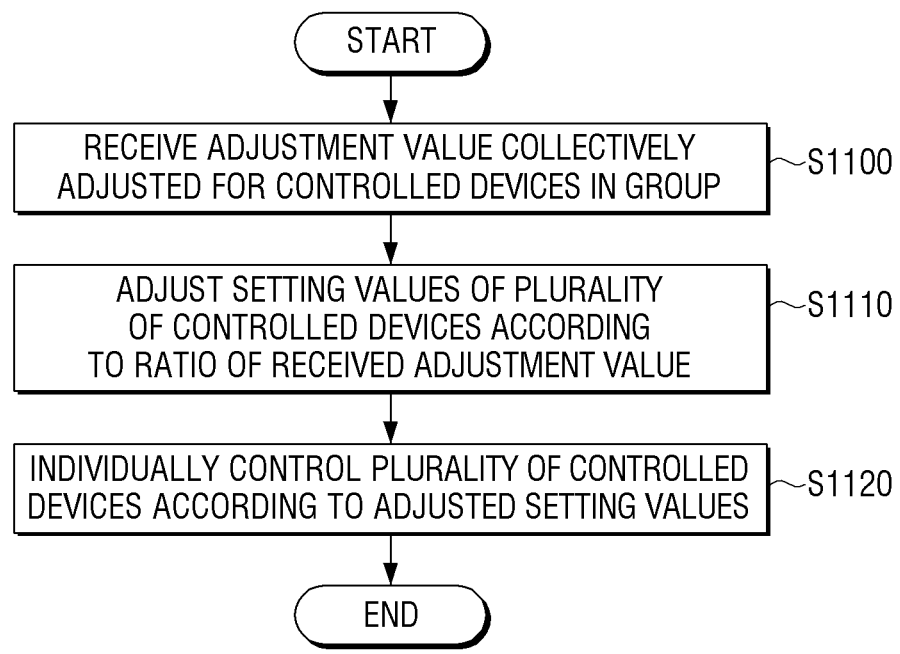
FIG. 11 is a flowchart which illustrates a driving method of a control device, according to a first exemplary embodiment.

FIG. 11 is a flowchart which illustrates a driving method of a control device, according to a first exemplary embodiment.

Referring to FIG. 11 in conjunction with FIG. 1, in operation S1100, the control device 120 according to an exemplary embodiment receives an adjustment value for collectively controlling the plurality of controlled devices 130 in the group from the user terminal 100. In this case, the adjustment value may be provided in the form of an absolute value or a ratio value. In addition, the control device 120 may receive information relating to whether the adjustment value is an increasing value or decreasing value at the same time of receiving the adjustment value.

In operation S1110, the control device 120 adjusts pre-set values of the plurality of controlled devices according to a ratio which relates to the received adjustment value. This has been described above with reference to FIG. 10B and a redundant explanation is omitted.

Thereafter, in operation S1120, the control device 120 controls the plurality of controlled devices 130 based on the adjusted setting values (S1120). For example, the control device 120 may control each of the plurality of controlled devices 130 individually. The plurality of controlled devices 130 may include any one or more of various devices such as sound devices, blind devices, etc. in addition to the above-mentioned lighting devices.

Figure 12:
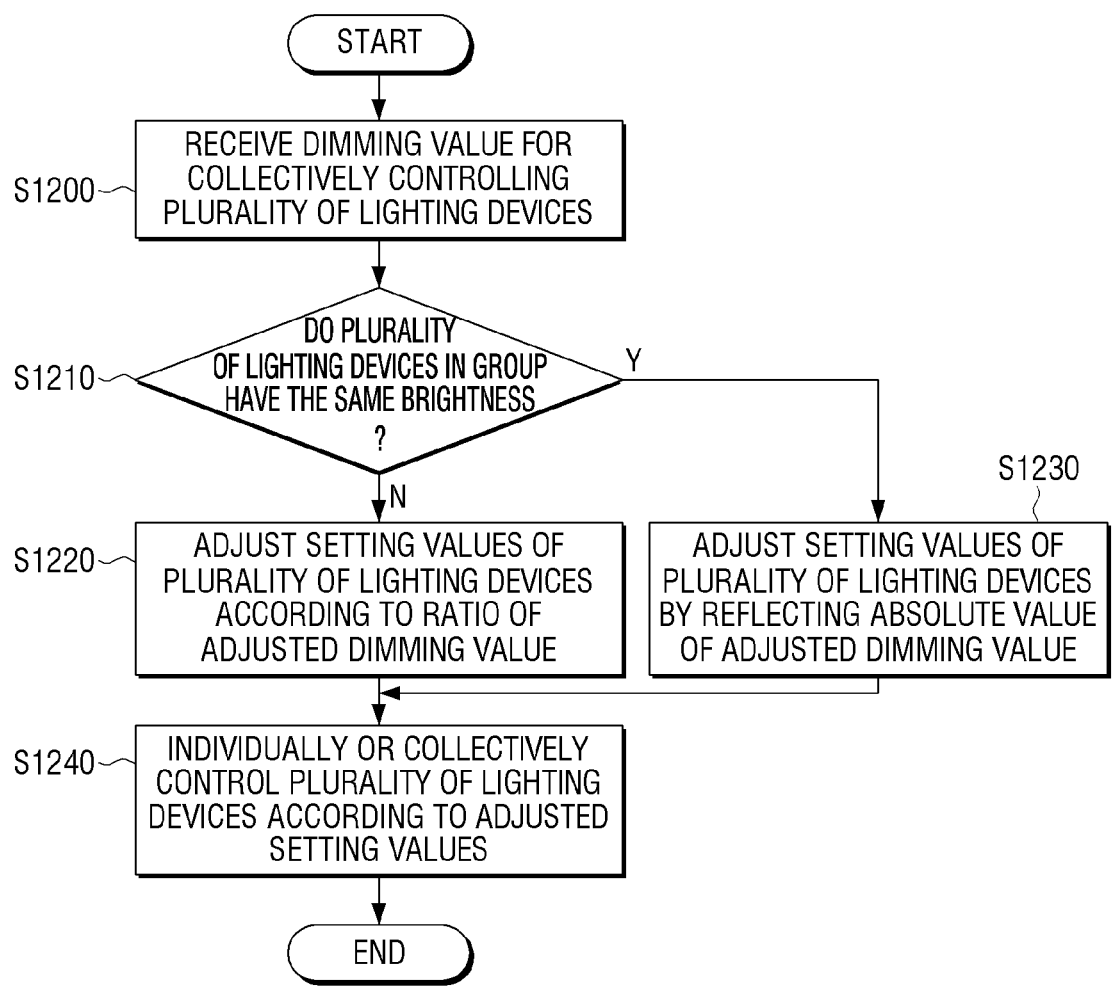
FIG. 12 is a flowchart which illustrates a driving method of a control device, according to a second exemplary embodiment.

FIG. 12 is a flowchart which illustrates a driving method of a control device according to a second exemplary embodiment, which includes controlling a lighting device by using an absolute value.

Referring to FIG. 12 in conjunction with FIG. 9, in operation S1200, the control device 120 according to an exemplary embodiment receives a dimming value for collectively controlling the plurality of lighting devices 130'-1, 130'-2, and 130'-3 from the user terminal 100. In this case, the dimming value refers to an adjustment value for an average value, and may be provided in the form of an absolute value or a ratio value.

In operation S1210, the control device 120 determines whether the dimming values which have been pre-set for each of the plurality of lighting devices 130'-1, 130'-2, and 130'-3 in the same group are the same value or not. To achieve this, the control device 120 may retrieve the pre-set dimming values of the plurality of lighting devices 130'-1, 130'-2, and 130'-3 belonging to the same group from the DB 120a which interworks with the control device 120, and may compare the retrieved dimming values.

When the retrieved dimming values are not the same value, in operation S1220, the control device 120 adjusts the respective setting values of the plurality of lighting devices 130'-1, 130'-2, and 130'-3 based on to a ratio which relates to the received dimming value. The adjusting herein may include calculating a ratio and determining an adjustment range according to the calculated ratio.

When the dimming values are the same value, in operation S1230, the control device 120 adjusts the setting values of each of the plurality of lighting devices 130'-1, 130'-2, and 130'-3 by an absolute value of the adjusted dimming value. The adjusting herein may include calculating the absolute value. The adjusted setting values are collectively transmitted to the plurality of lighting devices 130'-1, 130'-2, and 130'-3. Thereafter, in operation S1240, the control device 120 may individually or collectively control the plurality of lighting devices 130'-1, 130'-2, and 130'-3 according to the adjusted setting values, based on the ratio control or the absolute value control.

FIGS. 13, 14, 15, 16, and 17 are views which illustrate a driving screen of a light control implemented in the user terminal of FIG. 1.

Referring to FIGS. 13, 14, 15, 16, and 17 in conjunction with FIG. 1, the user terminal 100 according to an exemplary embodiment displays a list of LEDs as shown in views (a), (b), and (c) of FIG. 13. The displayed list provides information relating to installed individual LEDs. It is possible to control the LEDs one by one by using the list. View (a) of FIG. 13 illustrates a quick view of the individual LEDs, and view (b) of FIG. 13 illustrates a detail view of the individual LEDs. View (c) of FIG. 13 illustrates a screen which is displayed in response to LED 2 being selected in view (b) of FIG. 13. In addition, view (d) of FIG. 13 shows a button to move to a setting page.

Detailed functions related to FIG. 13 may be summarized in Table 1 of FIGS. 91A and 91B.

FIG. 14 is a view which illustrates a portrait view of the group list. The group list provides LED information relating to each group, and it is possible to control the lights on a group basis or an LED basis by using the group list. View (a) of FIG. 14 illustrates a quick view of the groups of the LEDs, view (b) of FIG. 14 illustrates a detail view of the groups of the LEDs, and view (c) of FIG. 14 shows individual LEDs included in Group 1.

Detailed functions related to FIG. 14 are shown in Table 2 of FIGS. 92A and 92B.

Figure 15:
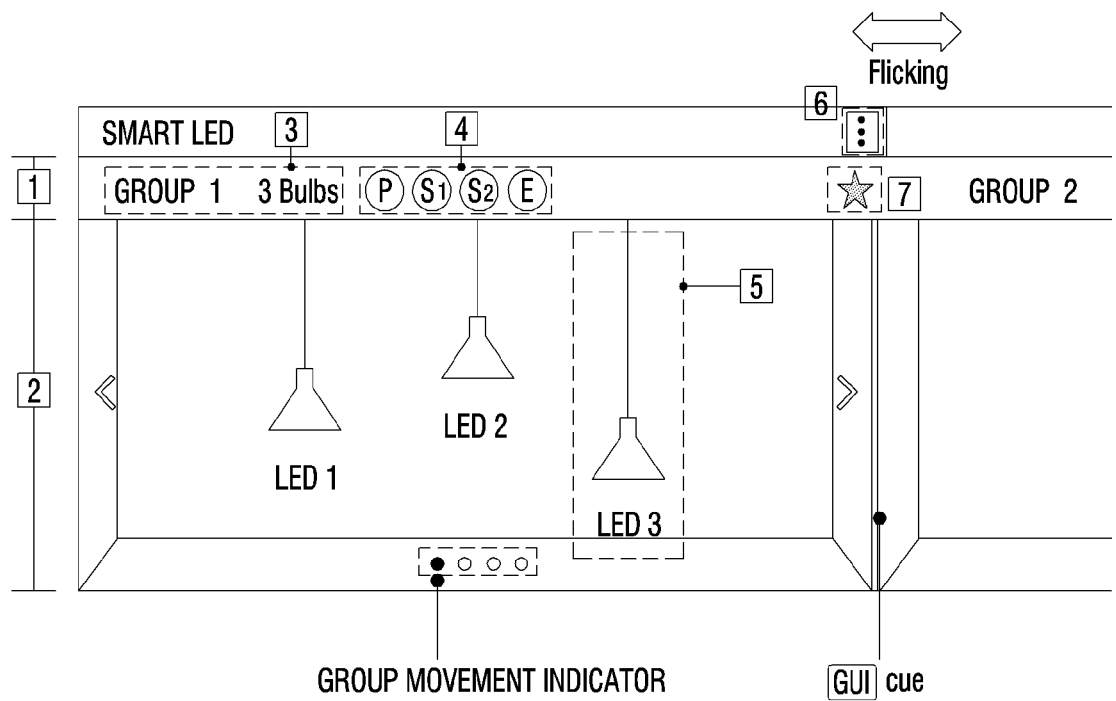
FIG. 15 is a view which illustrates a landscape view of a group list.

FIG. 15 is a view which illustrates a landscape view of the group list. The group list of FIG. 15 provides LED information of each group, and it is possible to control the lights on a group basis or an LED basis by using the group list. However, the landscape view may be activated only in the group list.

Detailed functions related to FIG. 15 are explained in Table 3 of FIGS. 93A and 93B.

Figure 16:
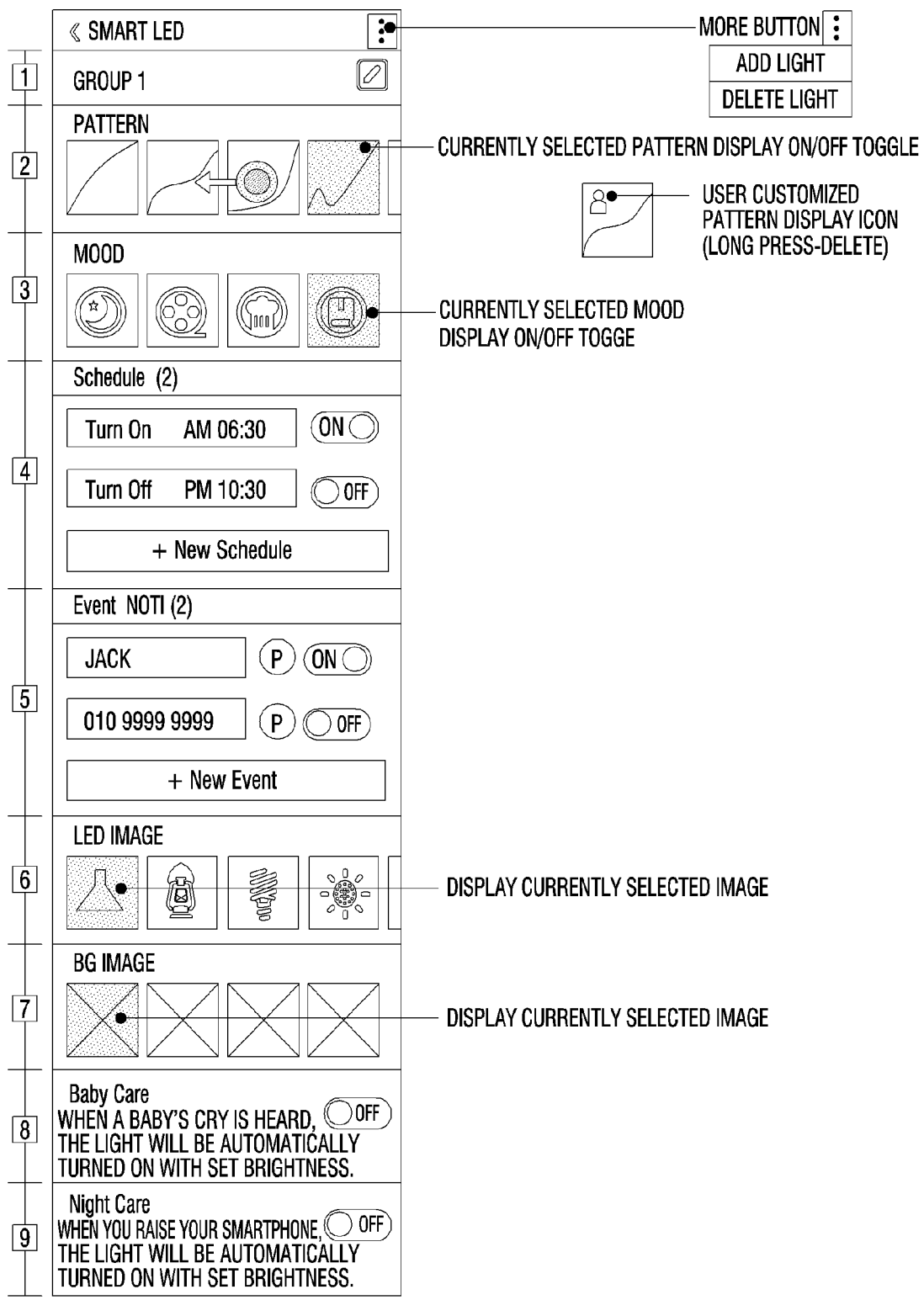
FIG. 16 is a view which illustrates a detailed page view of a list.

FIG. 16 is a view which illustrates a detailed page view of the list. The detailed page of FIG. 16 provides detailed information relating to individual or group LEDs, and the user may set respective setting values on each piece of the detailed information. For example, the user may set a pattern for changing dimming of a light in a predetermined form with time, and may set a light to inform of a phone call when a phone call is received from a specific person of a set phone number.

Detailed functions related to FIG. 16 are shown in Table 4 of FIGS. 94A and 94B.

FIG. 17 is a view which illustrates a quick panel screen. The quick panel screen displays lights which are added as favorites, for example, up to 4 lights, on a quick panel. In particular, in response to the user dragging down an upper area of the screen, the lights added as favorites may appear. View (b) of FIG. 17 shows a screen which displays the lights added as favorites in a landscape form.

Detailed functions related to FIG. 17 are shown in Table 5 of FIG. 95.

Figure 18:
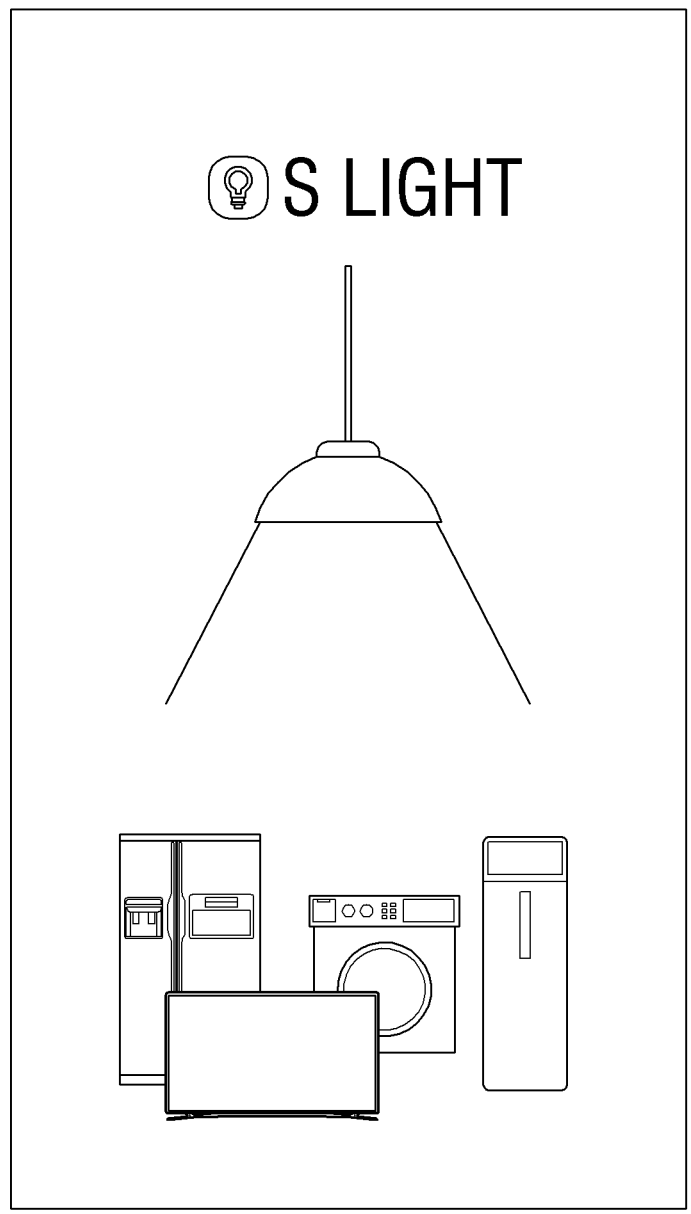

FIGS. 18 to 29L are diagrams which illustrate a driving screen of a light control. Referring to FIGS. 18 to 29L in conjunction with FIGS. 1 and 9, the user terminal 100 according to an exemplary embodiment may execute an application for controlling lights and may display a loading screen as shown in FIG. 18. During the loading operation, the user terminal 100 may share information which relates to the plurality of lighting devices 130'-1, 130'-2, and 130'-3 with the control device 120.

Figure 19A:
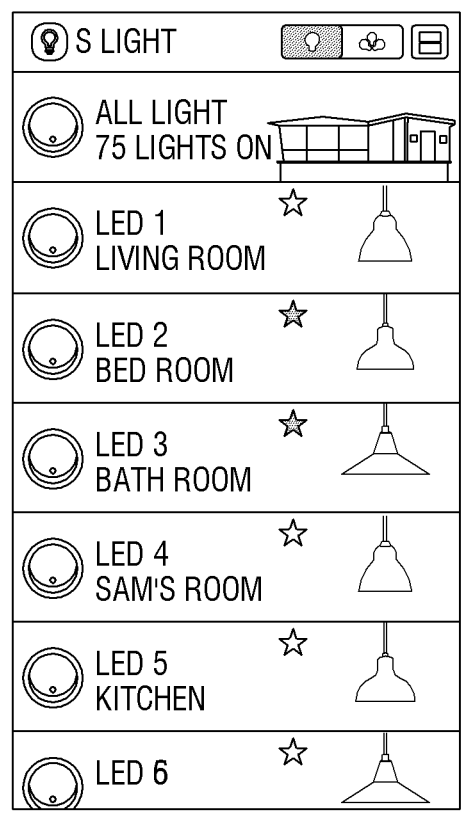
Figure 19B:
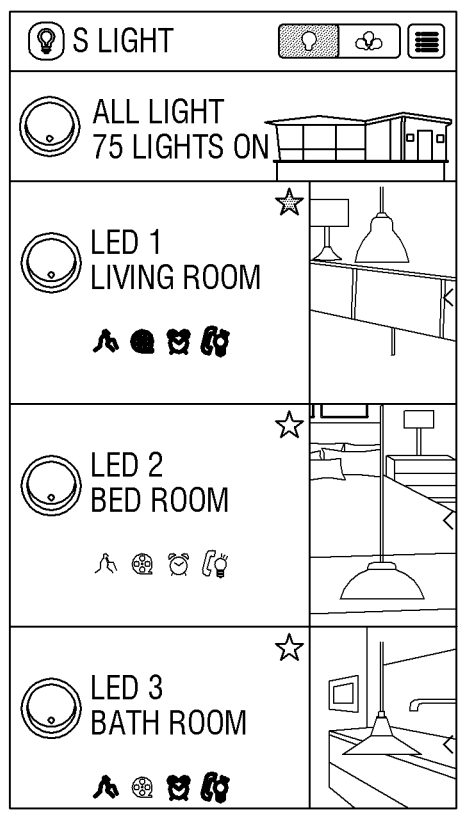
Figure 19C:
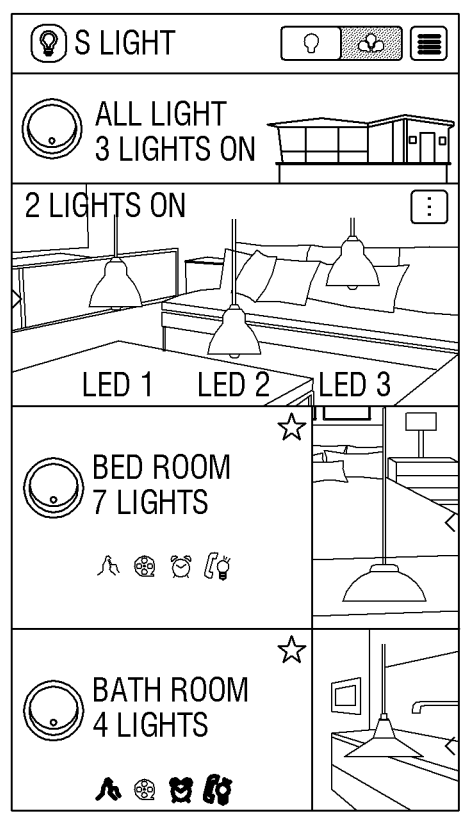

Thereafter, the user terminal 100 displays a main screen, as shown in FIG. 19A, FIG. 19B, and FIG. 19C. Detailed descriptions regarding this have been provided above with reference to FIGS. 13 and 14 and thus a redundant explanation is omitted.

Figure 20A:
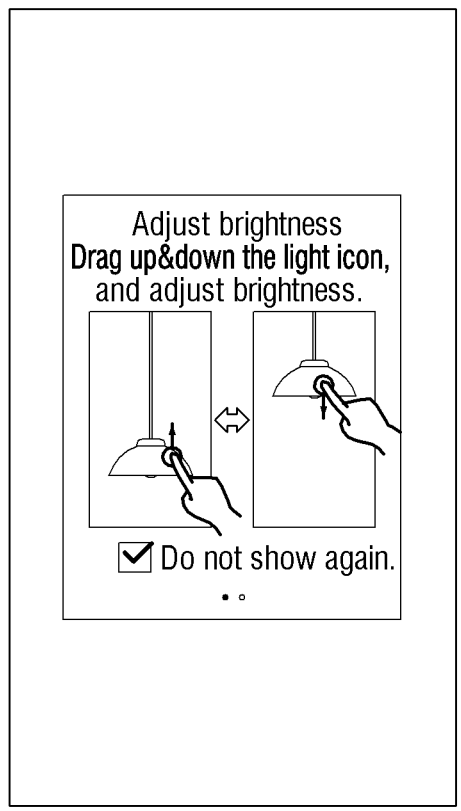
Figure 20B:
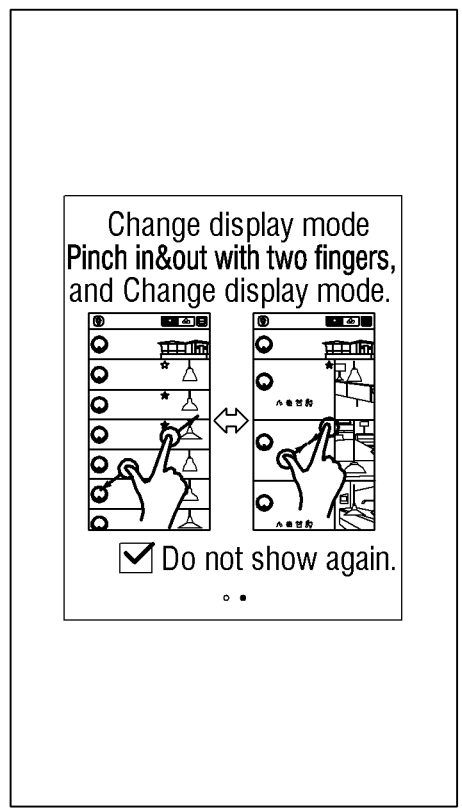

FIGS. 20A and 20B are views which illustrate a guide pop-up screen. The user terminal 100 displays information relating to whether brightness is to be adjusted or a display mode is to be changed in the form of a pop-up window, and enables the user to make a selection.

Figure 21A:
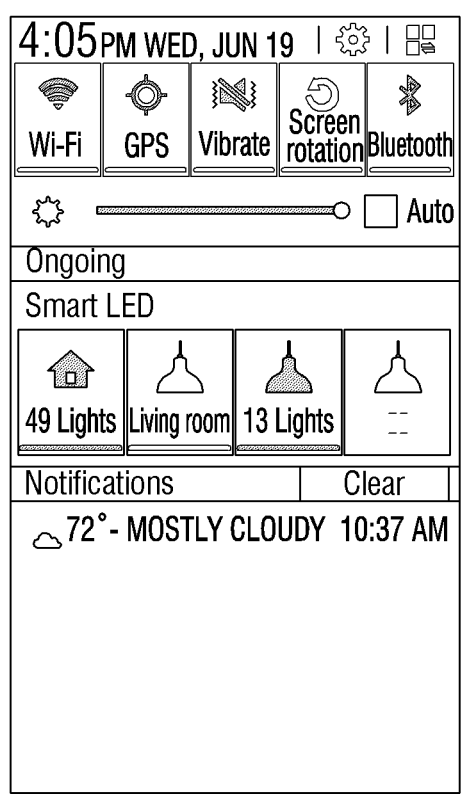
Figure 21B:
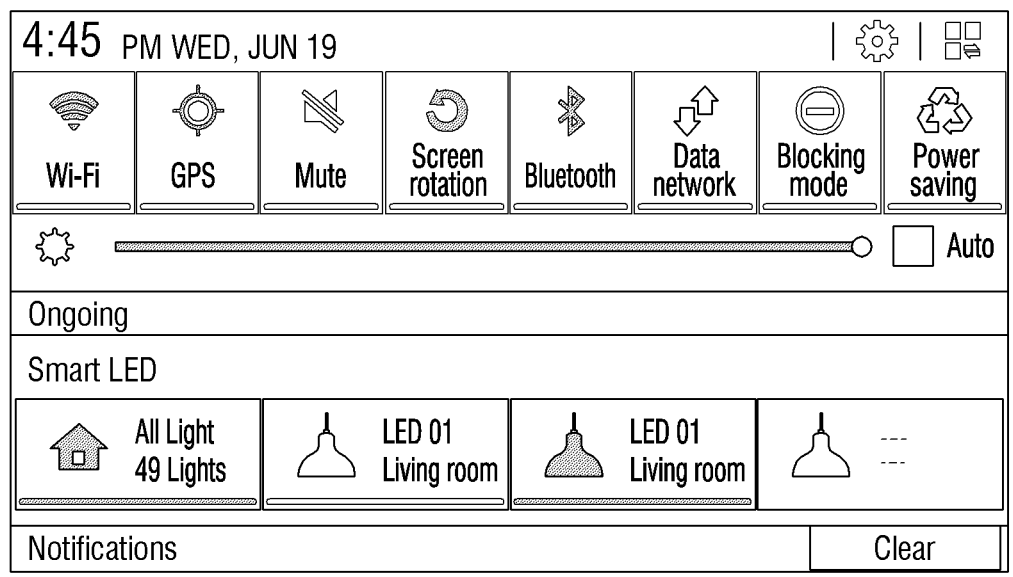

FIGS. 21A and 21B show a quick panel screen similar to that shown in FIG. 17. FIG. 21A shows a portrait view and FIG. 21B shows a landscape view.

Figure 22A:
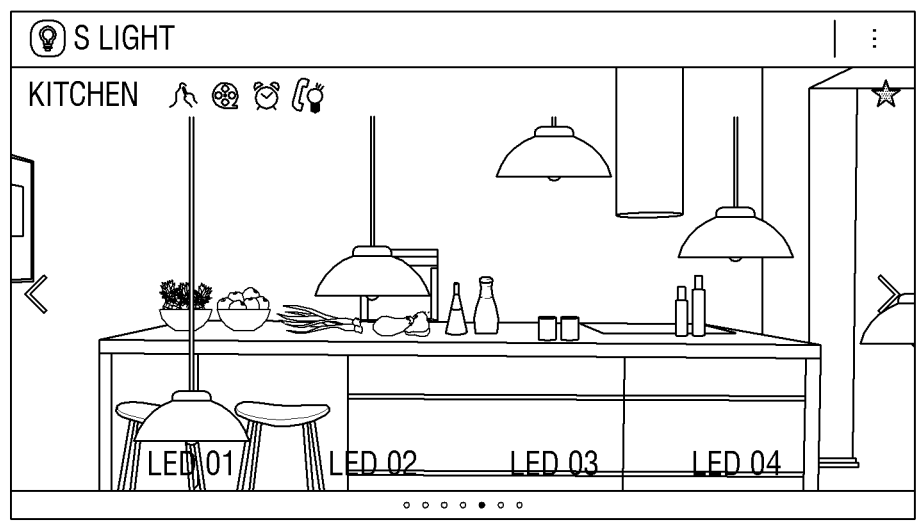
Figure 22B:
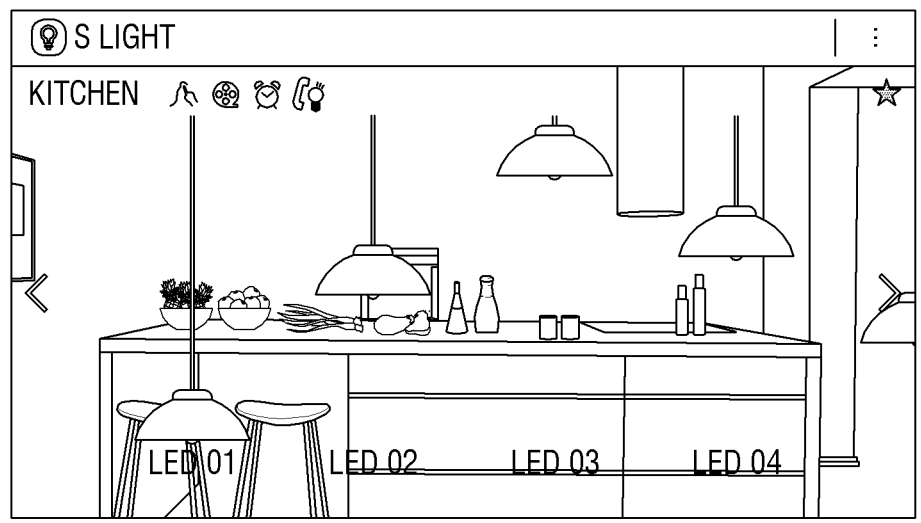
Figure 23:
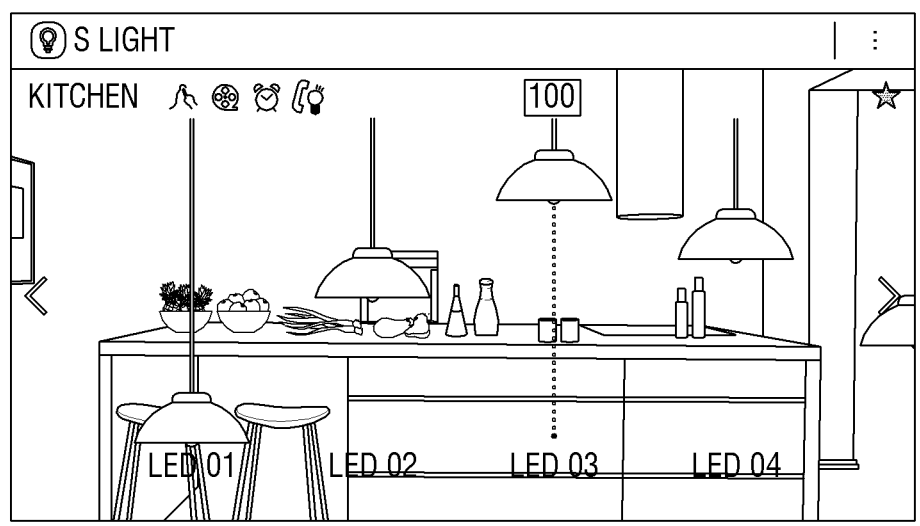

FIGS. 22A and 22B are views which illustrate a landscape view of individual lighting devices, and FIG. 23 illustrates a process of adjusting an icon of LED 03. The screen of FIG. 22A shows information indicating the current screen position on a lower portion.

Figure 24A:
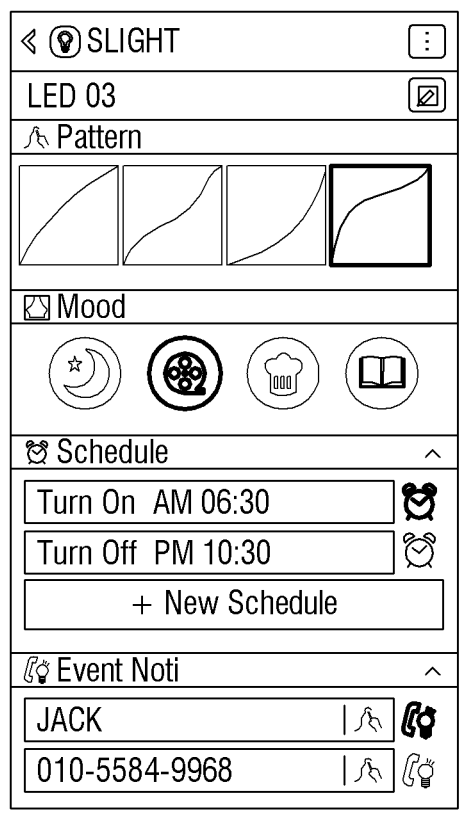
Figure 24B:
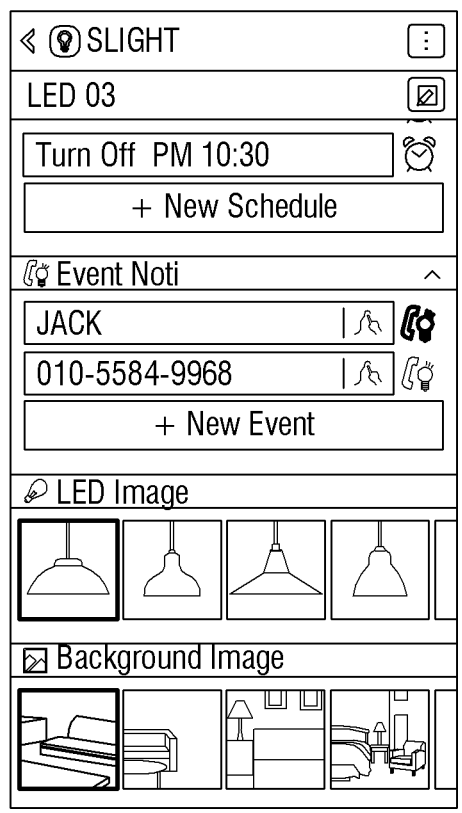
Figure 25A:
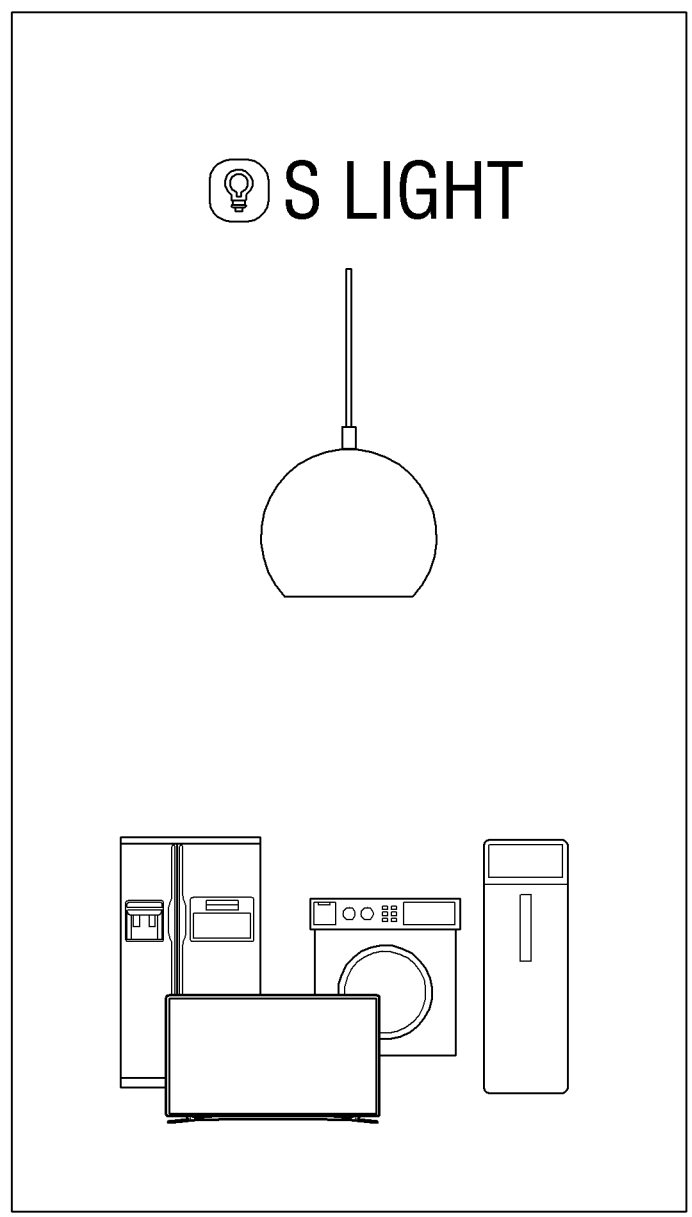
Figure 25B:
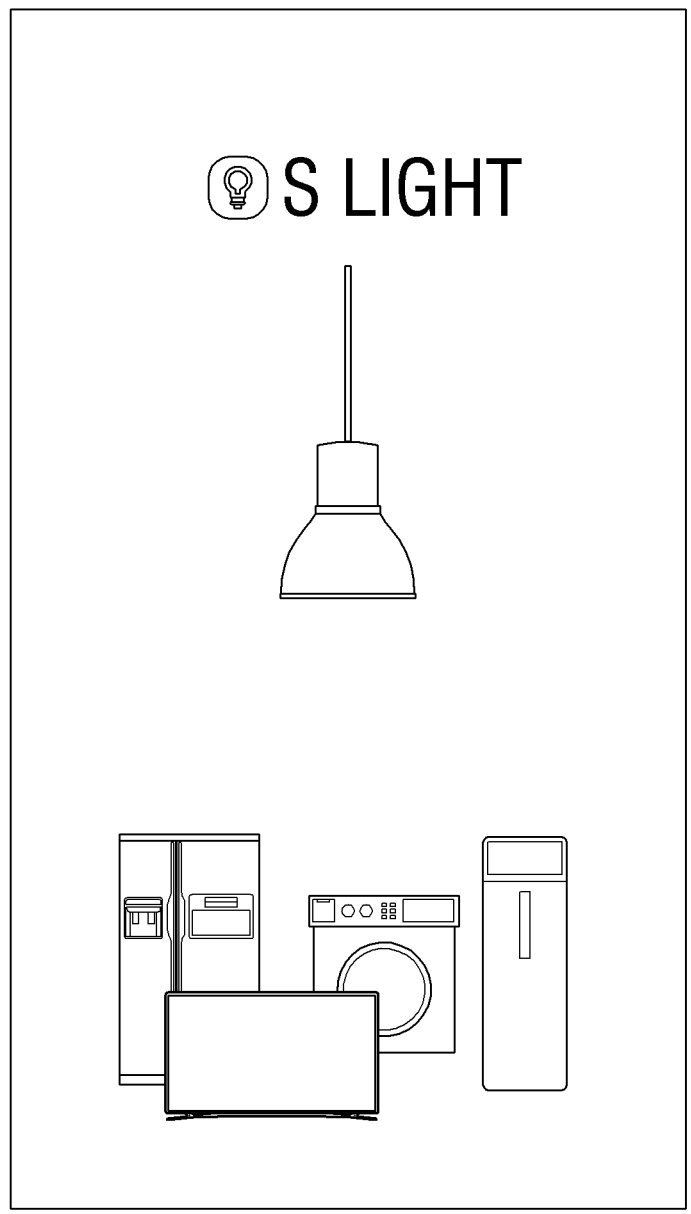
Figure 25C:
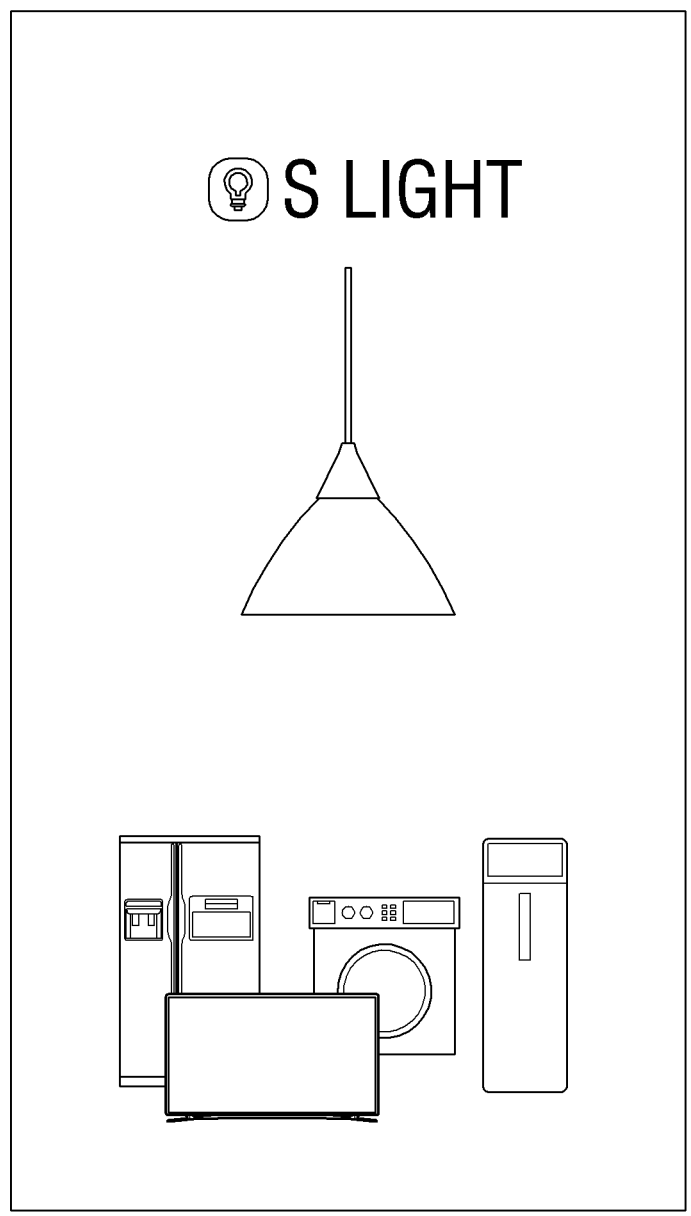
Figure 25D:
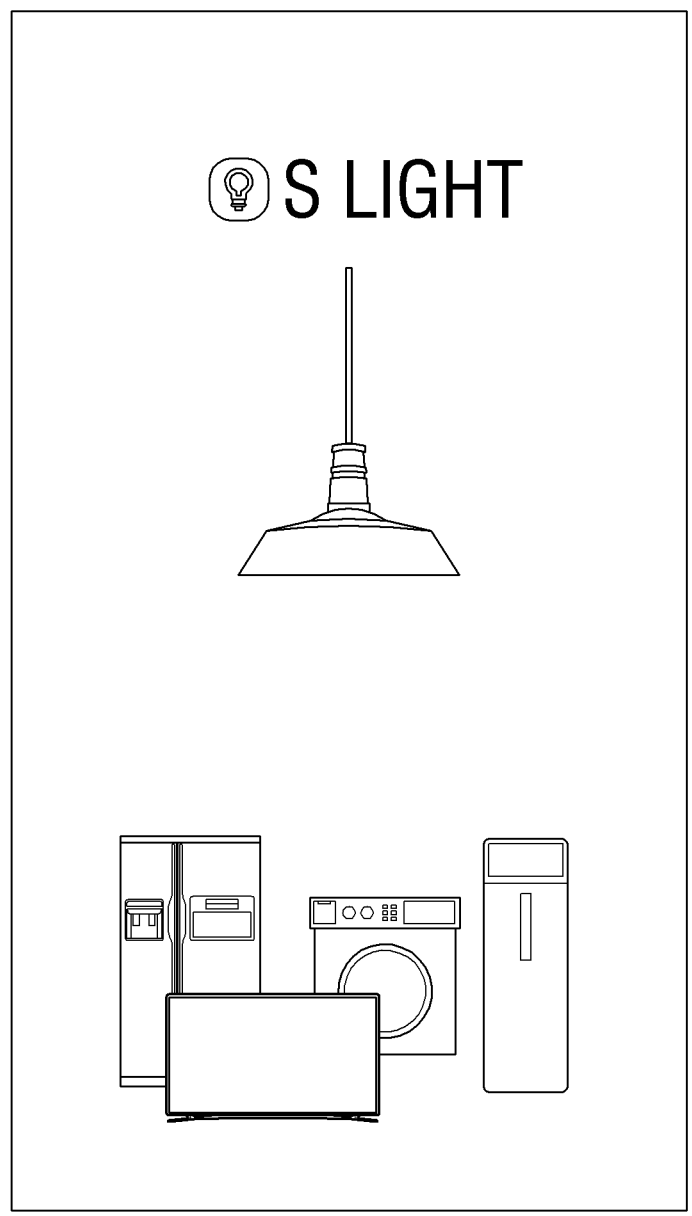
Figure 25E:
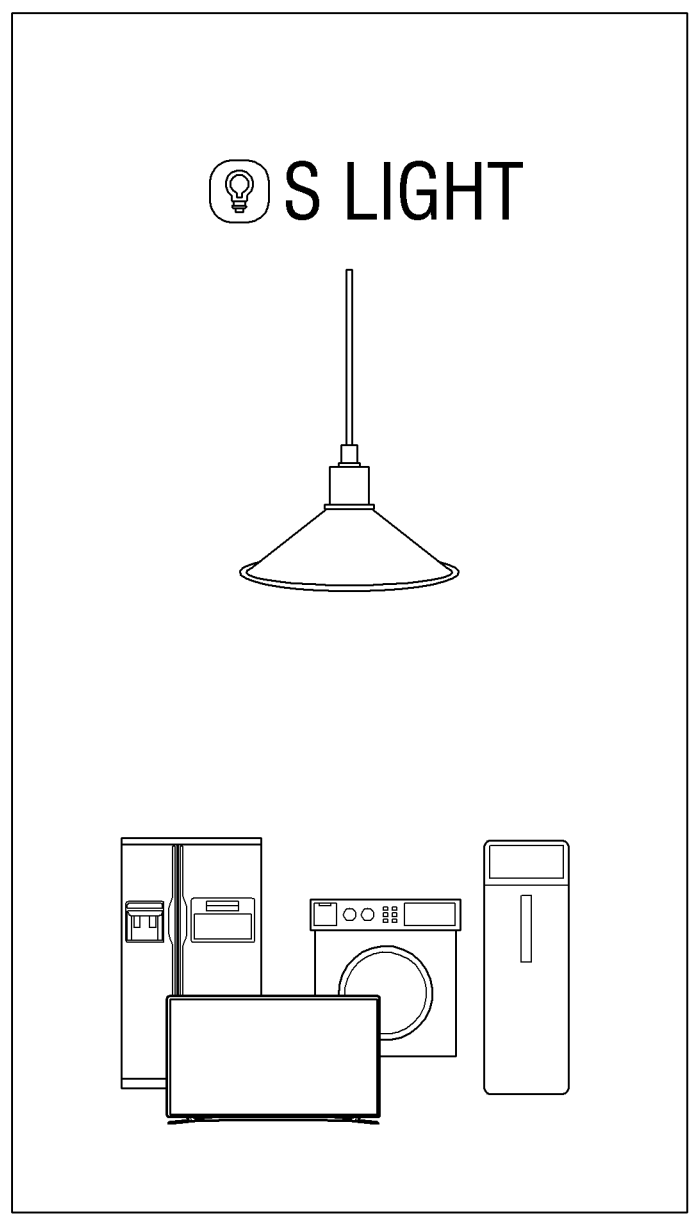
Figure 25F:
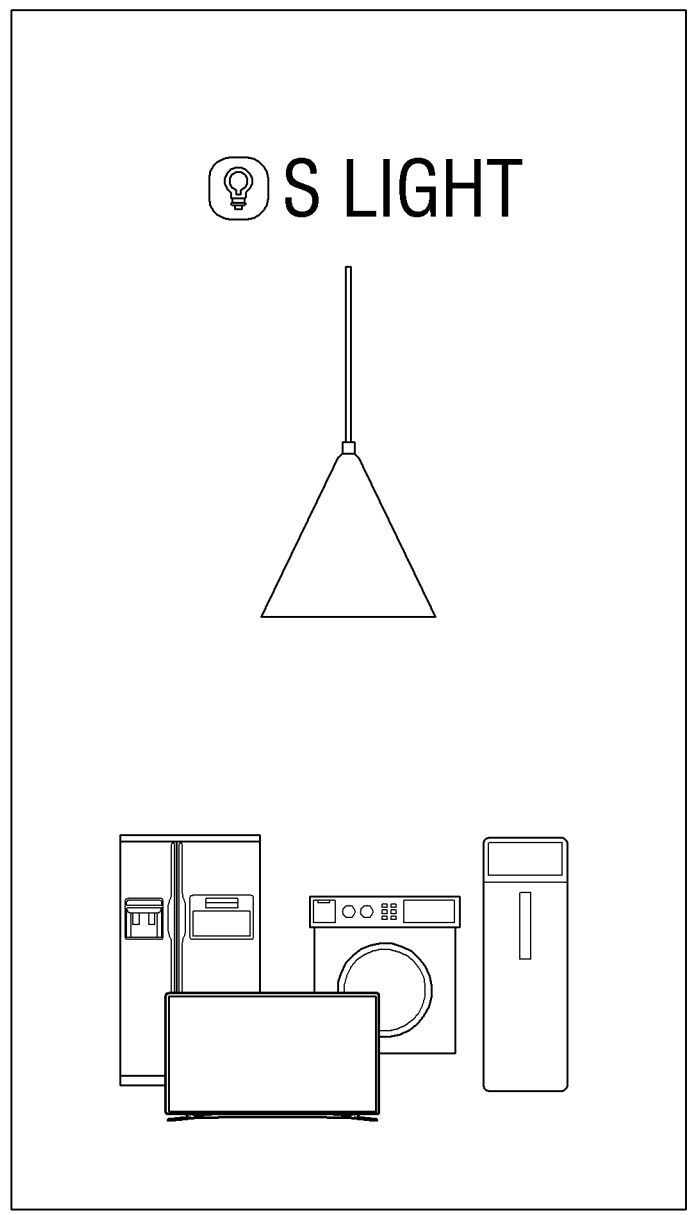
Figure 25G:
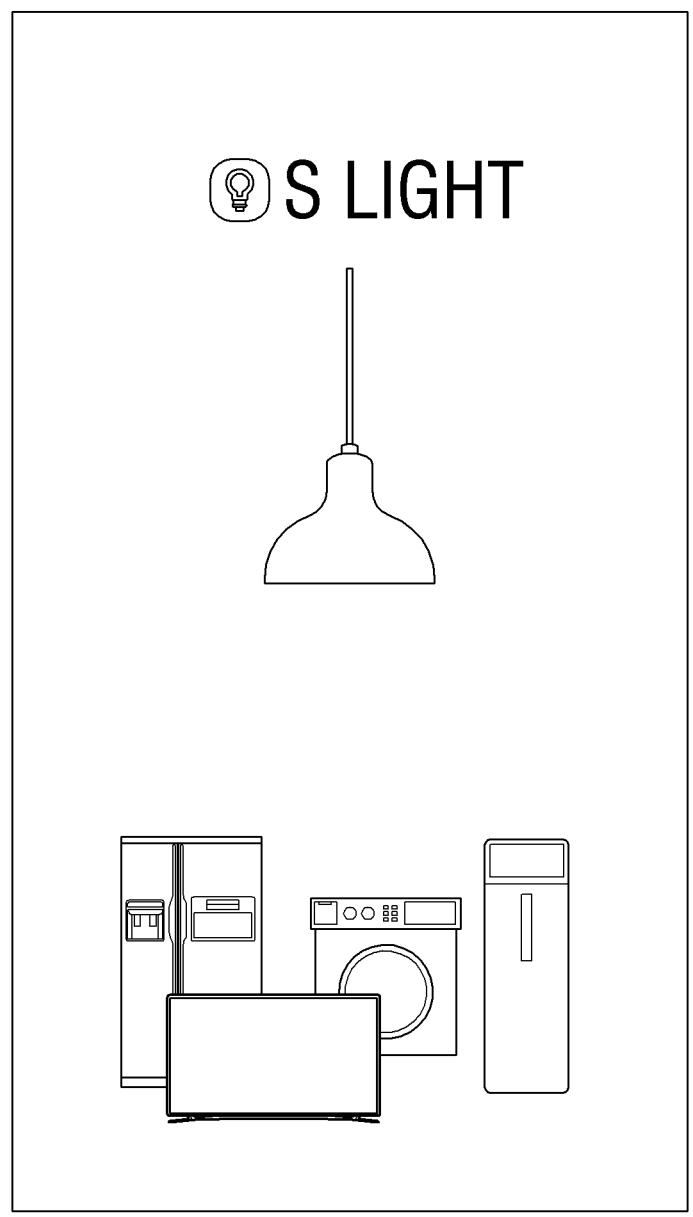
Figure 25H:
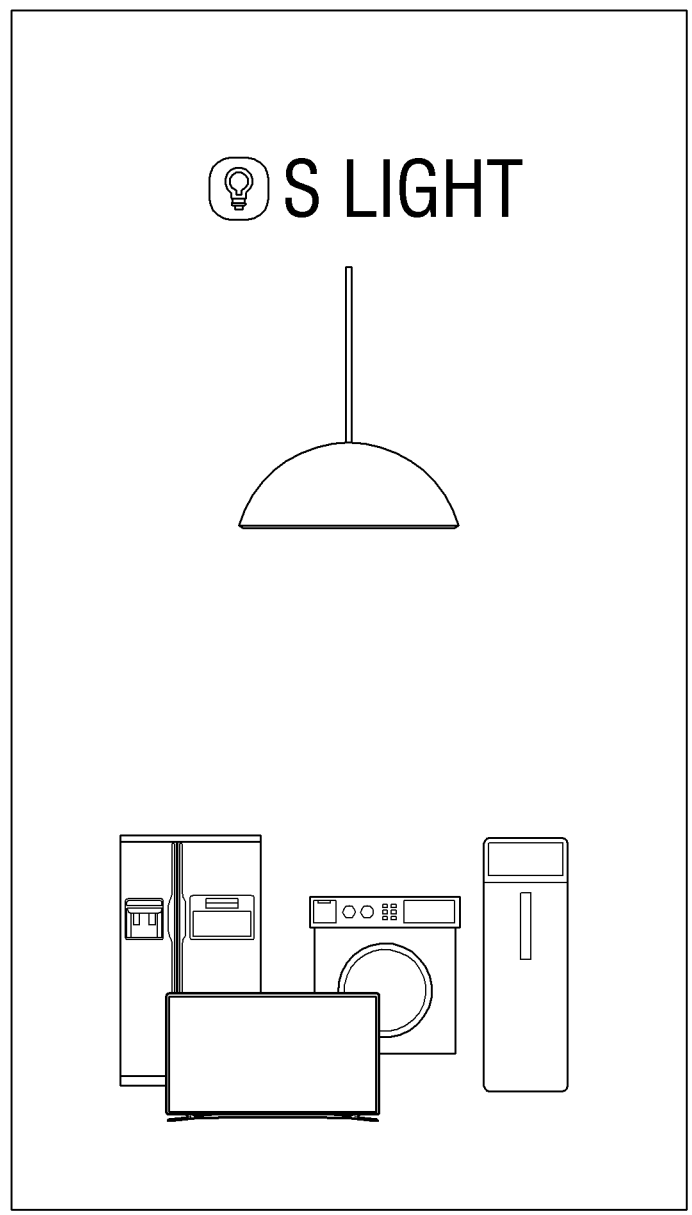
Figure 25I:
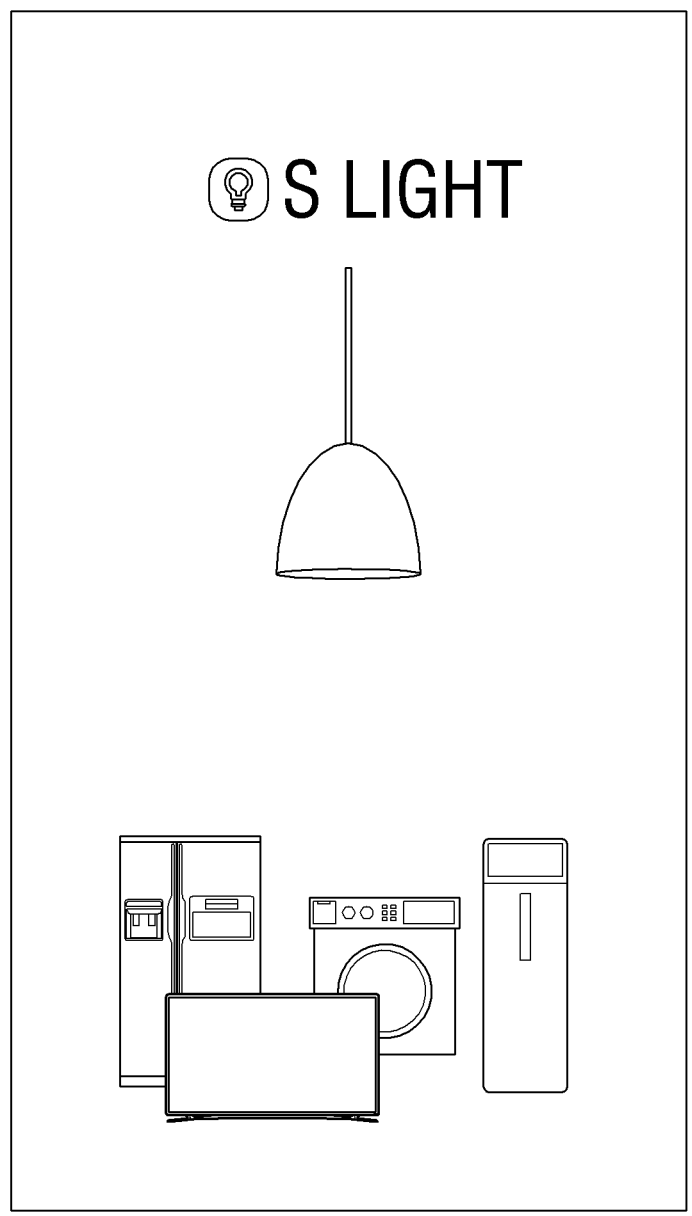
Figure 25J:
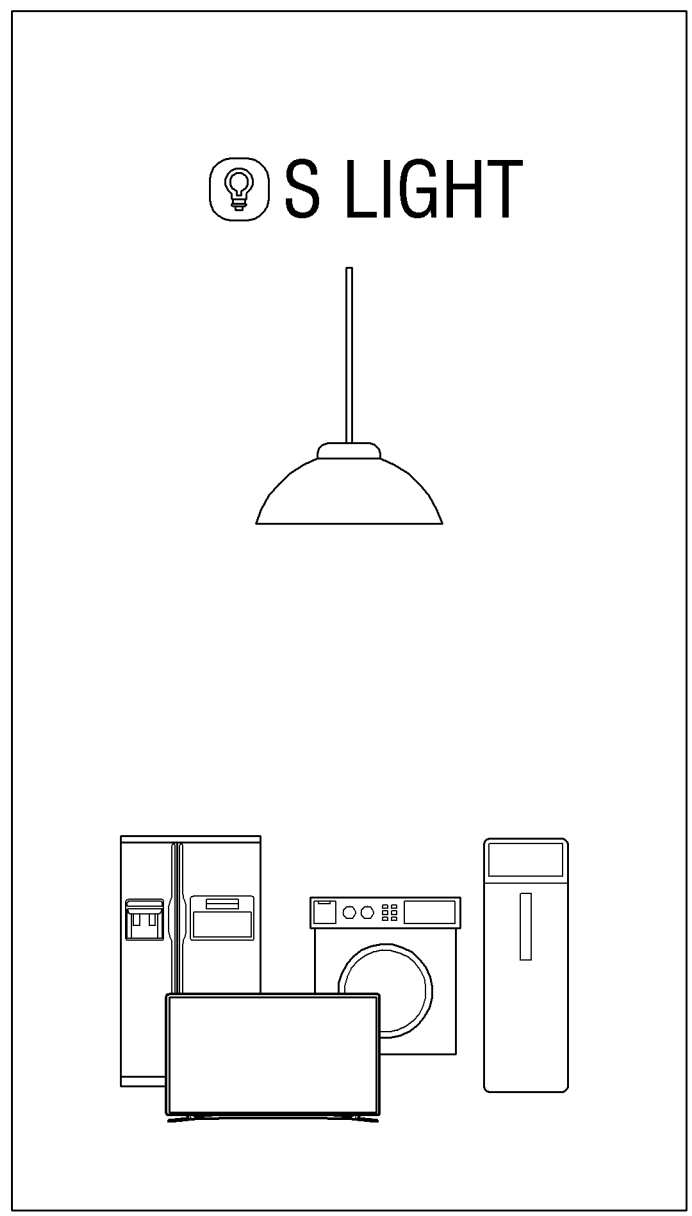
Figure 25K:
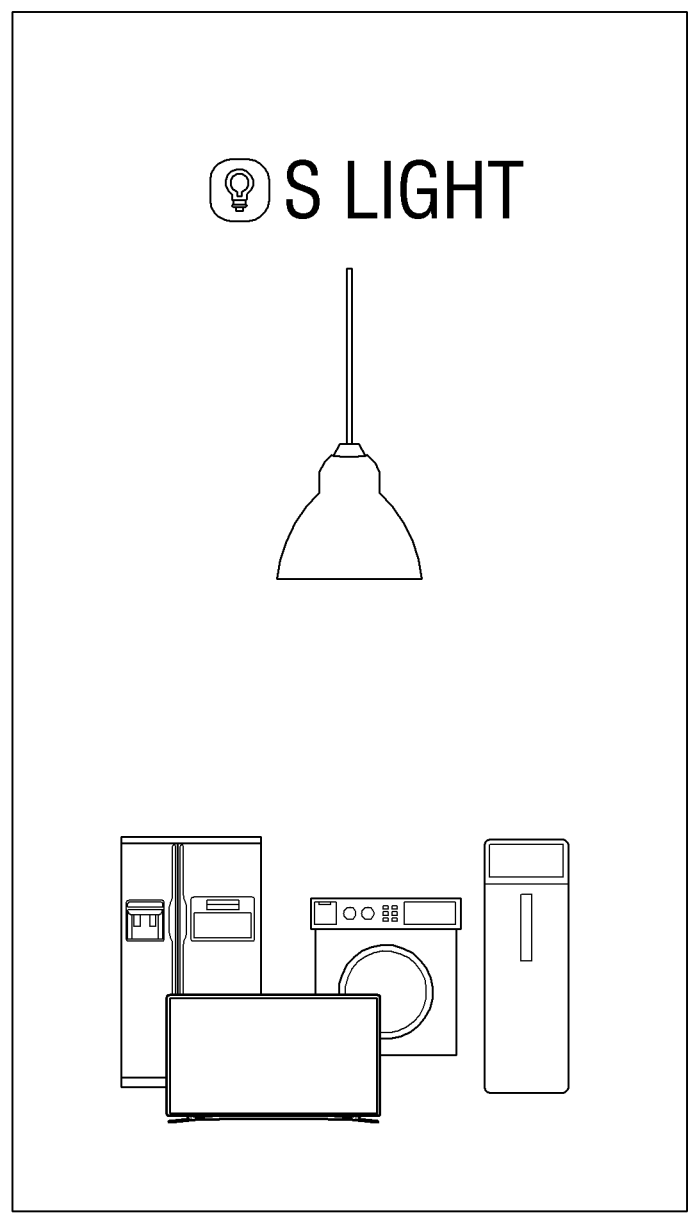
Figure 25L:
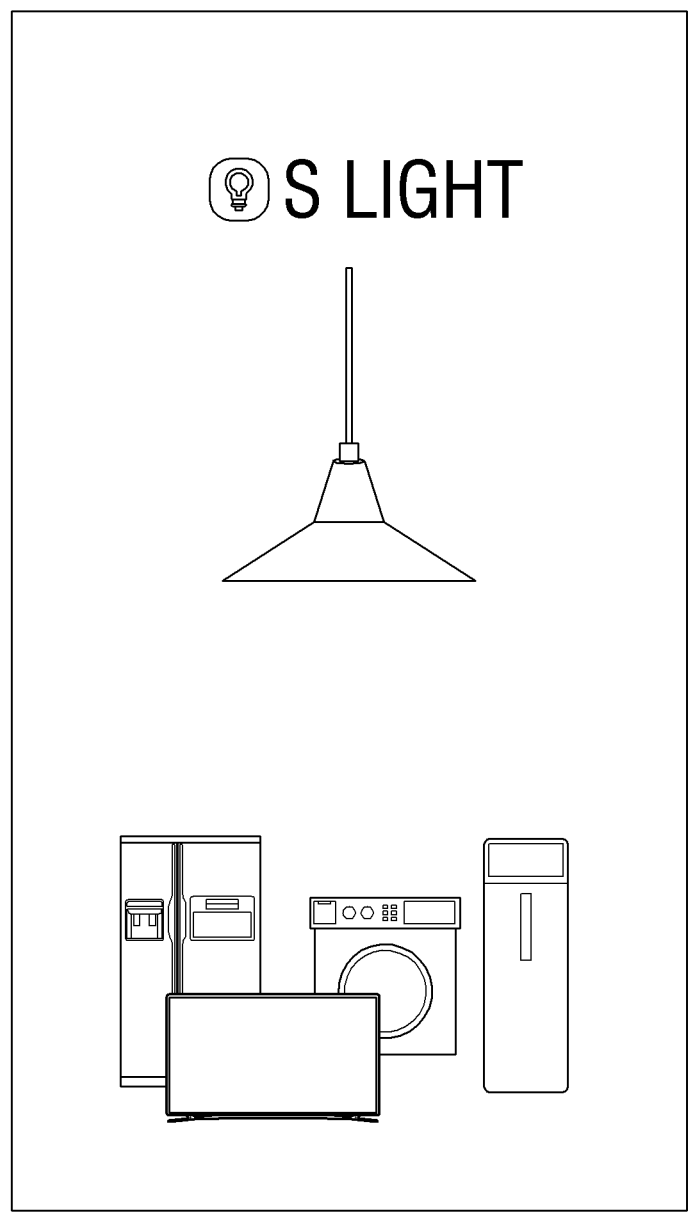

FIGS. 24A and 24B are views which illustrate a detailed setting screen similar to that shown in FIG. 16. Through the screen of FIGS. 24A and 24B, the user may set a variety of information, such as a pattern of a light, a mode of a set pattern, and schedule. Of course, the user may set a shape of a lampshade.

FIGS. 25A, 25B, 25C, 25D, 25E, 25F, 25G, 25H, 25I, 25J, 25K, and 25L are views showing various kinds of lampshades. The user may select a lampshade that the user prefers as a representative image of a light.

Figure 26A:
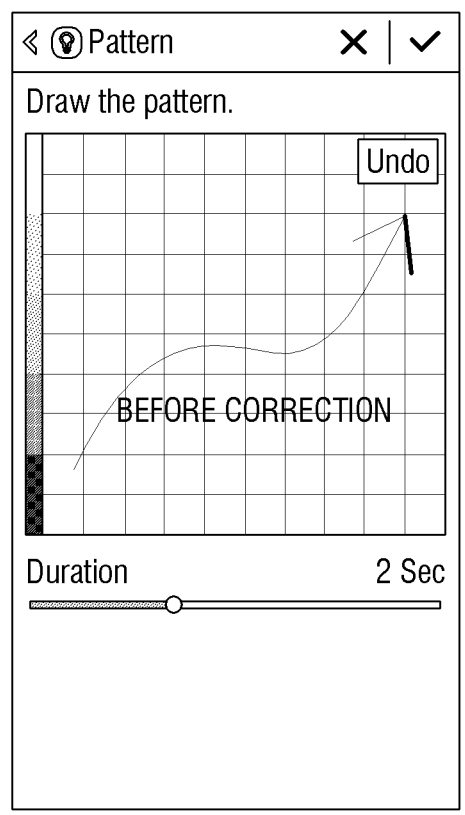
Figure 26B:
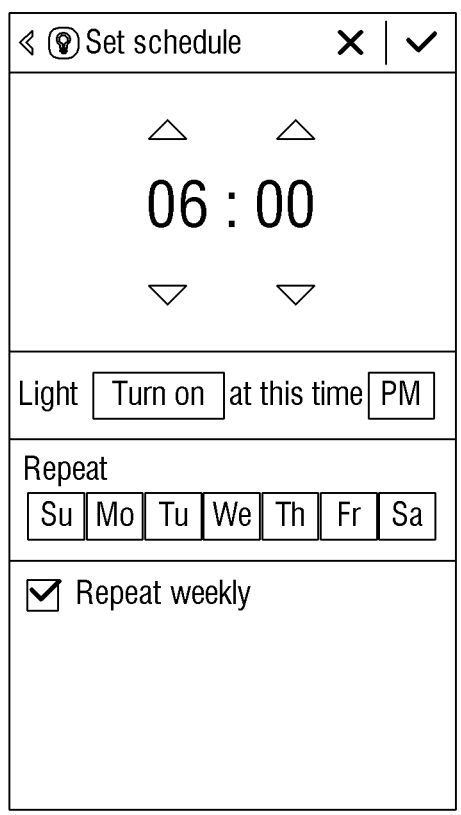
Figure 26C:
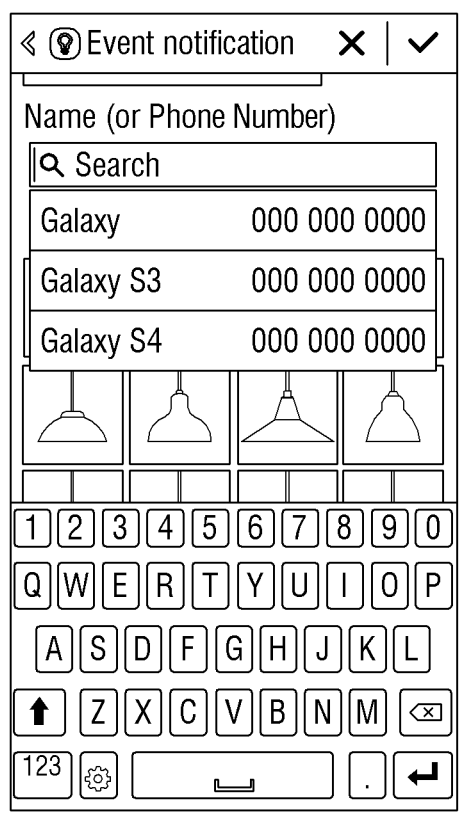

FIGS. 26A, 26B, and 26C are views which illustrate screens displayed in response to a specific item being selected in FIGS. 24A and 24B. In this case, the corresponding screens may be displayed in a pop-up form.

FIG. 26C shows a screen for searching for a phone number.

Figure 27A:
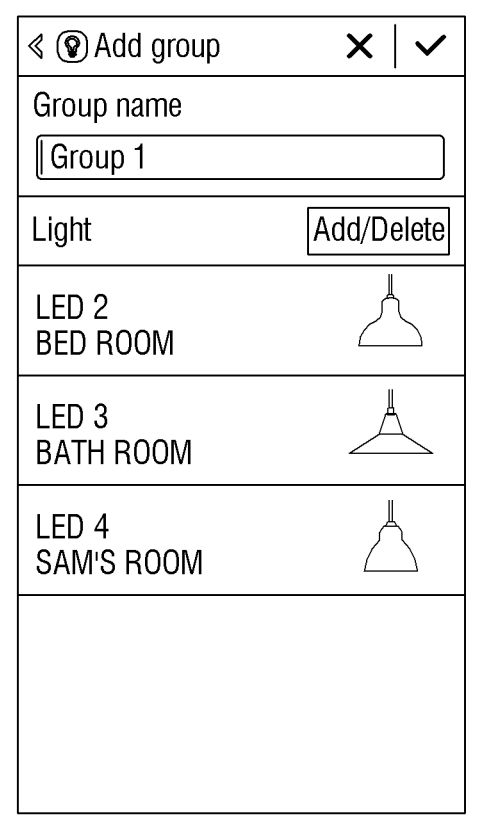
Figure 27C:
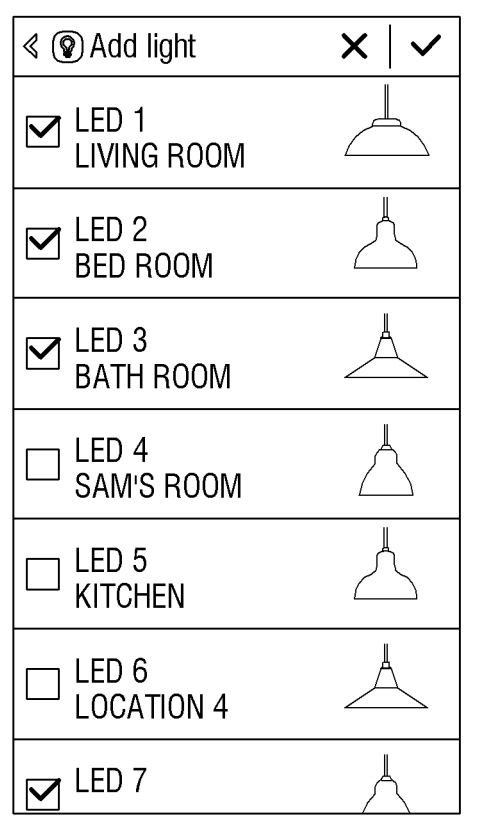

FIGS. 27A, 27B, and 27C show a screen for setting a group (FIG. 27A), a screen for setting individual lights (FIG. 27B), and a screen for adding a light (FIG. 27C).

Figure 28B:
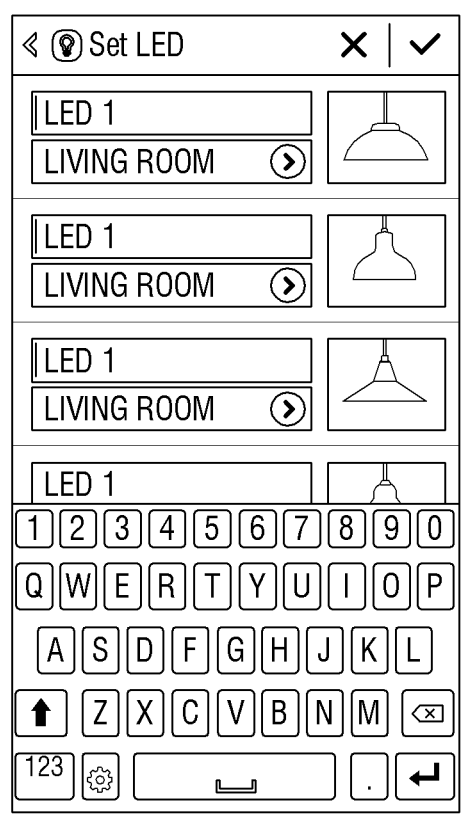
Figure 28C:
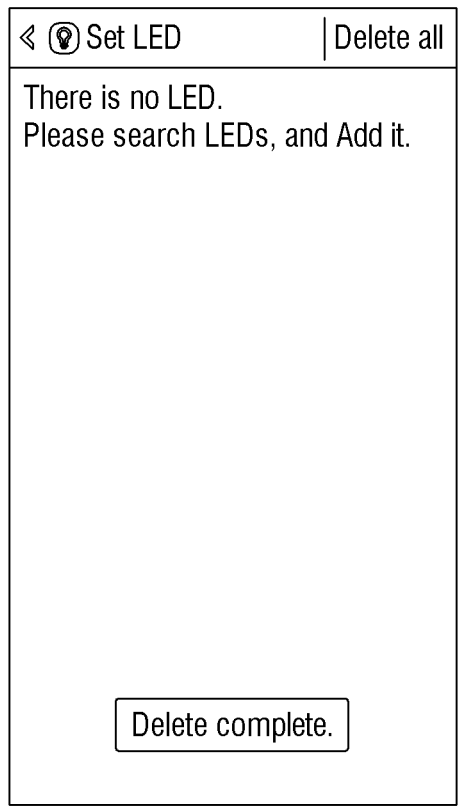
Figure 29A:
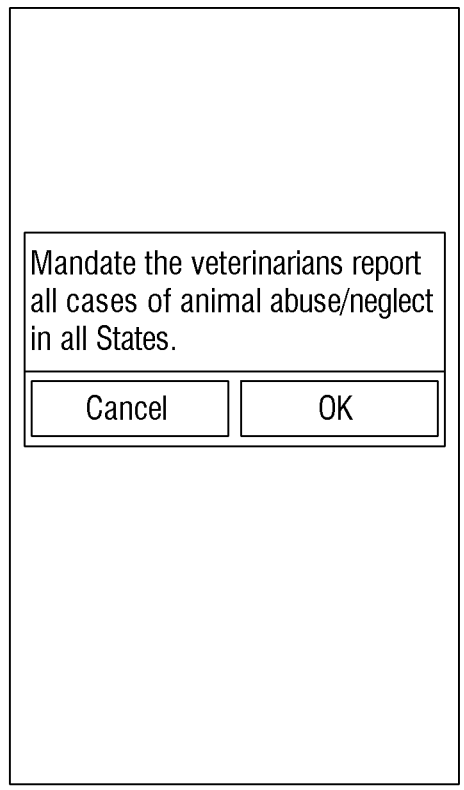
Figure 29B:
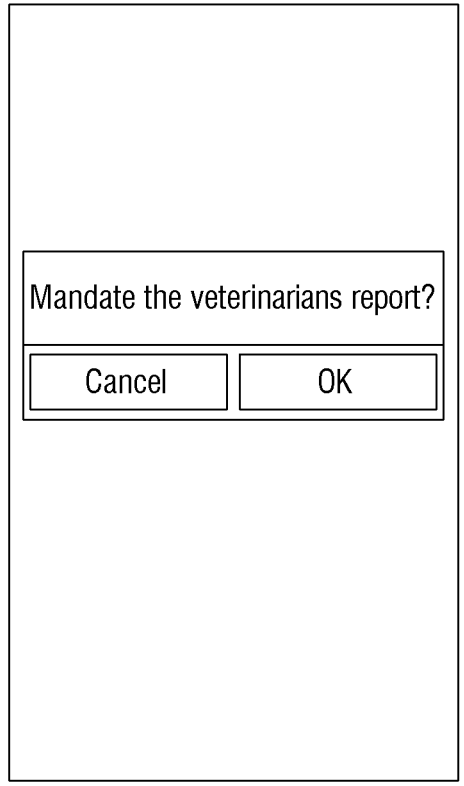
Figure 29C:
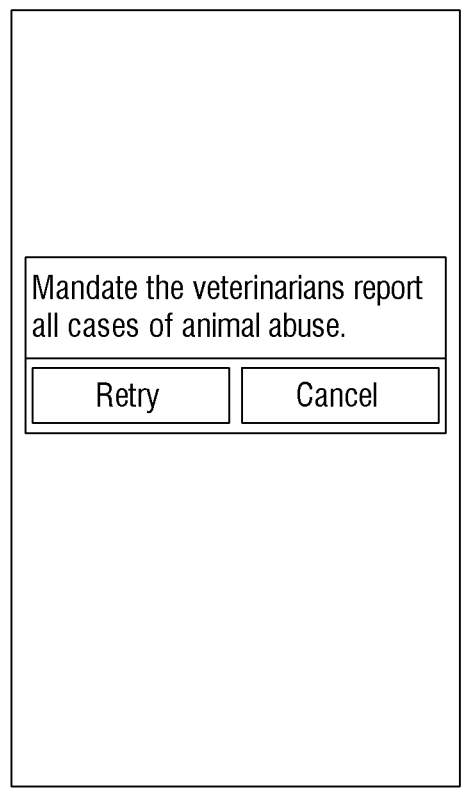
Figure 29D:
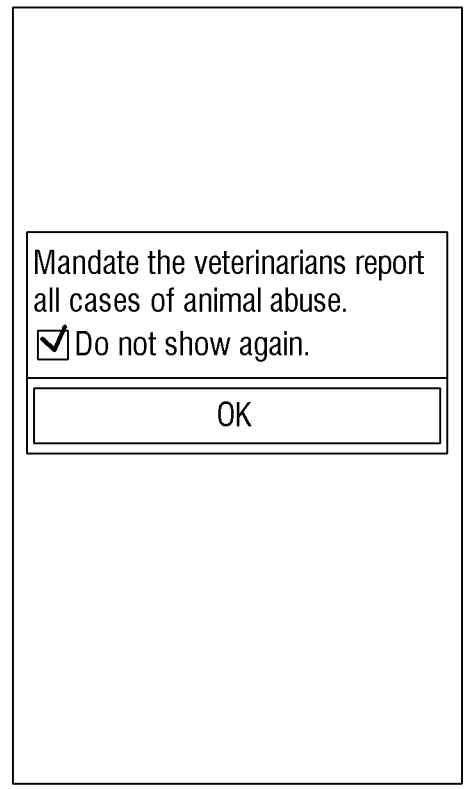
Figure 29E:
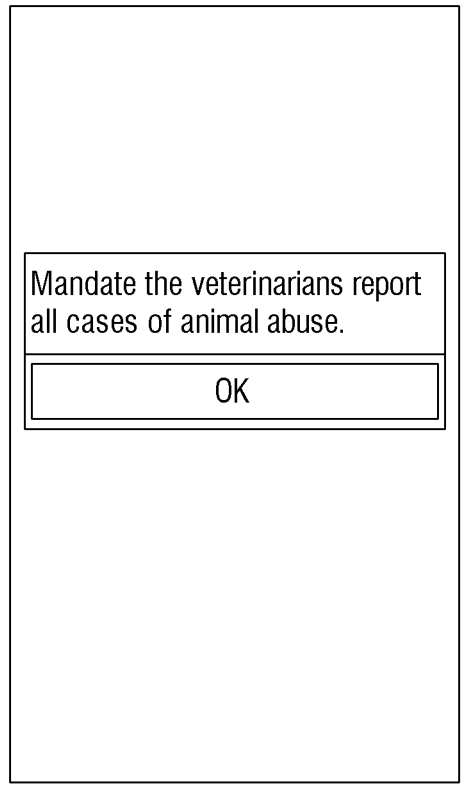
Figure 29F:
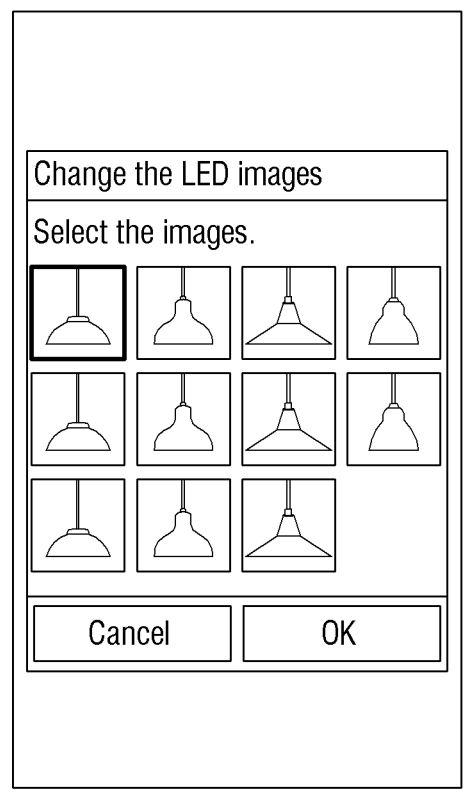
Figure 29G:
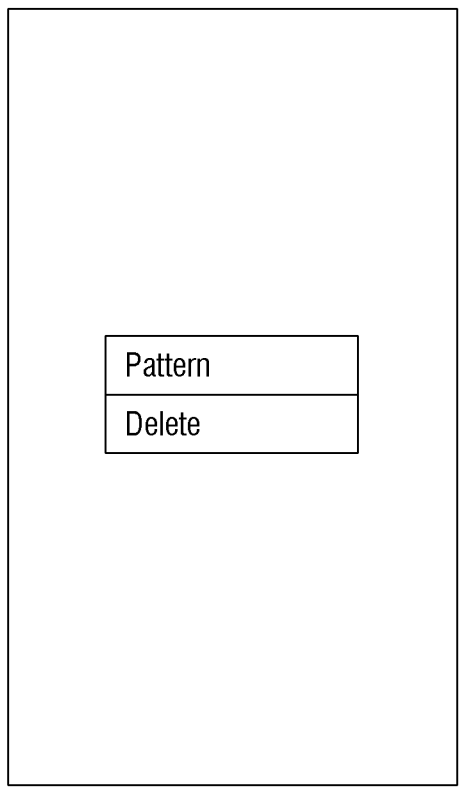
Figure 29H:
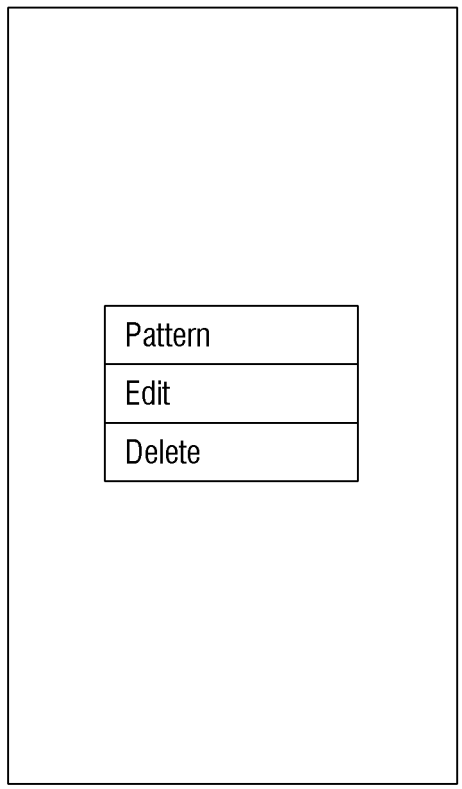
Figure 29I:
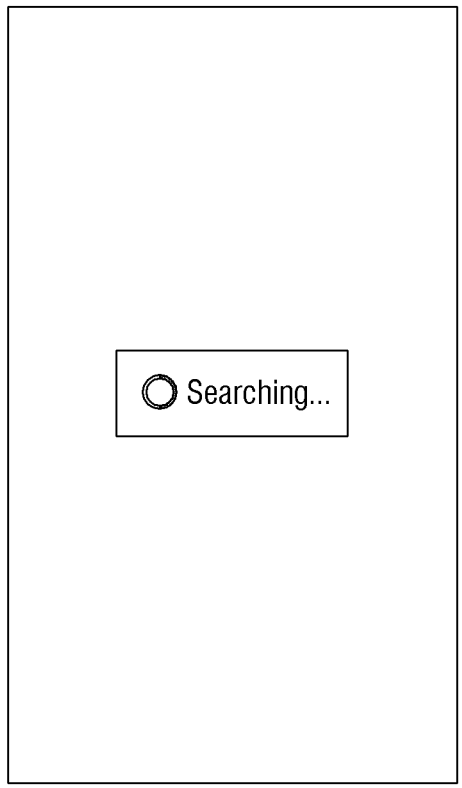
Figure 29J:
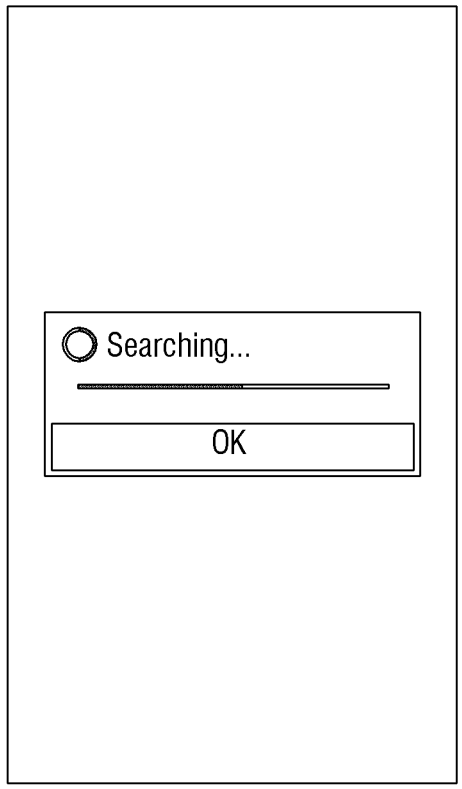
Figure 29K:
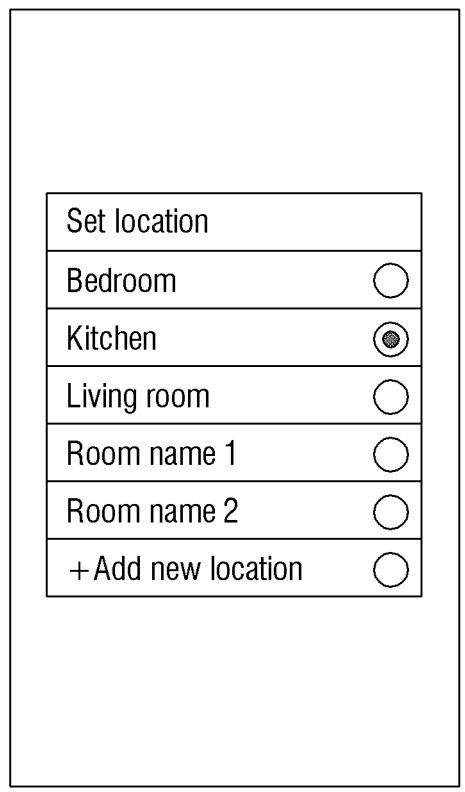
Figure 29L:
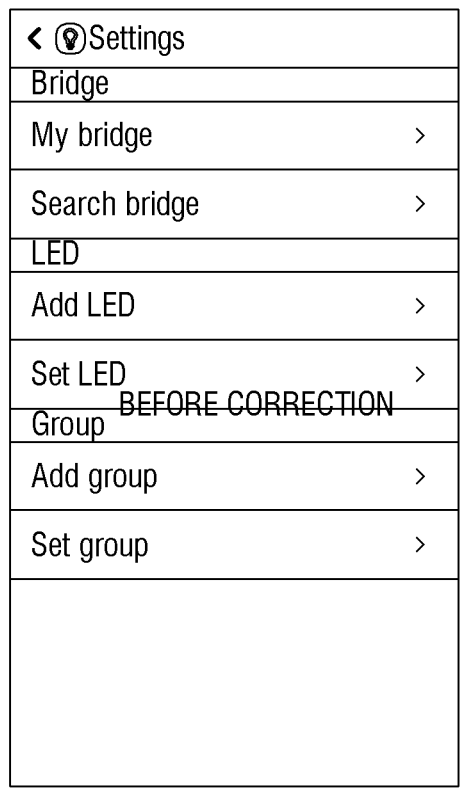

FIGS. 28A, 28B, and 28C show a screen for deleting individual LEDs (FIG. 28A), a screen for changing a name (FIG. 28B), and a screen for informing that there is no light to be deleted (FIG. 28C).

FIGS. 29A, 29B, 29C, 29D, 29E, 29F, 29G, 29H, 29I, 29J, 29K, and 29L are views which show various types of pop-up windows.

Figure 30:
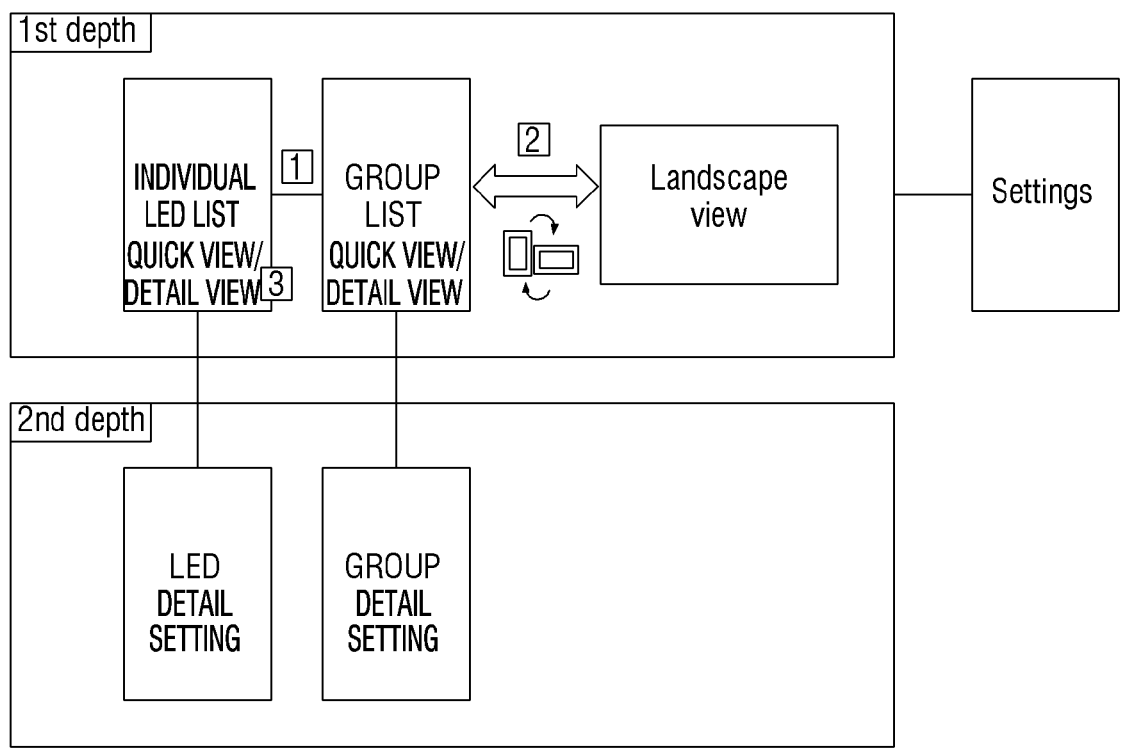
FIG. 30 is a view which illustrates a UI configuration, according to an exemplary embodiment.

FIG. 30 is a view which illustrates a UI configuration, according to an exemplary embodiment.

Referring to FIG. 30, a UI according to an exemplary embodiment may operate in two depths. In FIG. 30, item 1 indicates a parallel configuration like a tab configuration and indicates toggling as an [individual-group toggle button], and item 2 indicates changing to a landscape view in response to a group list being changed to a landscape view. In this case, the individual LED list is not changed to the landscape view. In addition, item 3 indicates that each list can provide two types of views, such as a quick view and a detail view.

FIGS. 31 to 41 are views which illustrate regulations of a UI briefly, according to an exemplary embodiment.

Prior to the description of the regulations of the UI, notation regulations are summarized as shown in Tables 6, 7, and 8 of FIGS. 96 to 98. Table 6 of FIG. 96 shows touch gestures, Table 7 of FIG. 97 shows touch feedback statuses, and Table 8 of FIG. 98 shows screen definition and operation flow.

Figure 31:
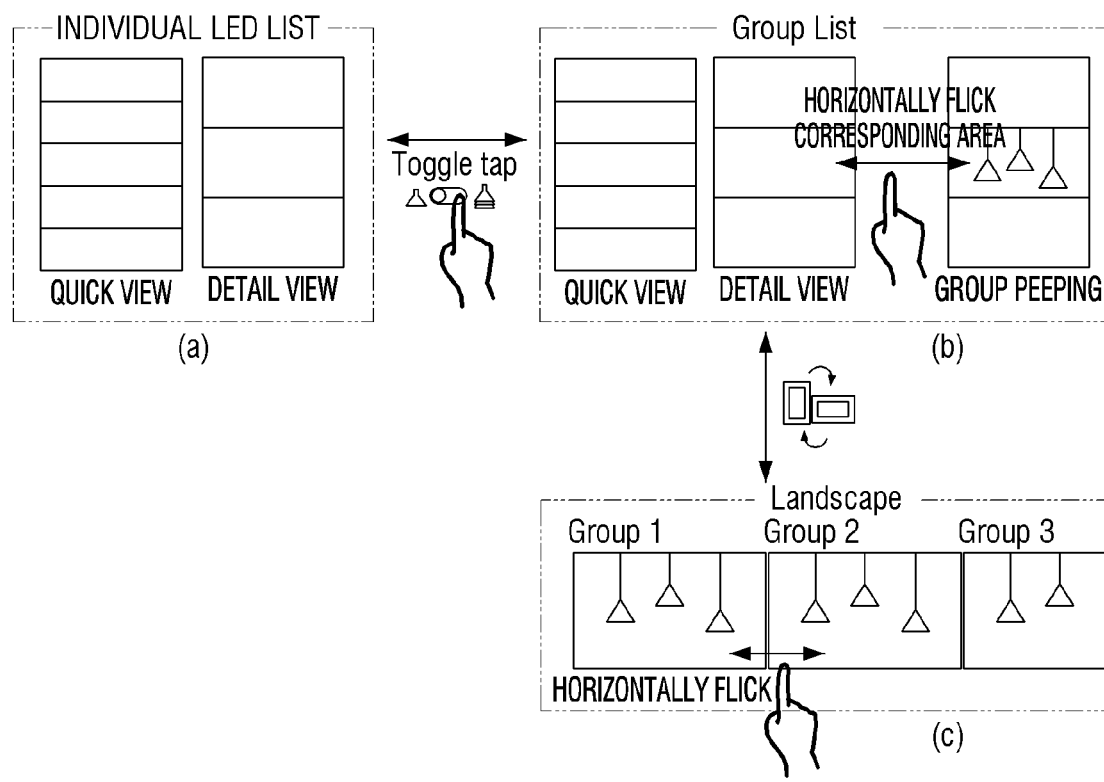

Views (a), (b), and (c) of FIG. 31 schematize FIG. 30. An individual LED list screen is displayed as shown in view (a) of FIG. 31, and then is changed to a group list screen by selecting a toggle button, as shown in view (b) of FIG. 31. In addition, by performing a horizontal flicking operation while a quick view/detail view screen is displayed as shown in view (b) of FIG. 31, a group peeping screen may be displayed. In addition, in response to the quick view/detail view screen being changed to a landscape view as shown in view (b), a screen shown in view (c) of FIG. 31 may be displayed. In this case, neighboring groups may be identified by performing the horizontal flicking operation.

Figure 32:
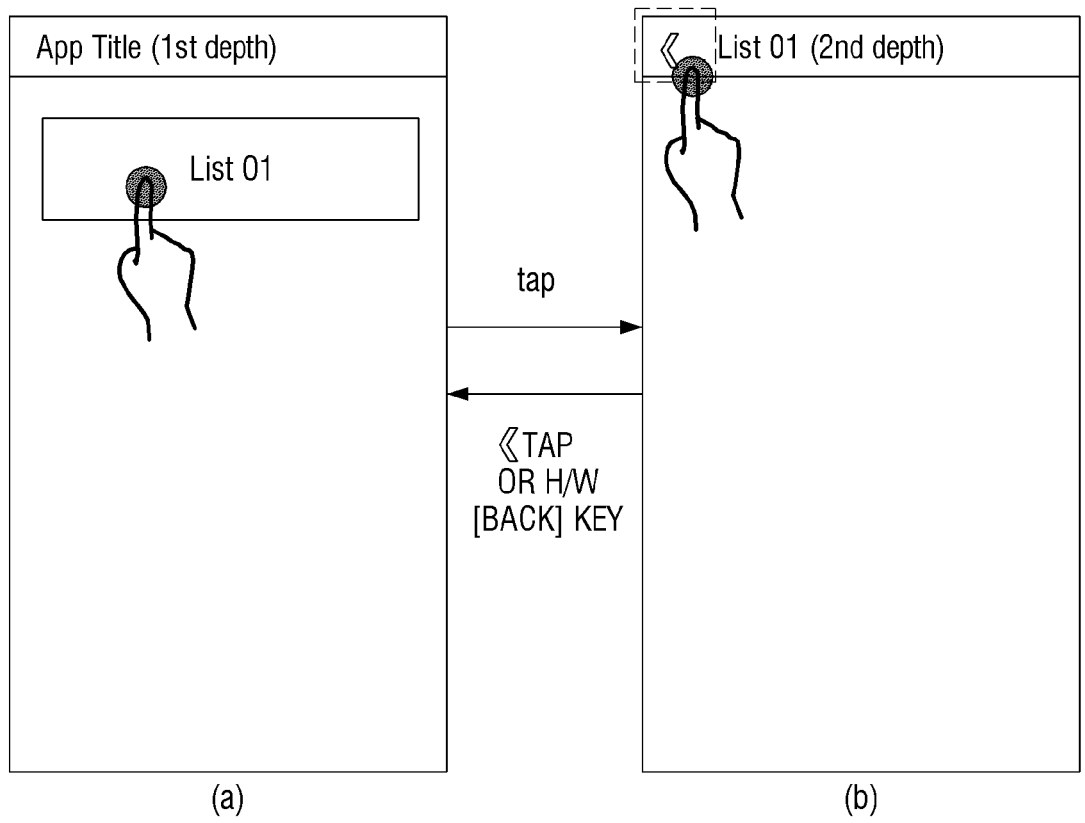

Views (a) and (b) of FIG. 32 illustrate an operation of changing to a previous screen. In particular, in response to the user tapping a list 01 item on the screen shown in view (a) of FIG. 32, a screen shown in view (b) of FIG. 32 is displayed. In response to the user tapping the screen shown in view (b) of FIG. 32 again, the screen shown in view (a) of FIG. 32 is restored.

FIGS. 33, 34, 35, and 36 illustrate various screens related to a pop-up window.

The pop-up window includes basic text information and a title area, a selectable GUI button, and an icon for distinguishing a situation may be added to the pop-up window according to a shape of the pop-up window. Generally, the pop-up window may use a pop-up window provided by the system, and a separate pop-up window may be added when there is no pop-up window, depending on a platform. In response to the pop-up window being created, a background area except for the pop-up window is inactivated. The pop-up window may be divided into a basic dialog pop-up window, an alert pop-up window, a list pop-up window, and a toast pop-up window.

Views (a), (b), (c), (d), (e), (f), and (g) of FIG. 33 illustrate the basic dialog pop-up window. The basic dialog pop-up window is a pop-up window for performing functions and includes a plurality of function lists, a selectable GUI button such as 'Yes/No', 'OK', etc., and an element having an interaction such as a text input area. In view (a) of FIG. 33, item 1 provides a title of a corresponding pop-up window, item 2 indicates an area for showing contents of the corresponding pop-up window and provides a message, a list, a text box, a seek bar, a spinner, etc. according to a kind of the pop-up window, and item 3 provides OK and Cancel. Depending on times, only OK may be provided.

Views (a) and (b) of FIG. 34 show an alert pop-up window. The alert pop-up window may be divided into two types based on a seriousness of a message. Most messages do not require a title, but a high danger work or a work including a potential data loss may use a dialog having a title. In views (a) and (b) of FIG. 34, item 1 indicates an area for showing contents of a corresponding pop-up window and provides a message, a list, a text box, a seek bar, a spinner, and any other suitable type of field, according to a kind of the pop-up window, and item 3 provides OK and Cancel. Depending on times, only OK may be provided. Item 3 indicates that a highly important pop-up window which should be notified to the user may use an icon.

Views (a) and (b) of FIG. 35 show a list pop-up window. The list pop-up window is used when the user is allowed to select only one. Accordingly, a button is not provided. In response to an area other than the pop-up window being selected, the pop-up window is terminated. In views (a) and (b) of FIG. 35, item 1 provides a title of a corresponding pop-up window, and item 2 is an area for showing contents of the corresponding pop-up window.

Views (a), (b), (c), and (d) of FIG. 36 show a toast pop-up window. The toast pop-up window is used when simple feedback is provided in the form of a small toast pop-up window. A toast notice is a message which is provided in the form of a pop-up window on a surface of a window. The toast fills a space required by a message, and a user's current action is interactive and is provided as if it can be seen. The notice may automatically appear and disappear and an interaction in the pop-up window is not allowed.

Figure 37:
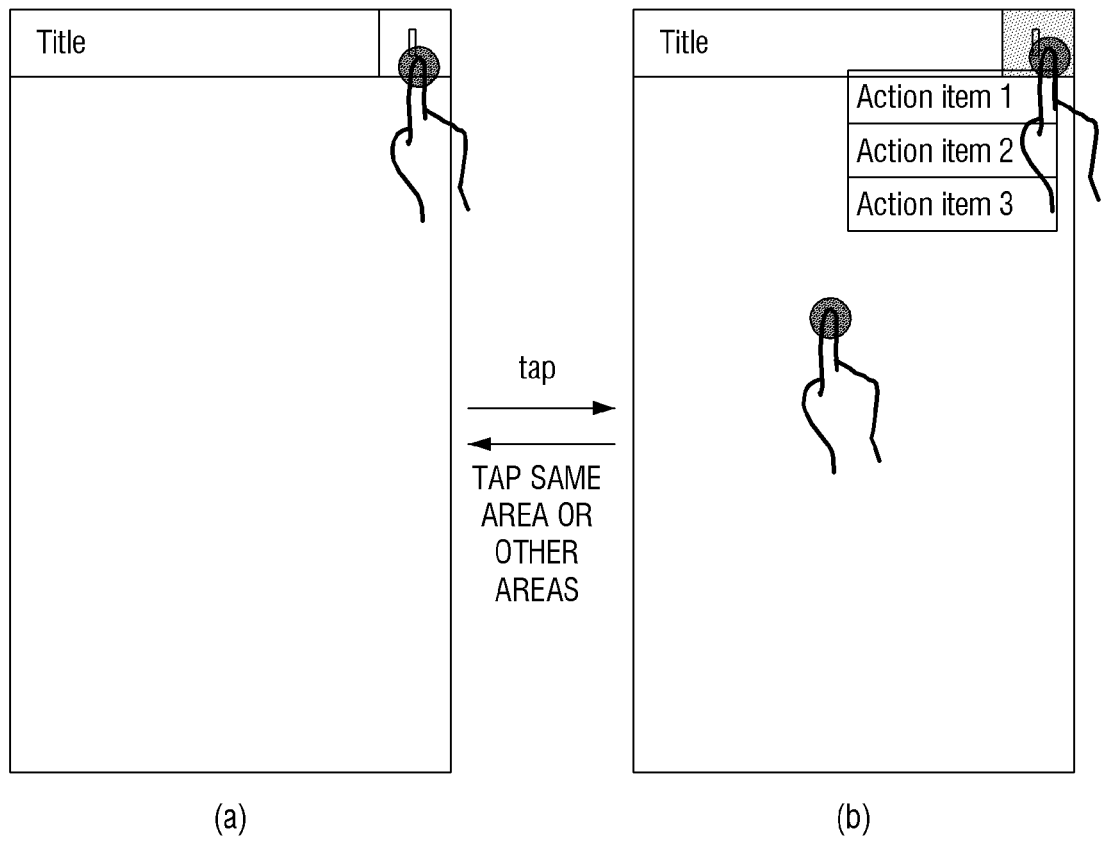

FIG. 37 illustrates a screen which shows a menu button as a UI element. As shown in views (a) and (b) of FIG. 37, a function which can be performed in a corresponding page may be provided as a menu button.

FIG. 38 illustrates a screen showing a scroll as a UI element. The scroll indicates the whole width and height lengths of a corresponding page, and may serve as an indicator.

Figure 39:
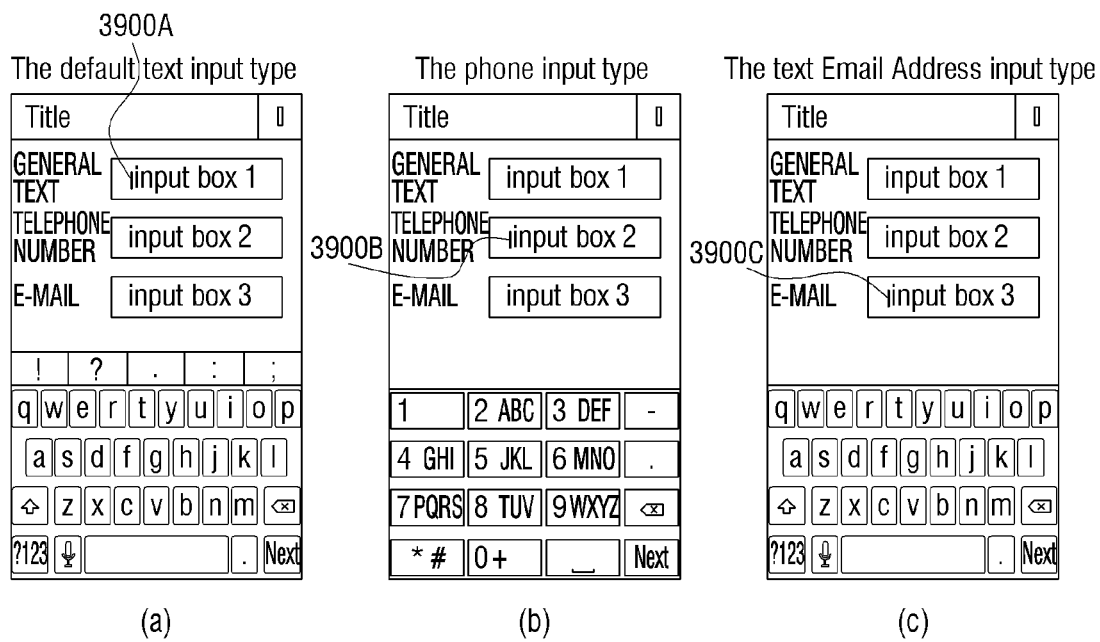
Figure 40:
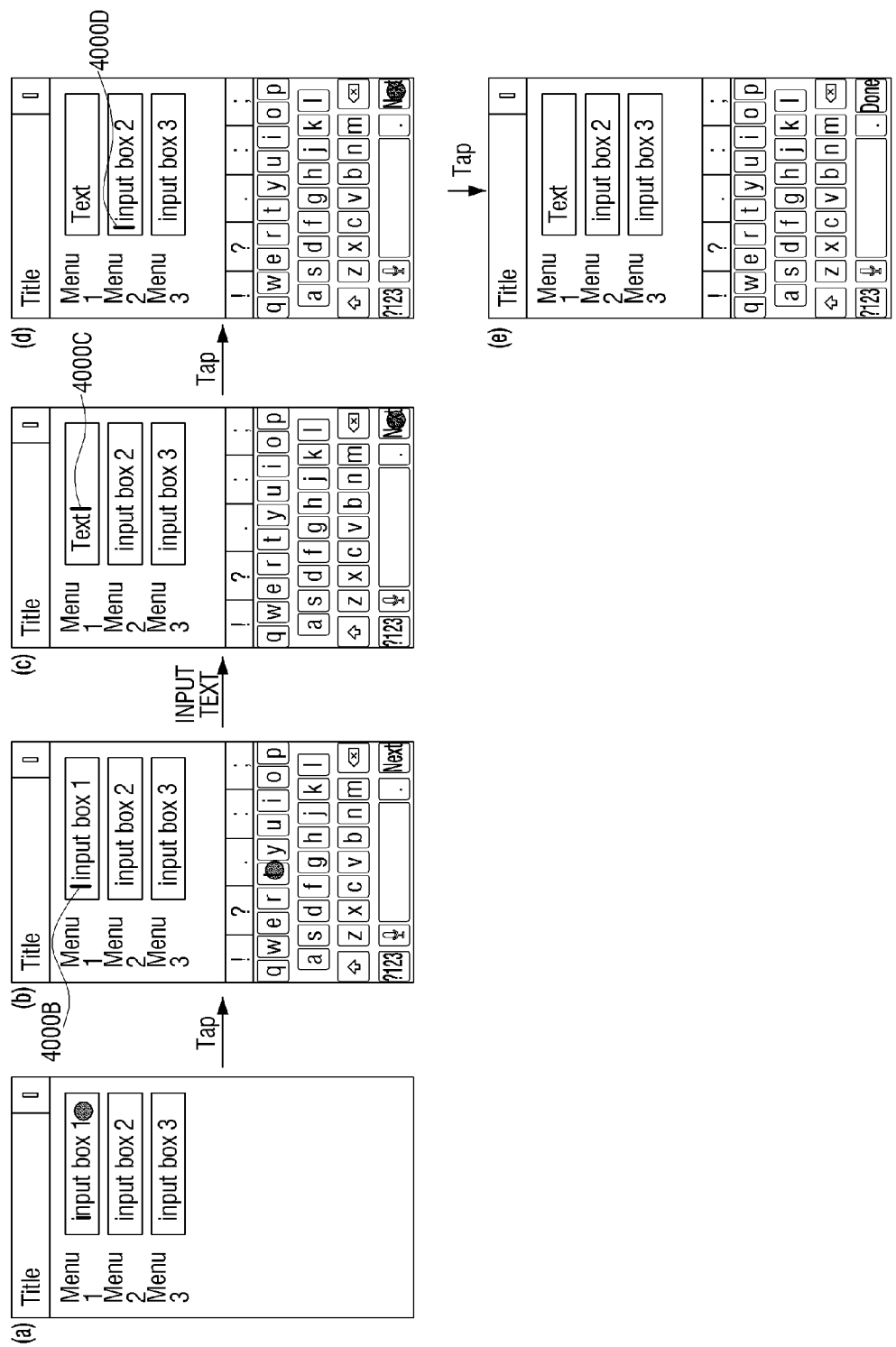

FIGS. 39 and 40 illustrate screens which show a text input as a UI element. An on-screen keyboard provided by the system is used, and different types of on screen keyboards may be provided according to an input type of a text, as shown in views (a), (b), and (c) of FIG. 39. Views (a), (b), (c), (d), and (e) of FIG. 40 illustrate a process which is commonly applied in response to a text being input. View (a) of FIG. 40 shows that there is no keypad at the time of entering, view (b) of FIG. 40 shows that a keypad appears in response to a text box being tapped, and view (c) of FIG. 40 shows that a text field is displayed in response to [Text] being input. As shown in view (d) of FIG. 40, [Text] is changed to [Done] in a last text field of a page. In FIGS. 39 and 40, reference numerals 3900A, 3900B, and 3900C and reference numerals 4000B, 4000C, and 4000D indicate cursors. The locations of these cursors may be set as a respective default.

Figure 41:
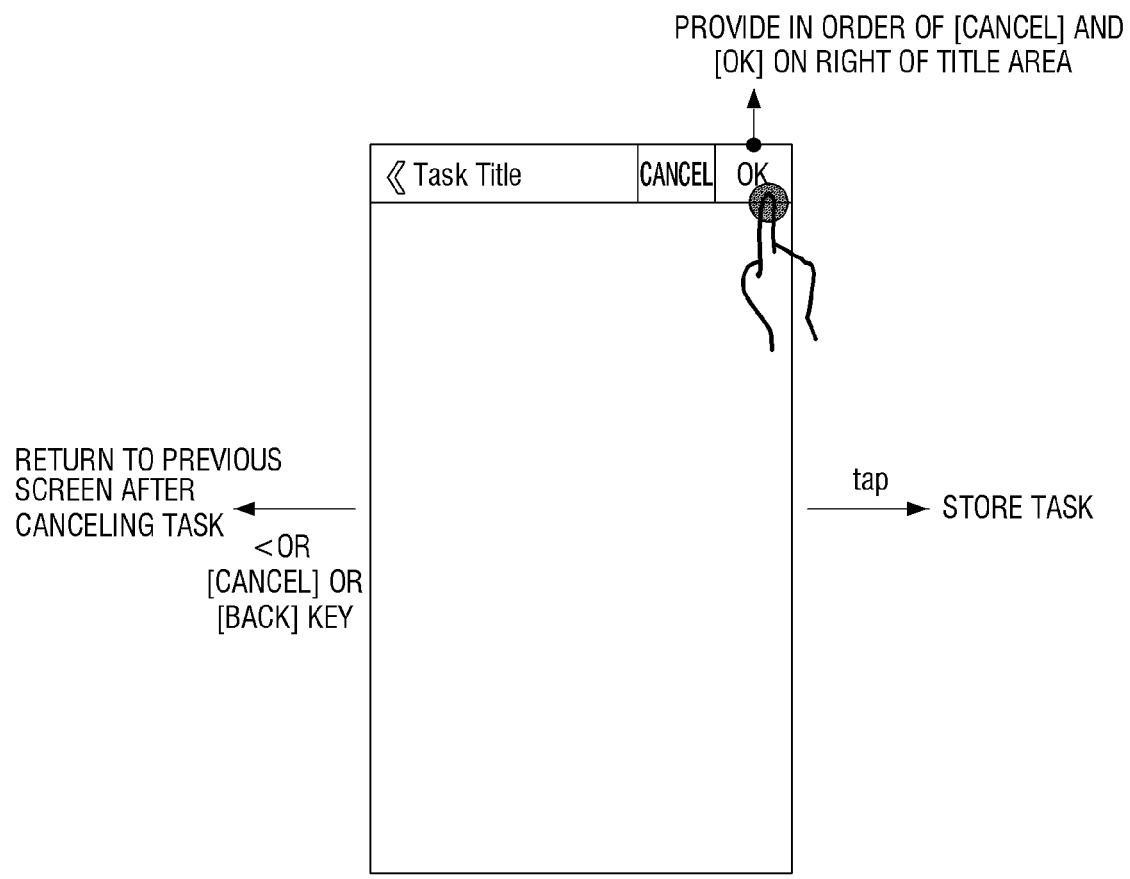

FIG. 41 illustrates a screen which shows a task completion as a UI element, and shows a process which is applied when a task such as addition, deletion, and setting change is completed.

FIGS. 42 to 90 are views illustrating a UI driving screen, according to an exemplary embodiment.

Figure 42:
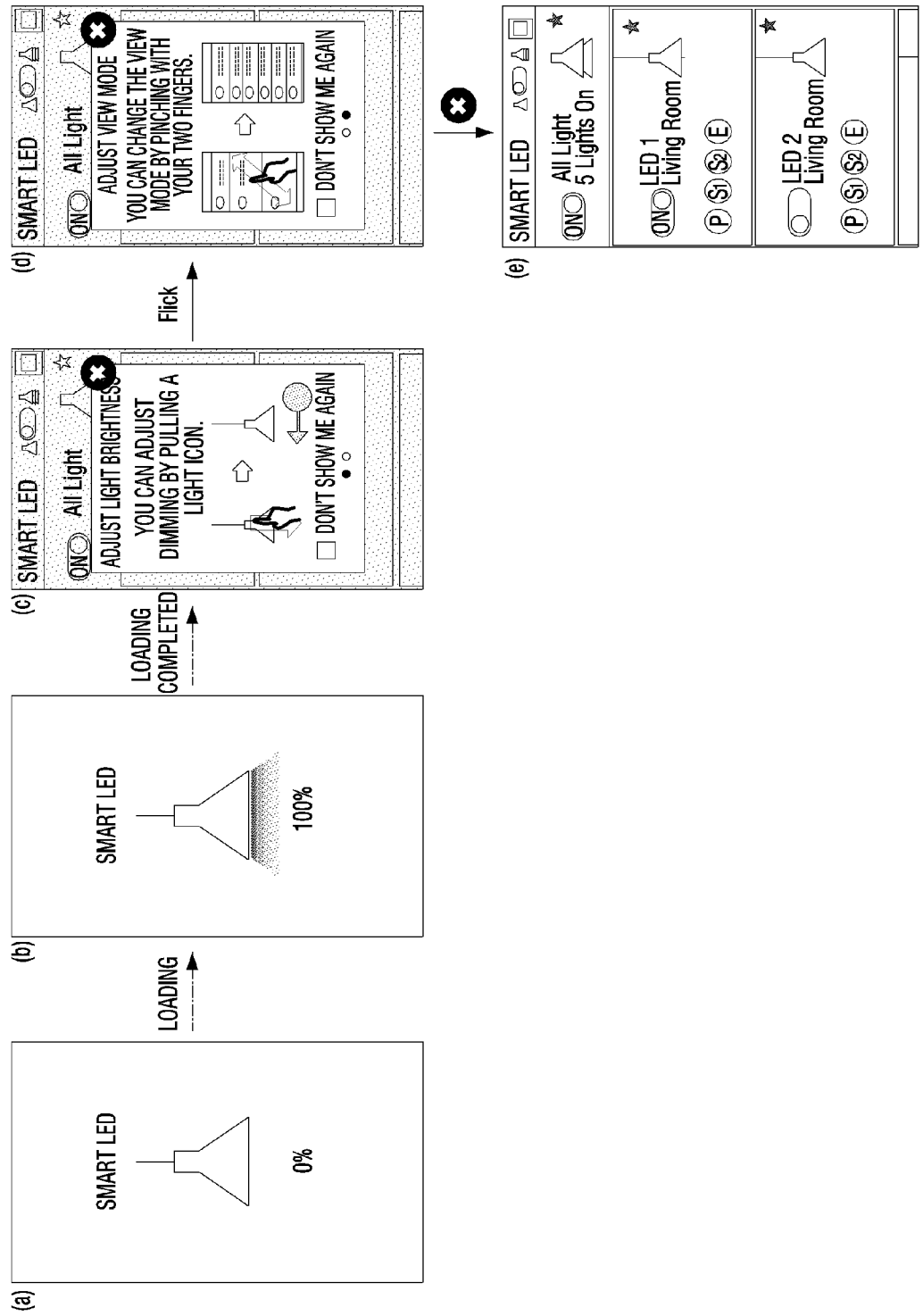
Figure 43:
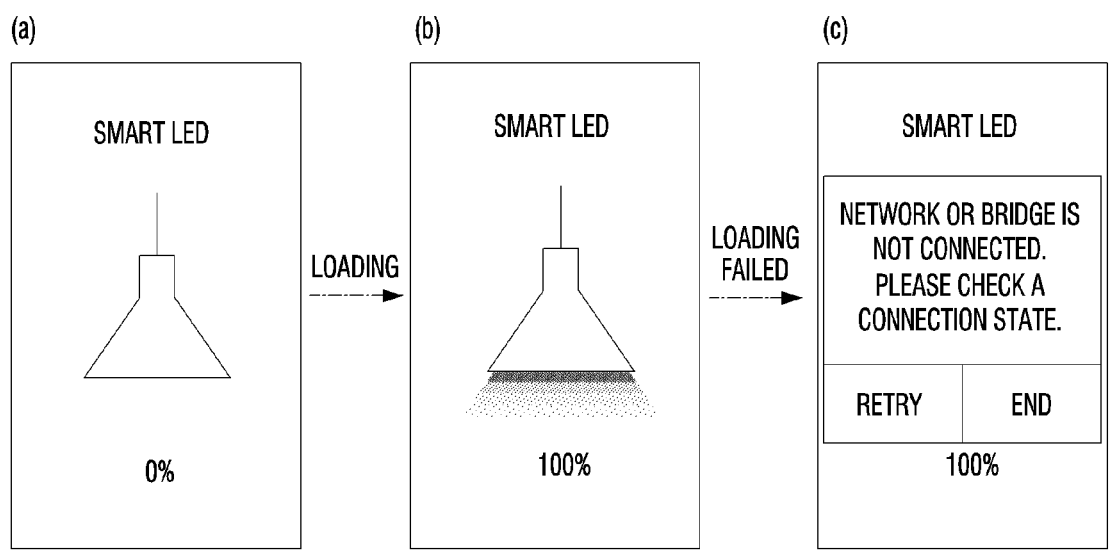

FIG. 42 shows a screen which is displayed when loading is performed, and FIG. 43 shows a screen which is displayed when loading fails. In view (b) of FIG. 42, a light of a lamp becomes brighter as a loading number increases from 0 to 100%. In addition, a detail view may be fixed as shown in view (e) of FIG. 42. Thereafter, the view method may succeed a view status when a previous application was closed. An LED view may be provided to the user who has terminated an application in the LED view status, and a group view may be provided to the user who has terminated an application in the group view status.

Figure 44:
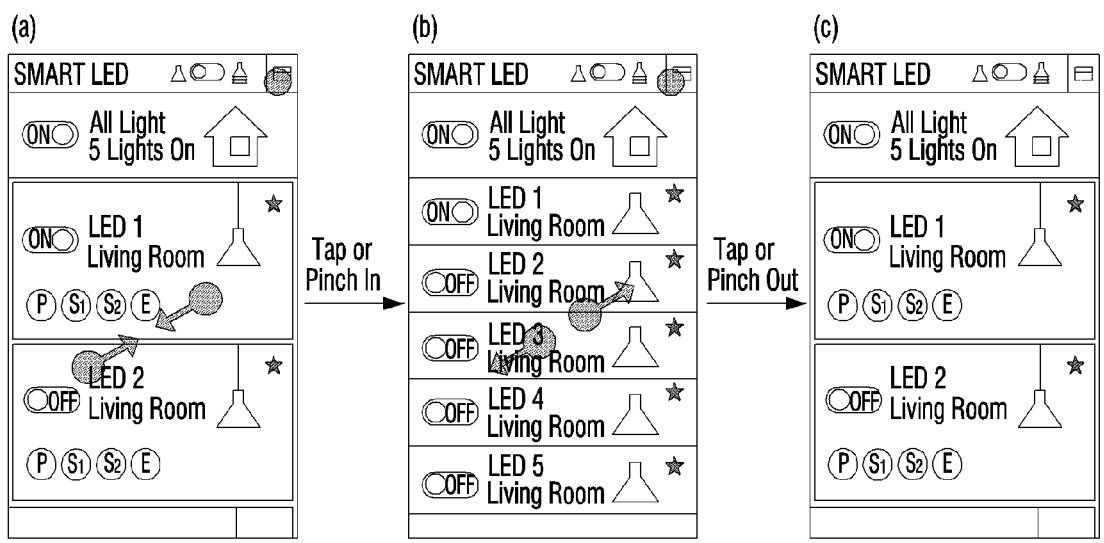
Figure 45:
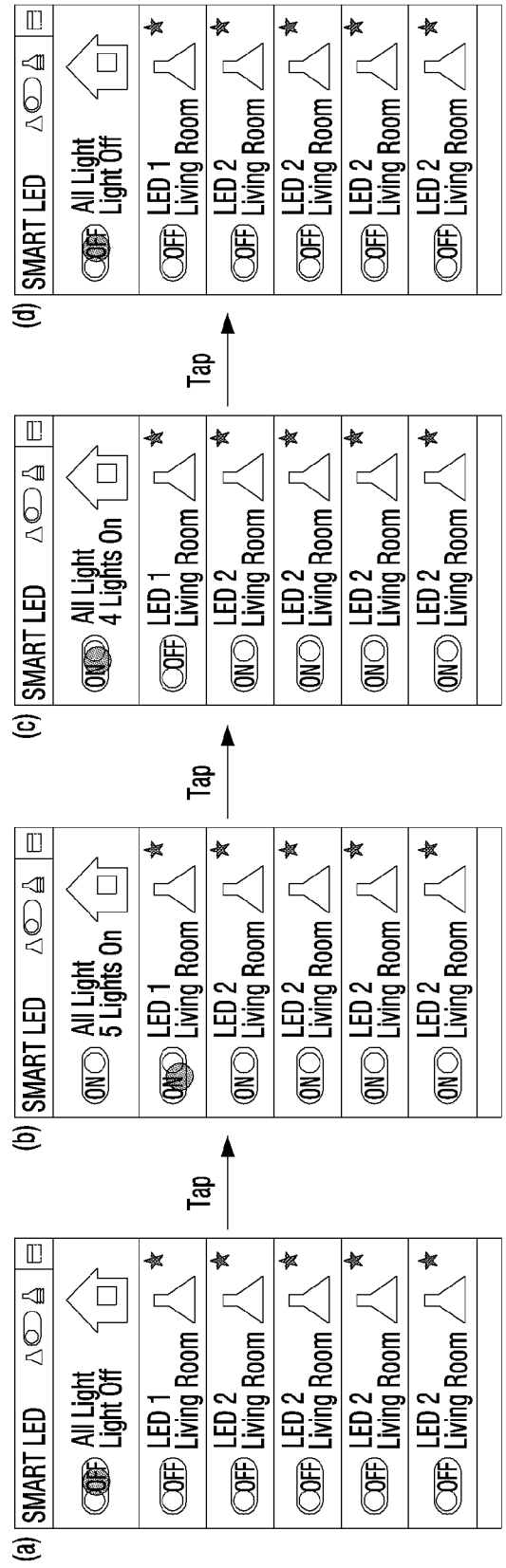
Figure 46:
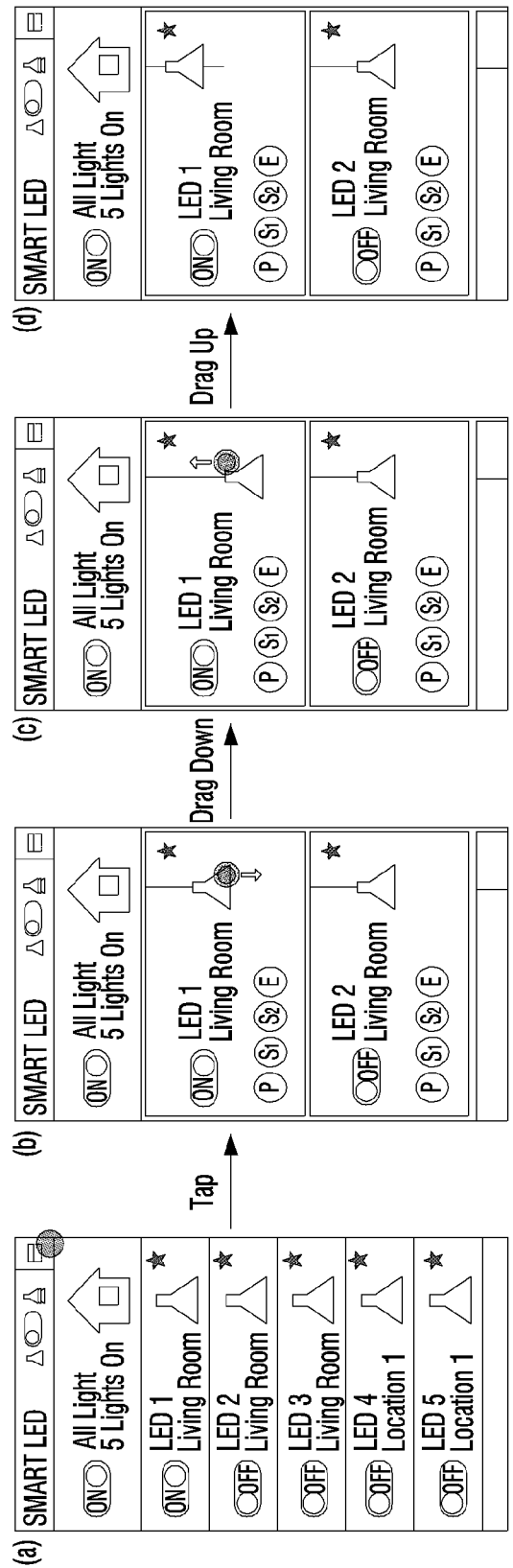
Figure 47:
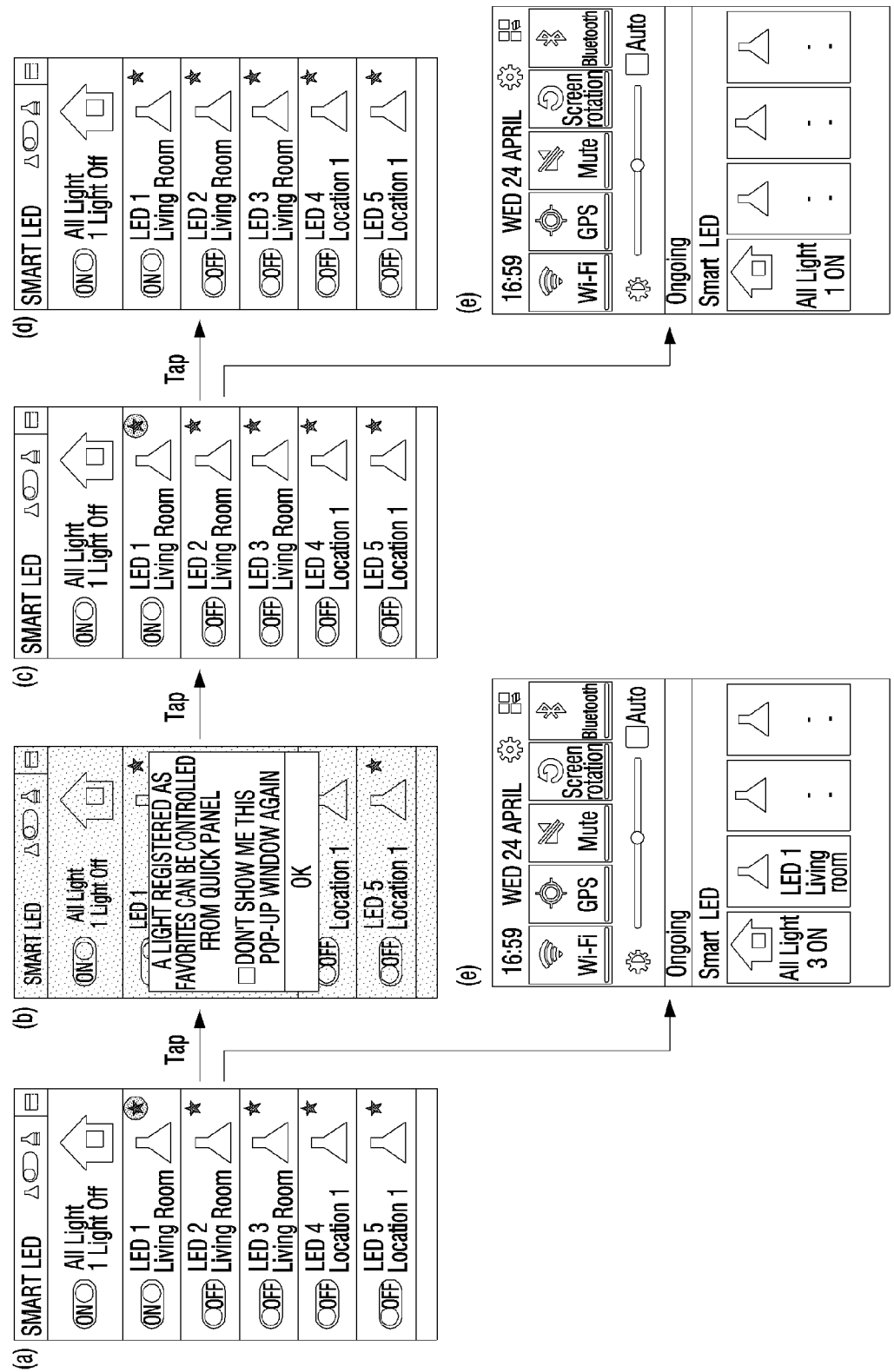
Figure 48:
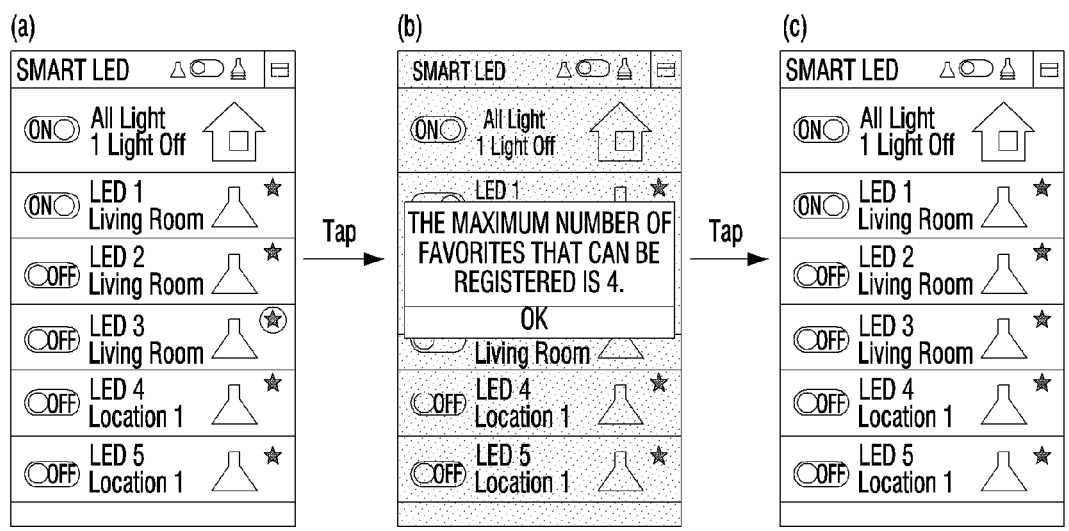
Figure 49:
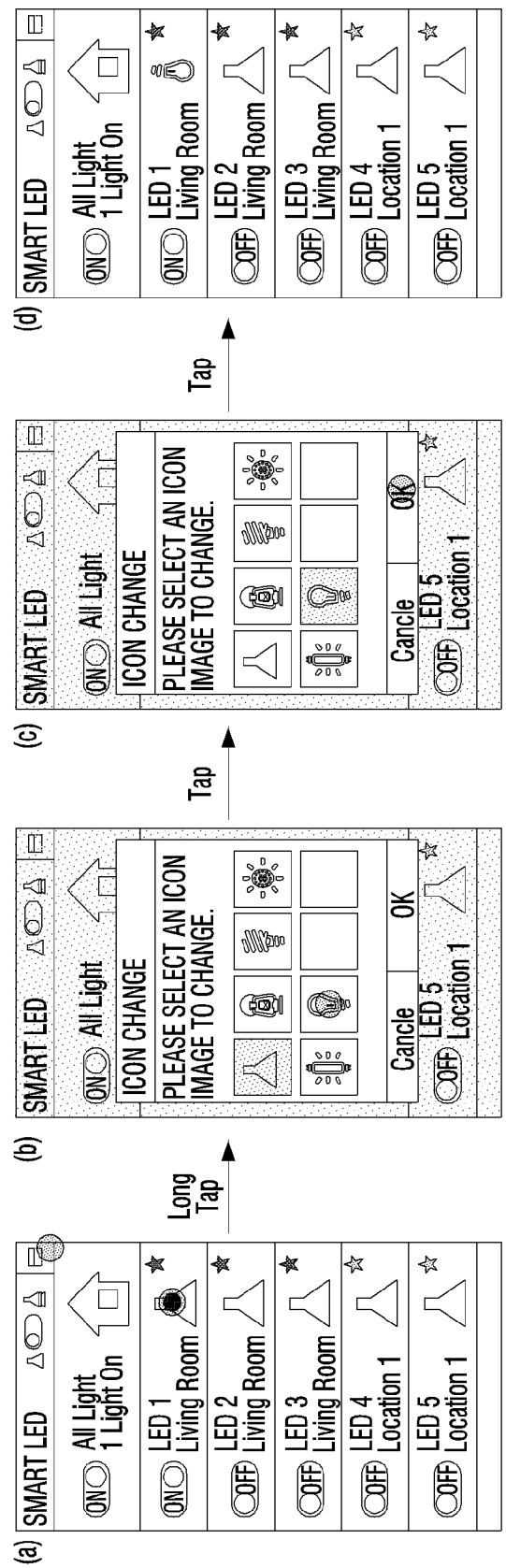

FIGS. 44, 45, 46, 47, 48, and 49 illustrate LED list-related screens. FIG. 44 illustrates an LED list screen and shows a list unfolding screen and a list folding screen. FIG. 45 illustrates an LED list screen for controlling collectively turned on/off buttons and individually turned on/off buttons. In response to the user tapping "All Light" in view (a) of FIG. 45, all lights are turned on, and thus an "All Light" subtitle area is changed to "5 Lights On" as shown in view (b) of FIG. 45. In response to the user tapping LED 1 in view (b) of FIG. 45, only the LED 1 is turned off and the "All Light" subtitle area is changed to "4 Lights On." Furthermore, FIG. 46 shows adjusting dimming on the LED list screen. In view (c) of FIG. 46, a location of a graphic light moves down and a real light brightness becomes lower. In this case, brightness of an icon may be changed based on the light brightness. Conversely, as shown in view (d) of FIG. 46, in response to a location of a graphic light moving up, the real light brightness becomes greater. FIG. 47 illustrates adding and/or deleting favorites on the LED list screen. View (e) of FIG. 47 shows that a pop-up window registered as favorites appears in the quick panel, and view (f) of FIG. 47 shows that a light deleted from favorites is removed from the quick panel. FIG. 48 shows a favorites list excess notice on the LED list screen. The notice may be displayed in a pop-up window form, as shown in view (b) of FIG. 48. FIG. 49 shows changing a light icon on the LED list screen. The icon image may be changed as shown in view (b) of FIG. 49 and view (c) of FIG. 49. The icon mage is finally changed by selecting OK in view (c) of FIG. 49.

Figure 50:
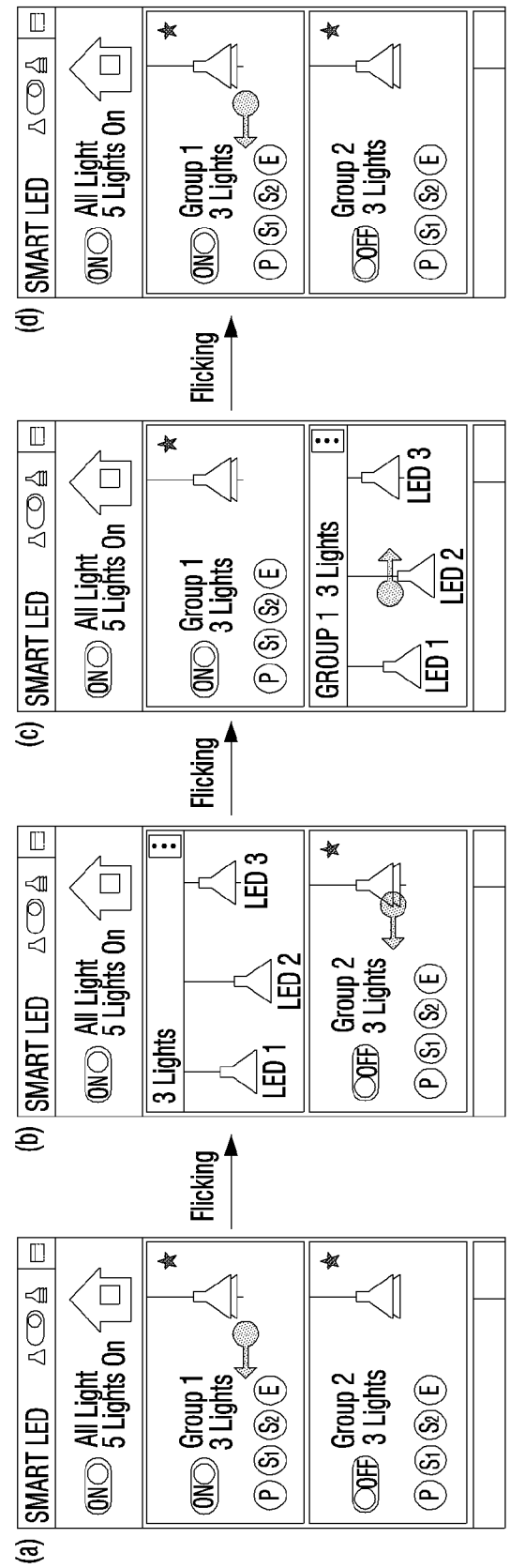

FIGS. 50, 51, 52, and 53 illustrate an individual light peeping screen. In response to a Group 1 item being tapped in view (a) of FIG. 50, a screen shown in view (b) of FIG. 50 is displayed. In response to a Group 2 item being tapped in view (b) of FIG. 50, a screen shown in view (c) of FIG. 50 is displayed. In this case, in response to the Group 2 item being tapped in view (b) of FIG. 50, a newly flicked list is opened, and a previously flicked list returns to its original status.

Figure 51:
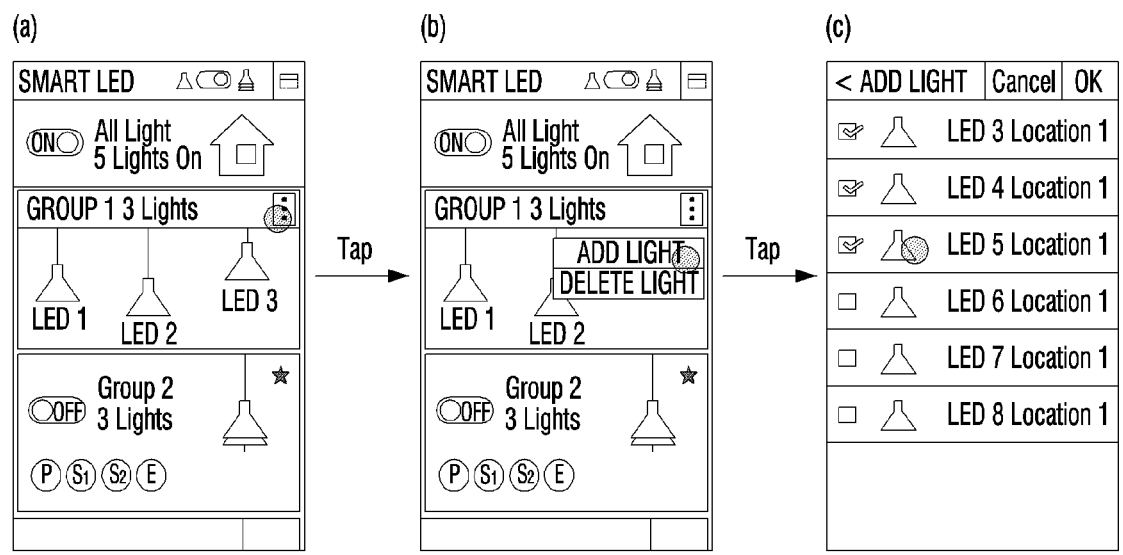
Figure 52:
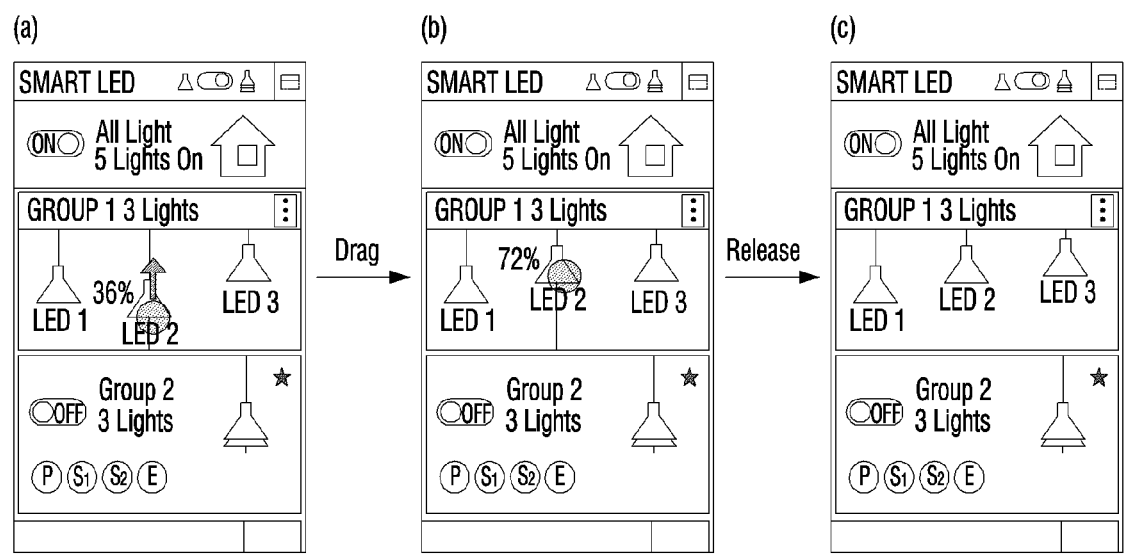
Figure 53:
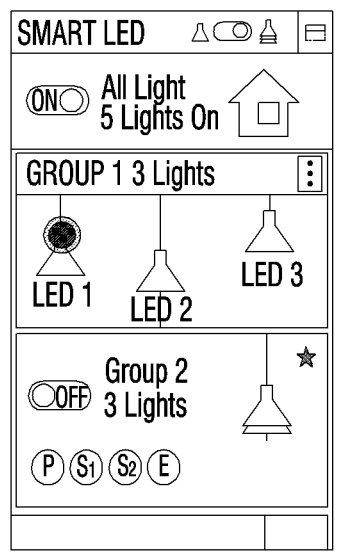

FIG. 51 illustrates light management. In response to a light addition item being tapped in view (b) of FIG. 51, LEDs are displayed in addition to the already registered LEDs, as shown in view (c) of FIG. 51. FIG. 52 illustrates dimming setting, and FIG. 53 illustrates a screen displayed when tapping is performed for a long time. For example, in response to an LED 1 being tapped for a long time in FIG. 53, the LED 1 is in a movable status. Accordingly, the LED 1 may be moved or deleted.

Figure 54:
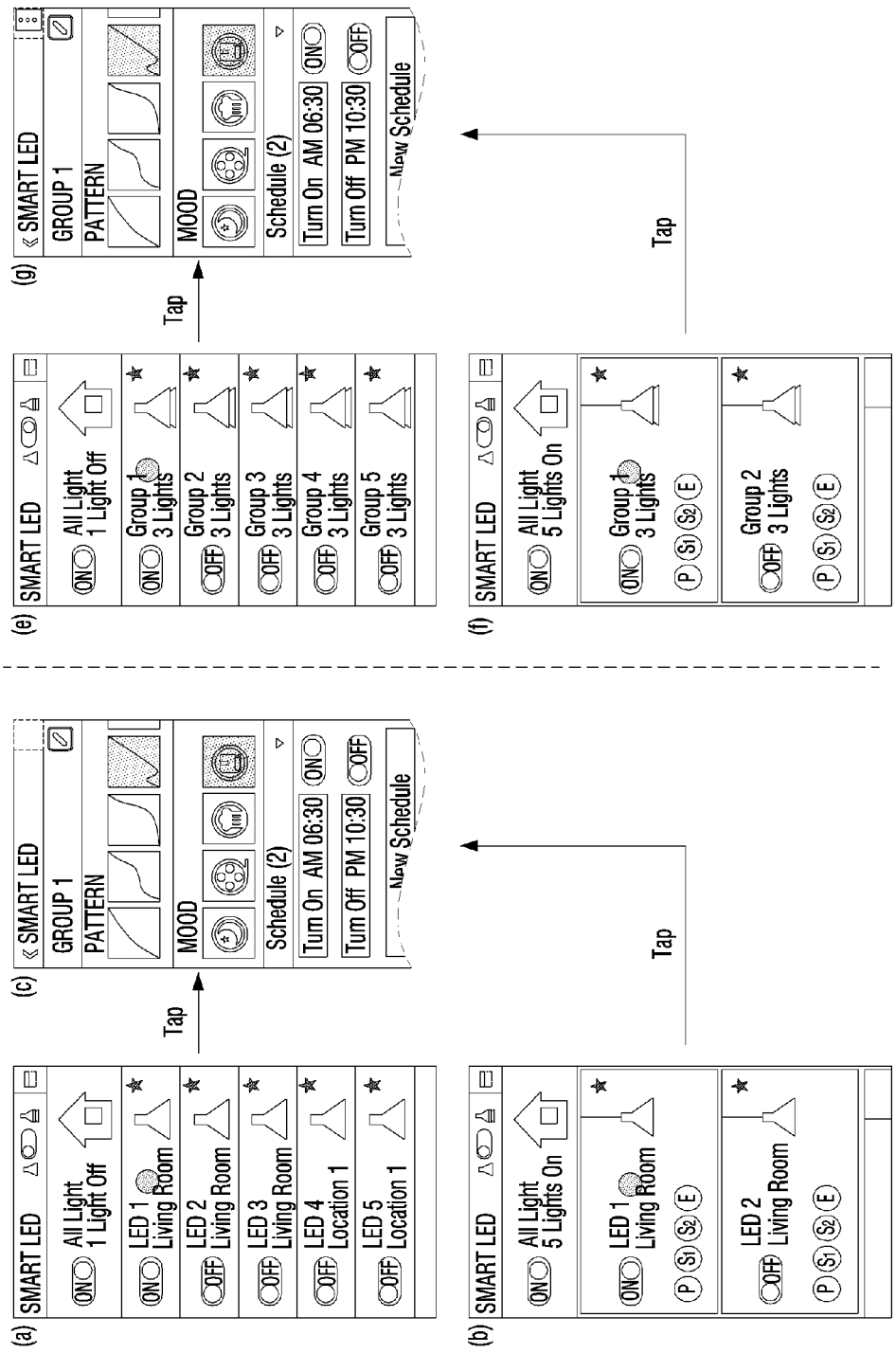
Figure 55:
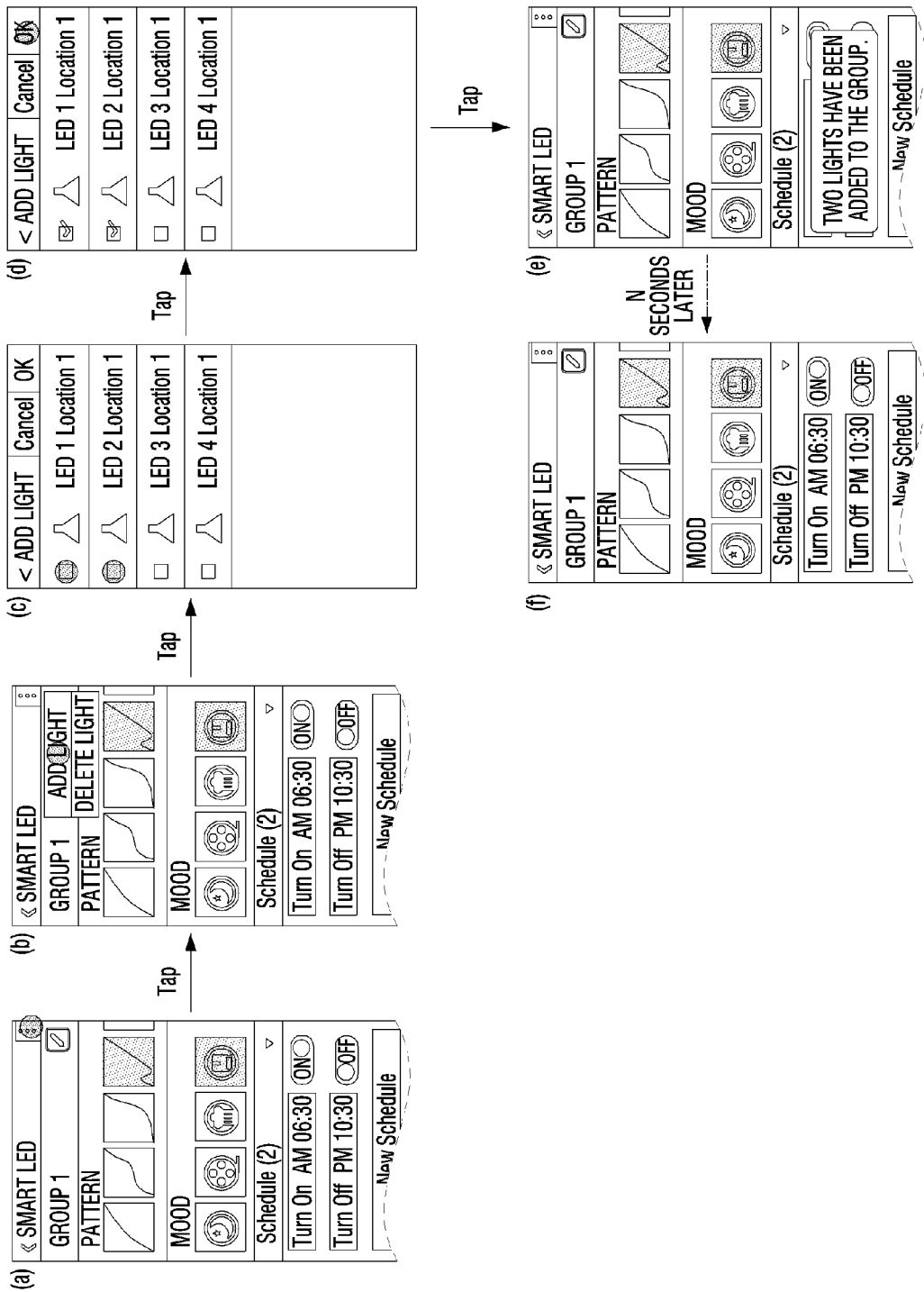
Figure 56:
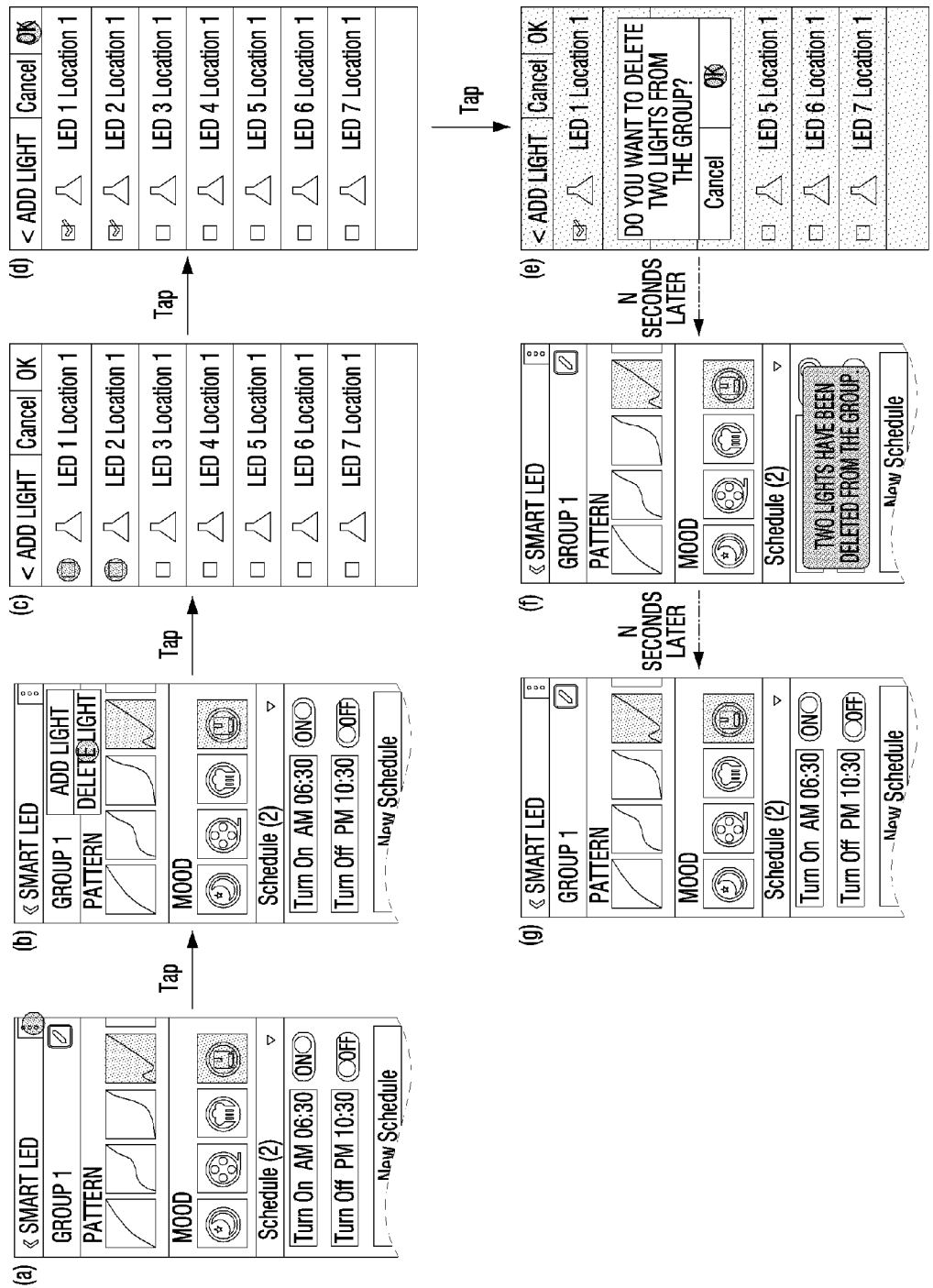
Figure 57:
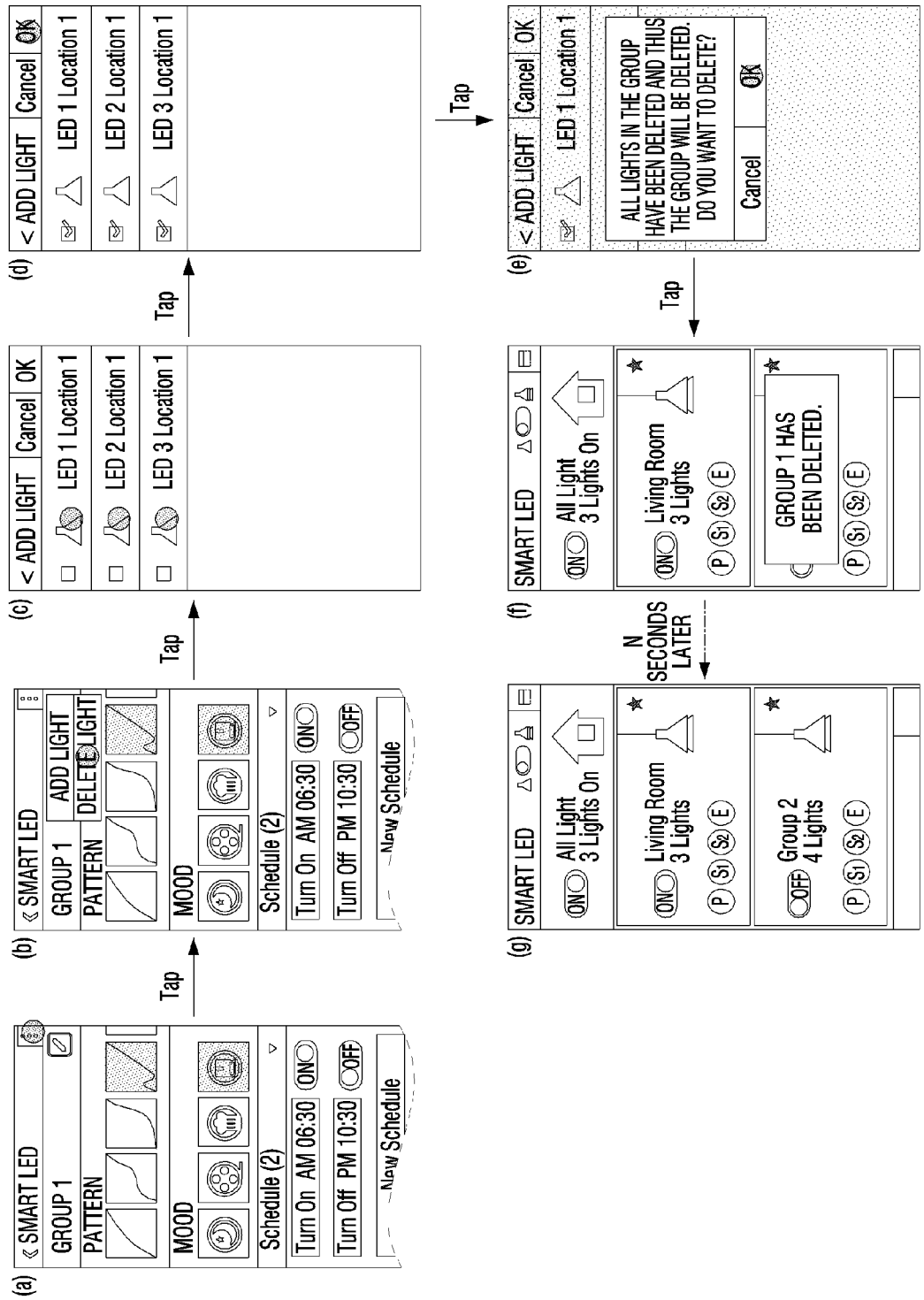
Figure 58:
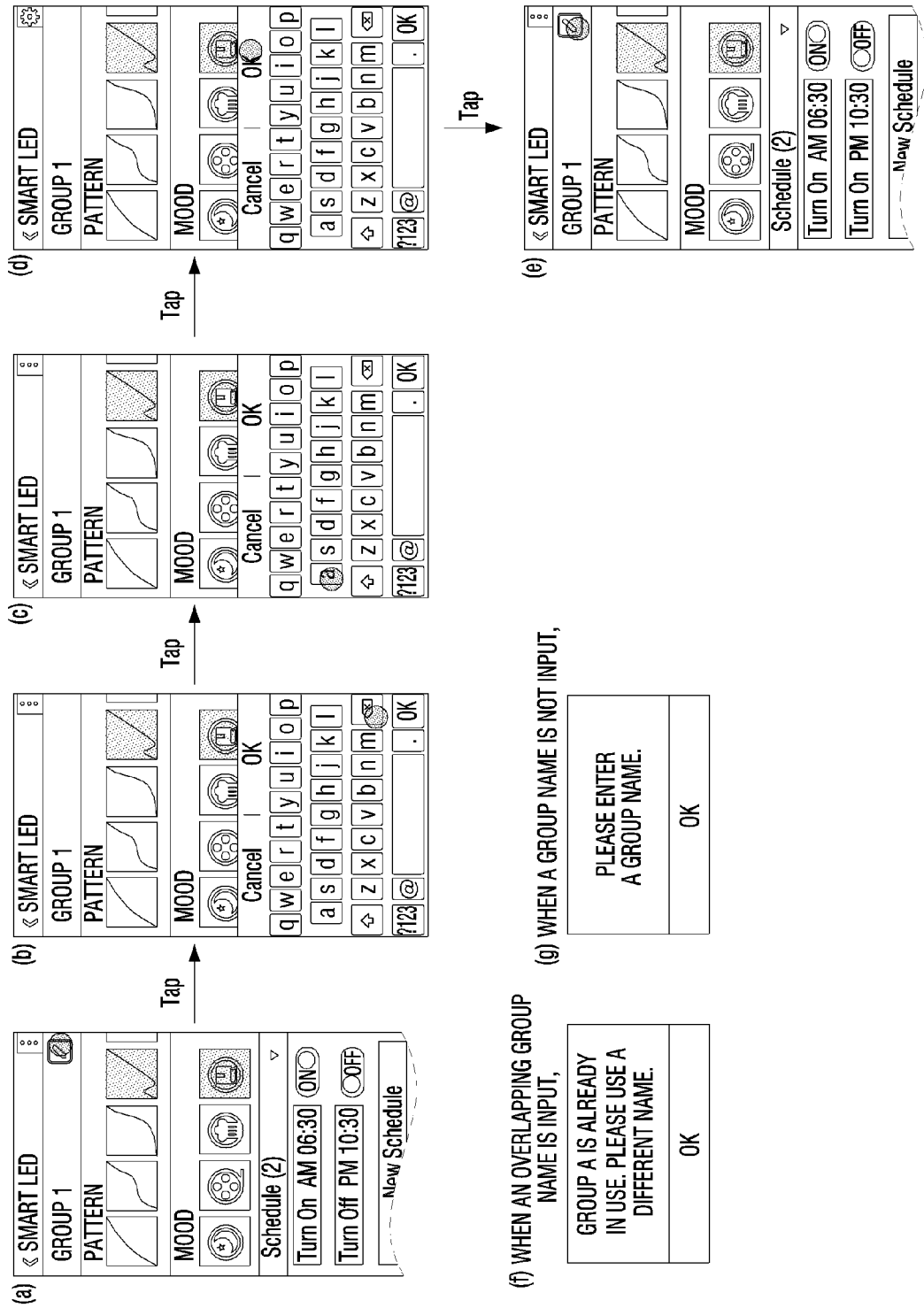
Figure 59:
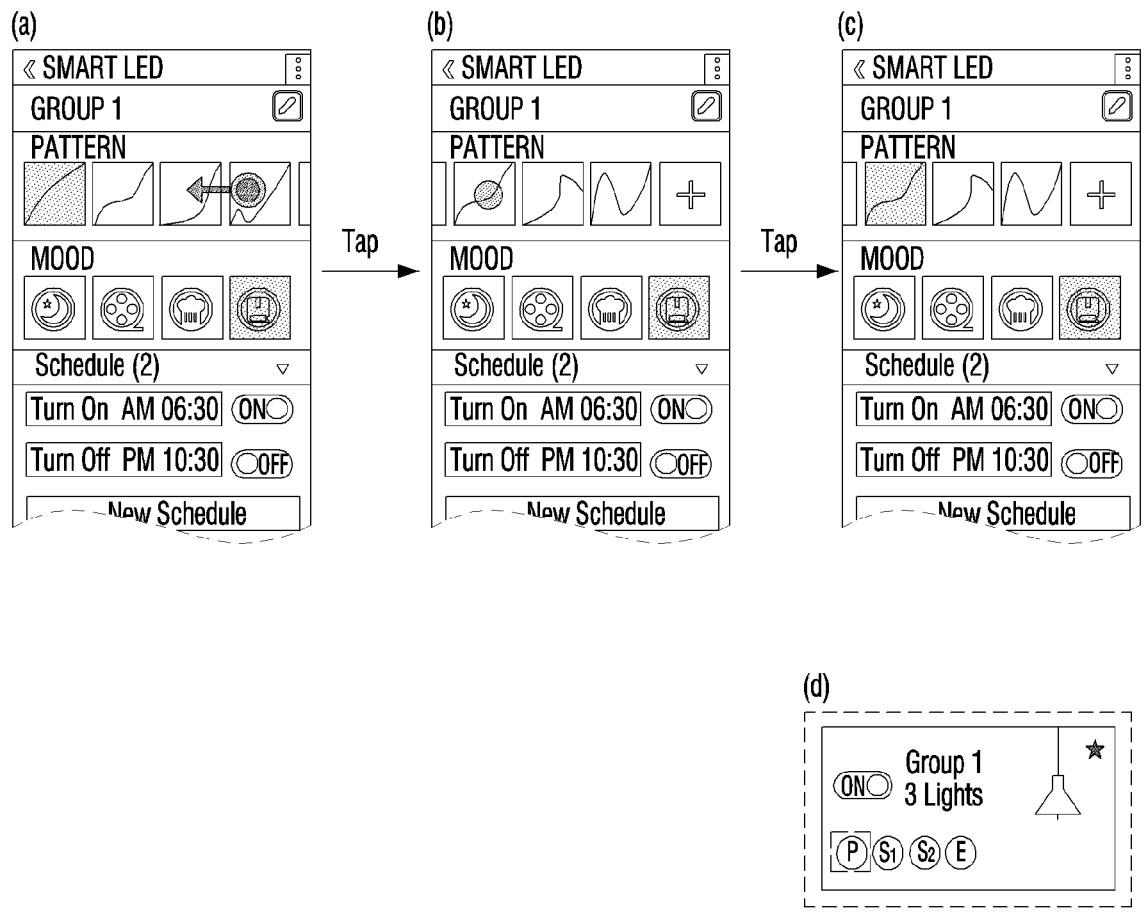
Figure 60:
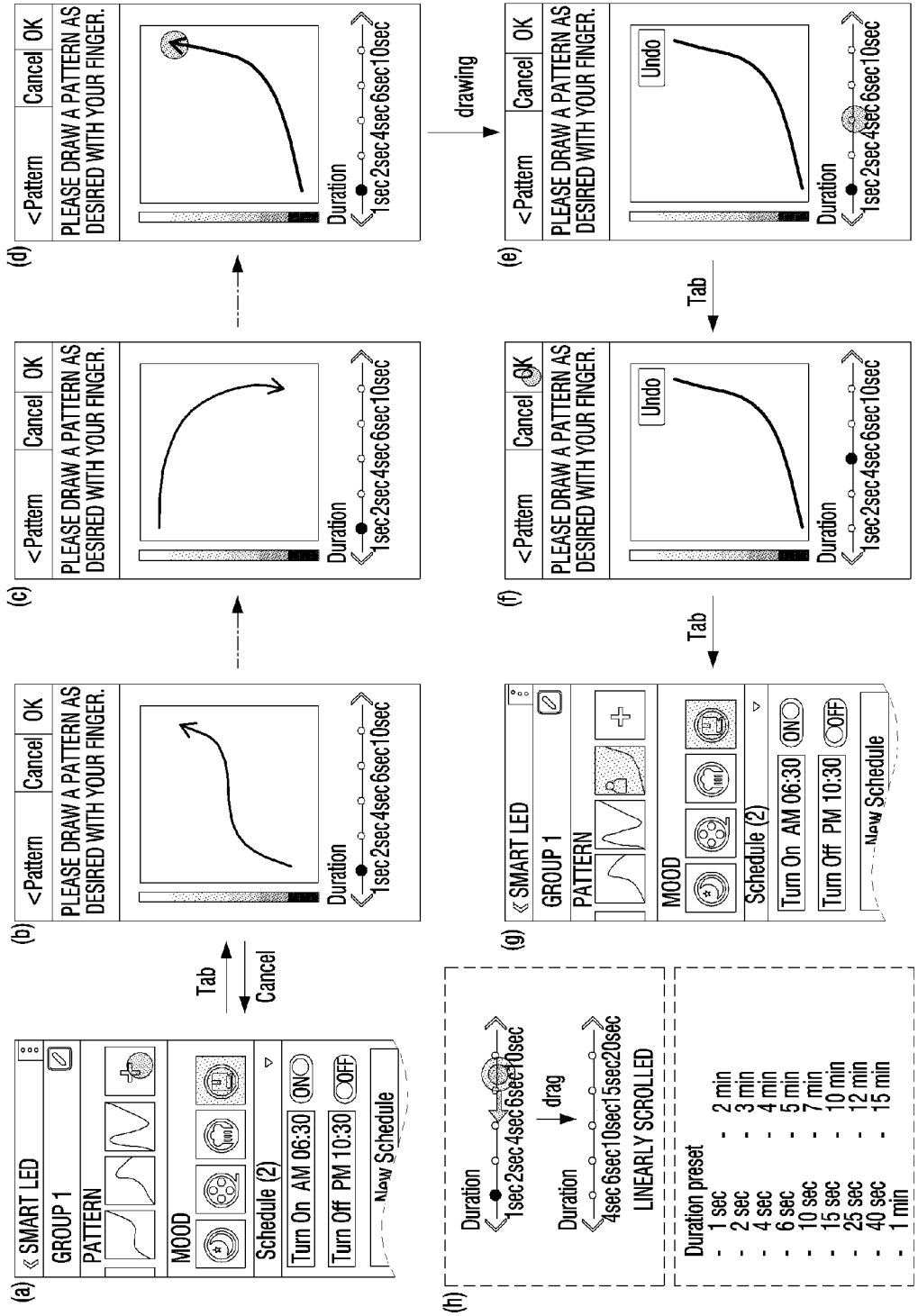
Figure 61:
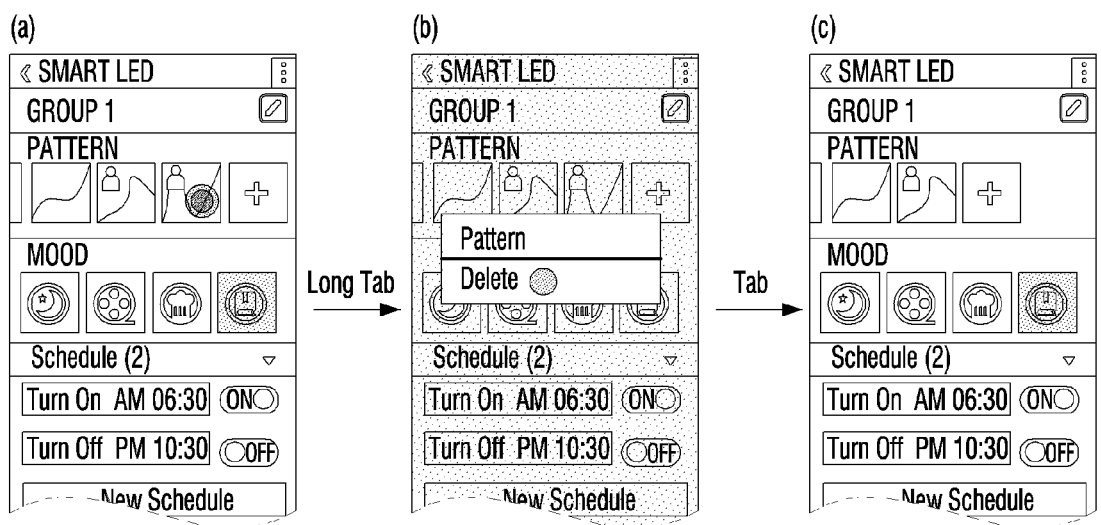
Figure 62:
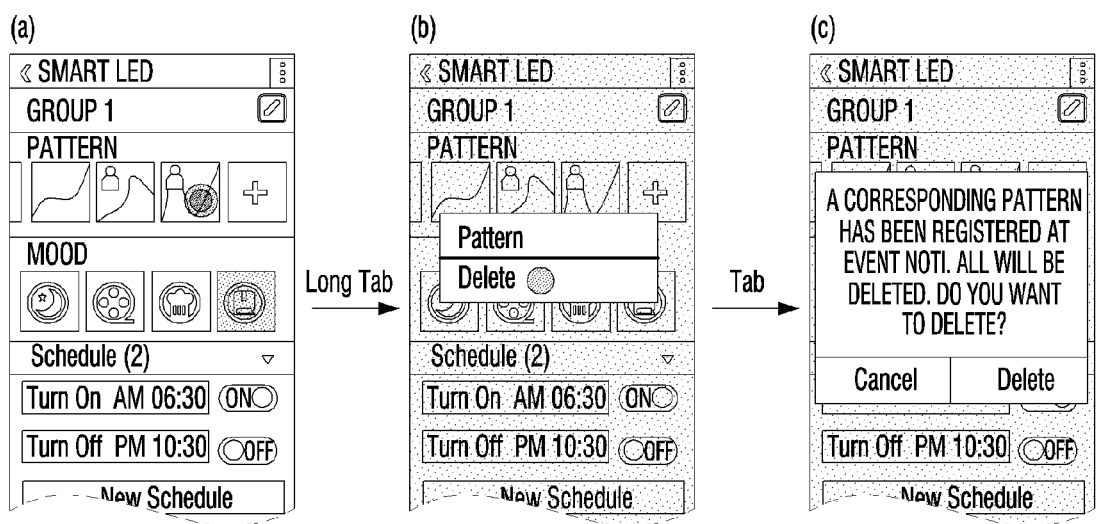

FIGS. 54 to 76 illustrate screens related to details setting. FIG. 54 is a view which illustrates an entry into a details setting screen. In response to the LED 1 being tapped in view (a) of FIG. 54, the screen may be changed to a details setting screen of the LED 1. Details setting screens of an individual LED and a group LED of view (c) of FIG. 54 and view (g) of FIG. 54 are different from each other in the presence/absence of an upper end title menu button (a dashed line portion). FIG. 55 illustrates a screen for adding a light in a group. In response to a light addition item being tapped in view (b) of FIG. 55, a screen shown in view (c) of FIG. 55 is displayed. In this case, a light which has been already included in the group is not displayed in the list. FIG. 56 illustrates a screen for deleting a light from a group. In response to a light deletion item being tapped in view (b) of FIG. 56, a list of lights in the group is provided, as shown in view (c) of FIG. 56. FIG. 57 illustrates a screen for deleting all lights from a group. FIG. 58 illustrates a screen for changing a light/group name. In response to an overlapping group name being input or in response to a group name not being input, pop-up windows shown in views (f) and (g) of FIG. 58 may be provided. FIG. 59 illustrates a screen for selecting a pattern. The pattern is always selected and is always in a turn-on status, even in an extension view indicator area, as shown in view (c) of FIG. 59. A set light value is reflected in the real light control. FIGS. 60 and 61 illustrate screens for adding and deleting a pattern, and a guide may be provided by using an automatic drawing animation as shown in views (b) and (c) of FIG. 60. FIG. 62 illustrates a screen for deleting a set pattern when an event is notified. For example, in response to a phone call being received from a specific person, a pattern set for a light may be deleted.

Figure 63:
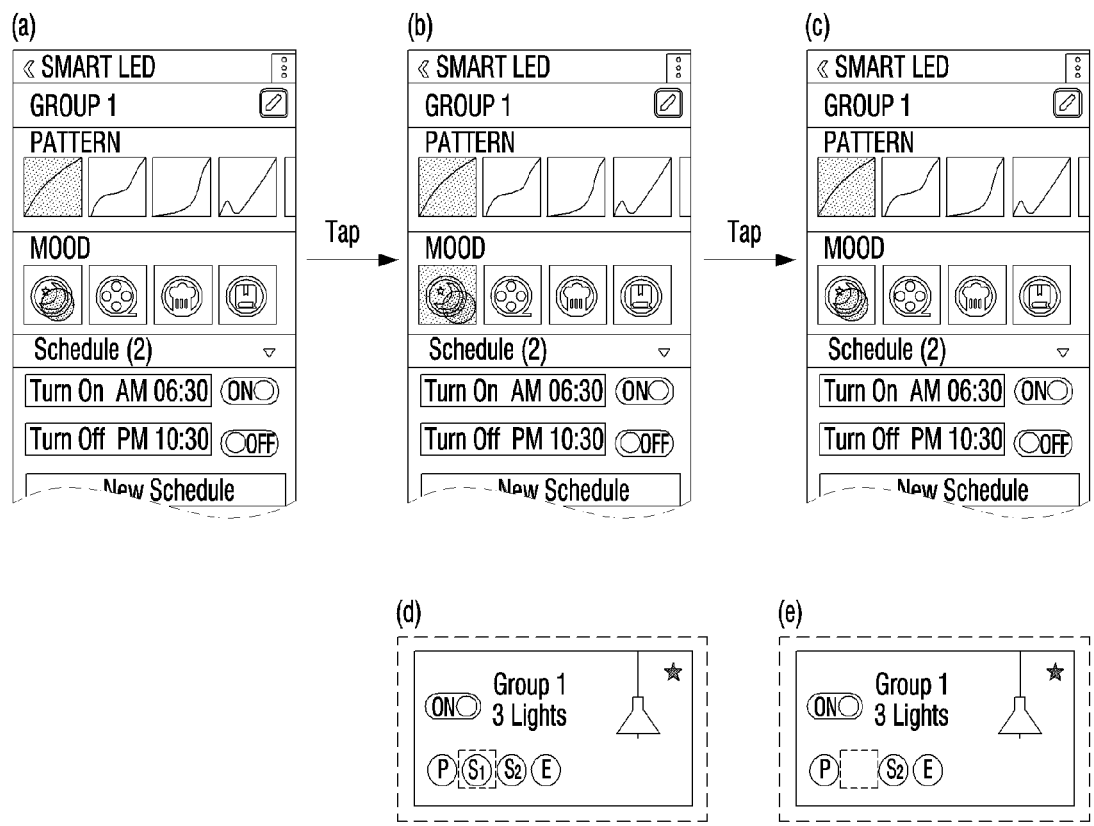
Figure 64:
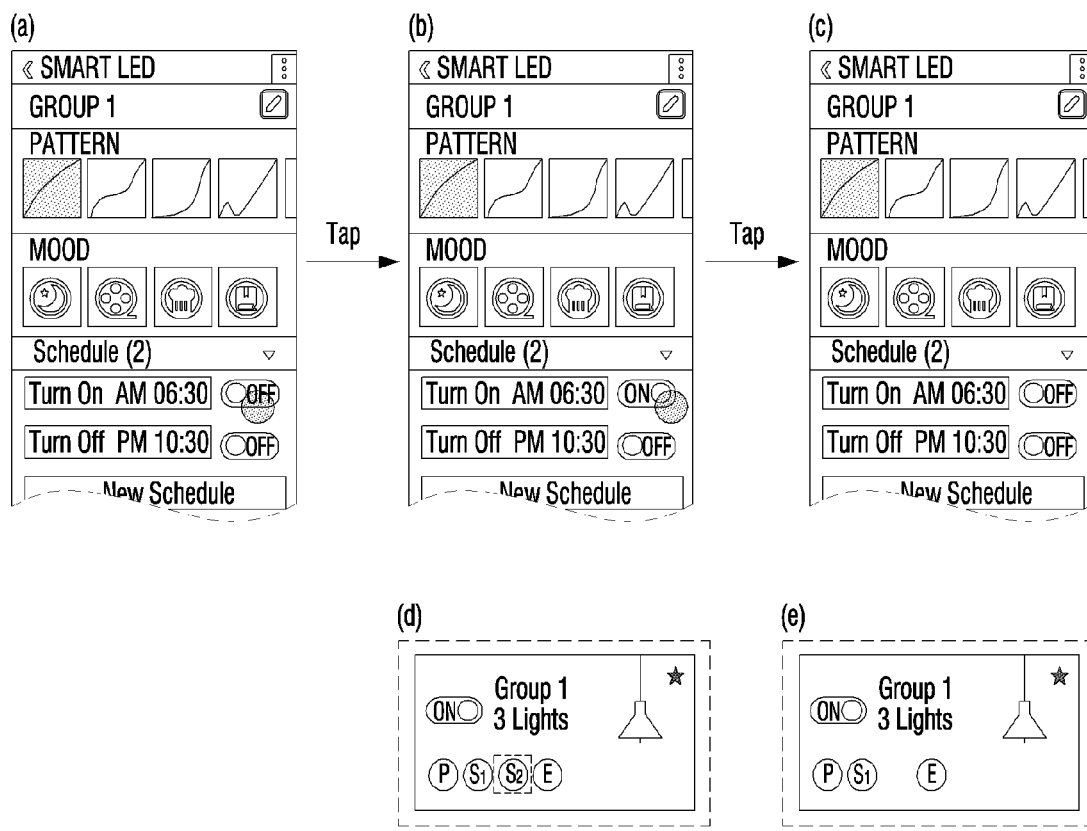
Figure 65:
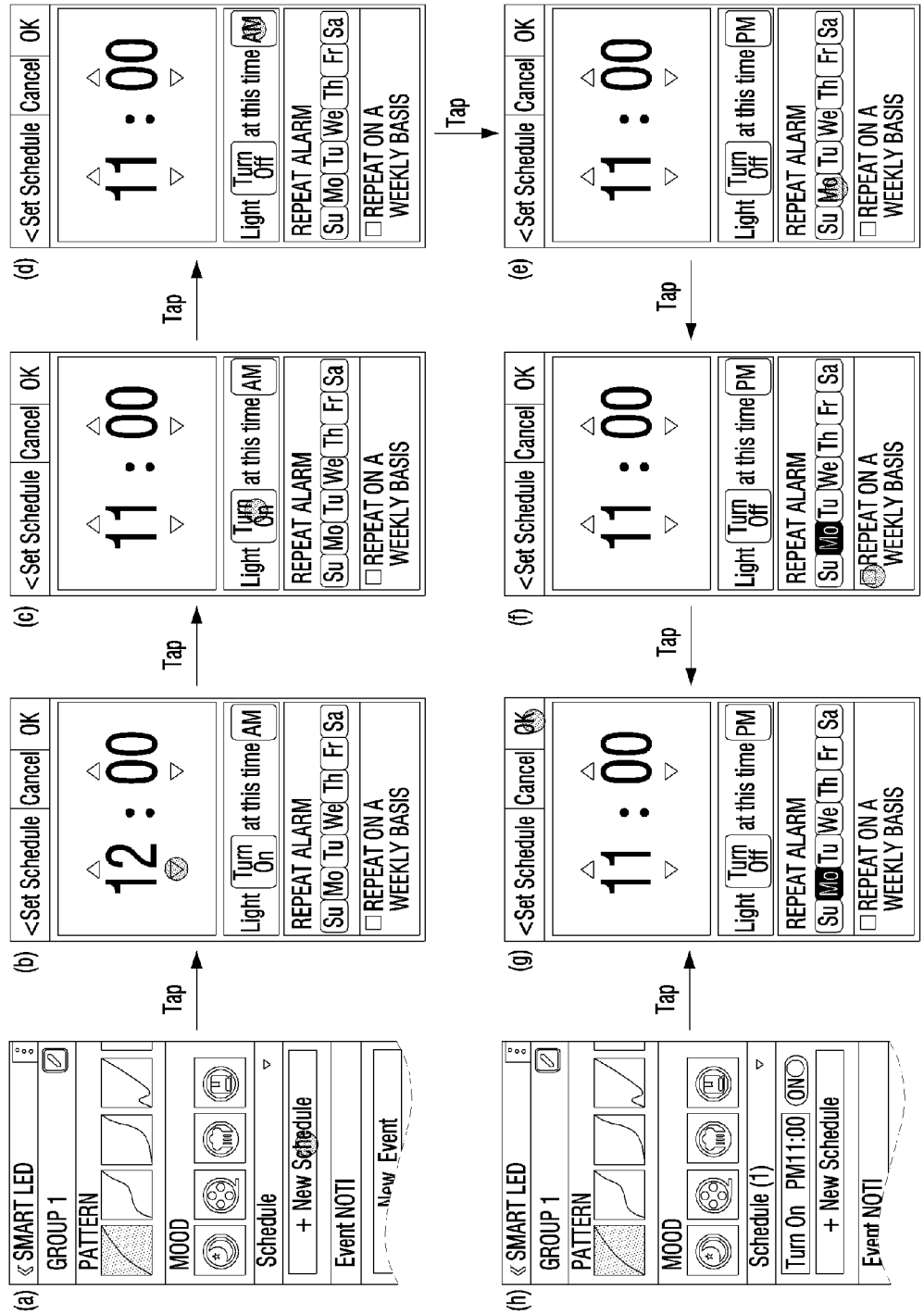
Figure 66:
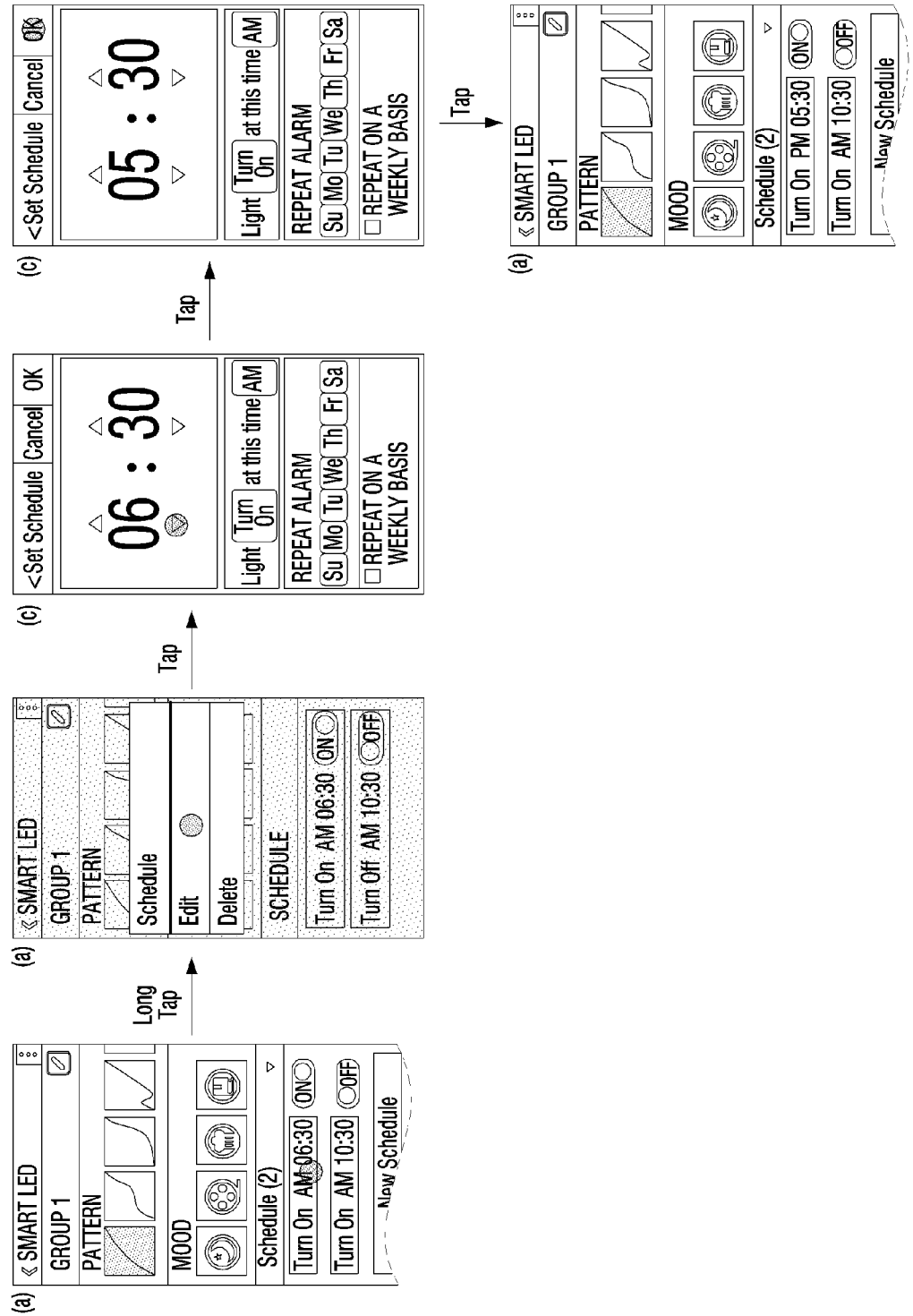
Figure 67:
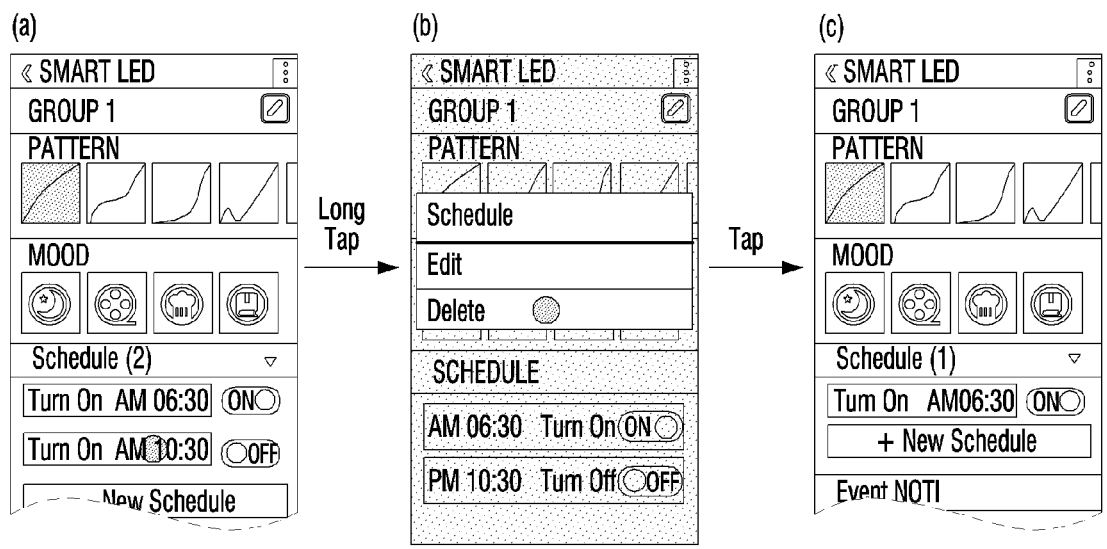
Figure 68:
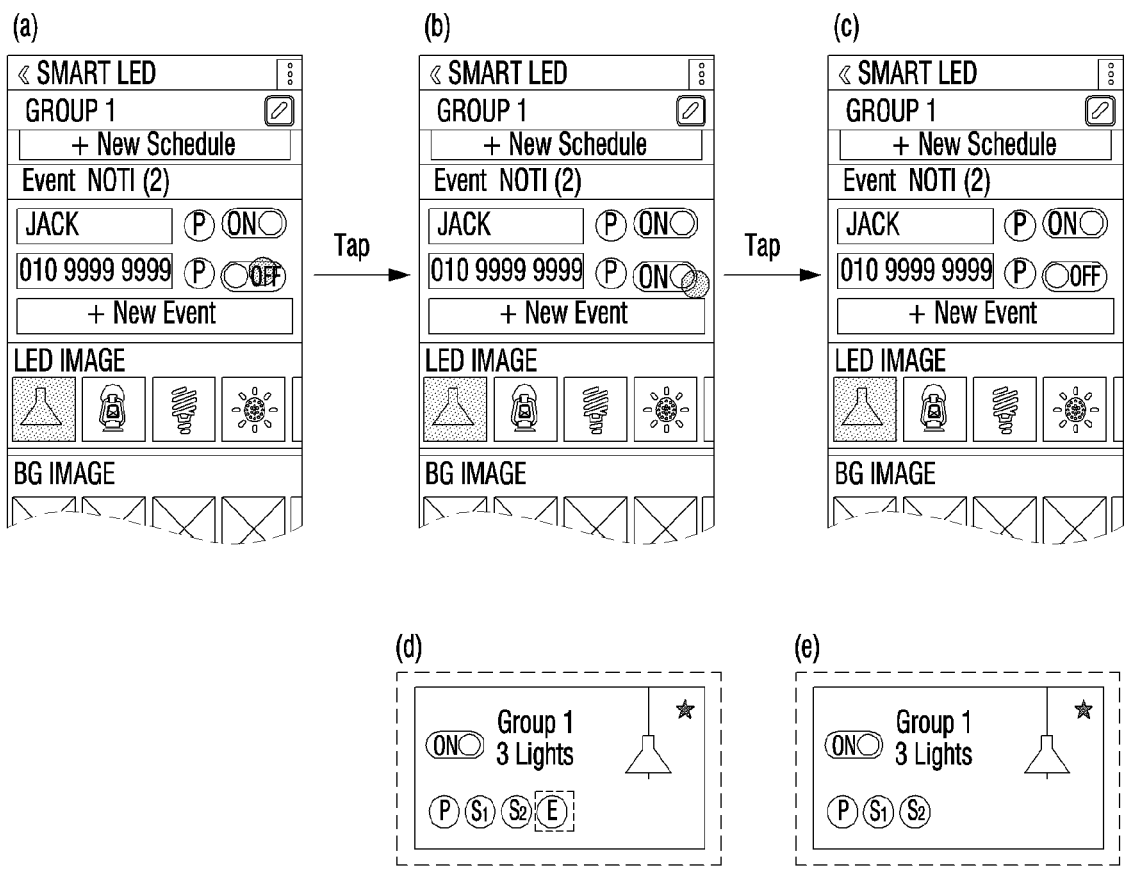
Figure 69:
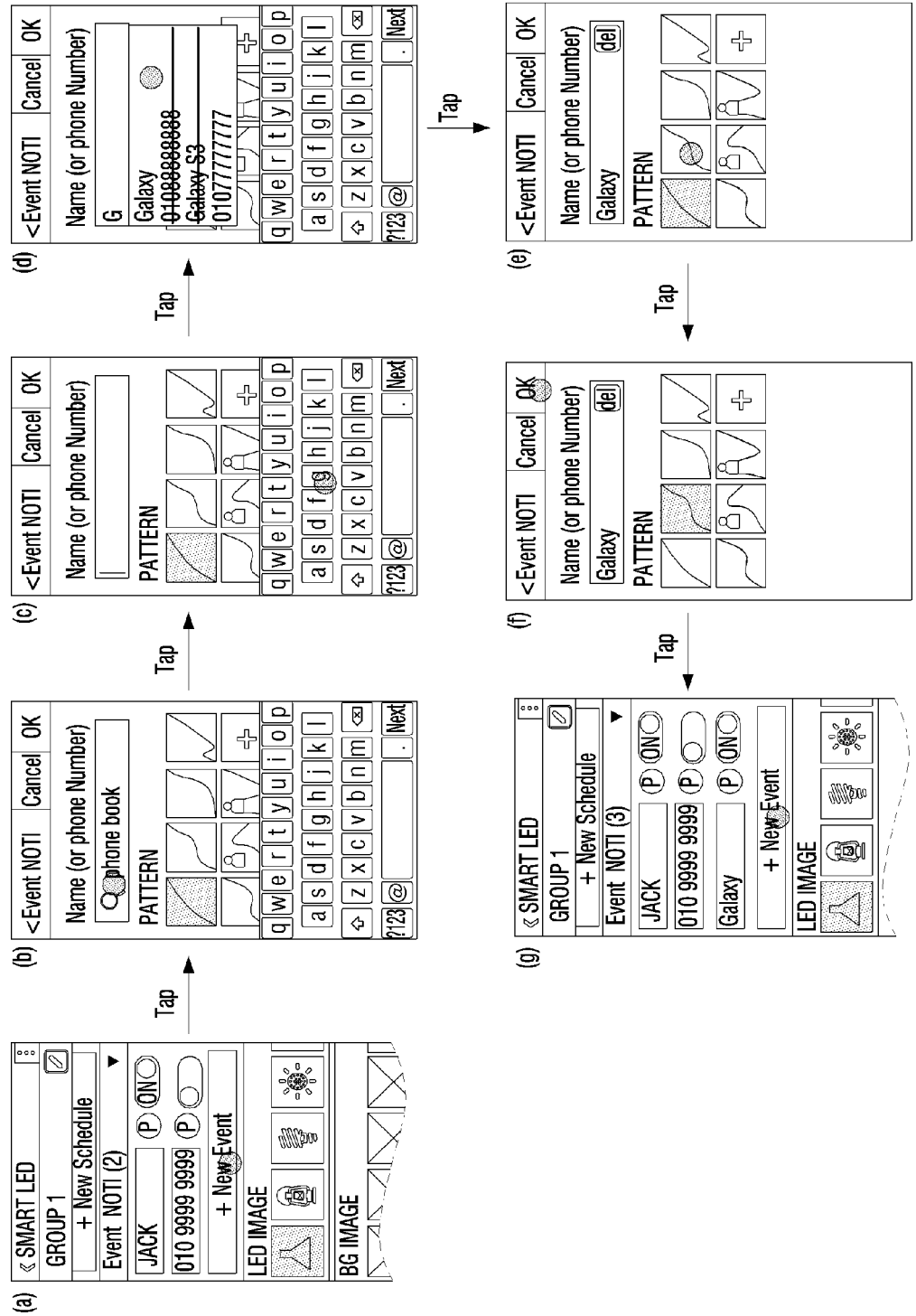
Figure 70:
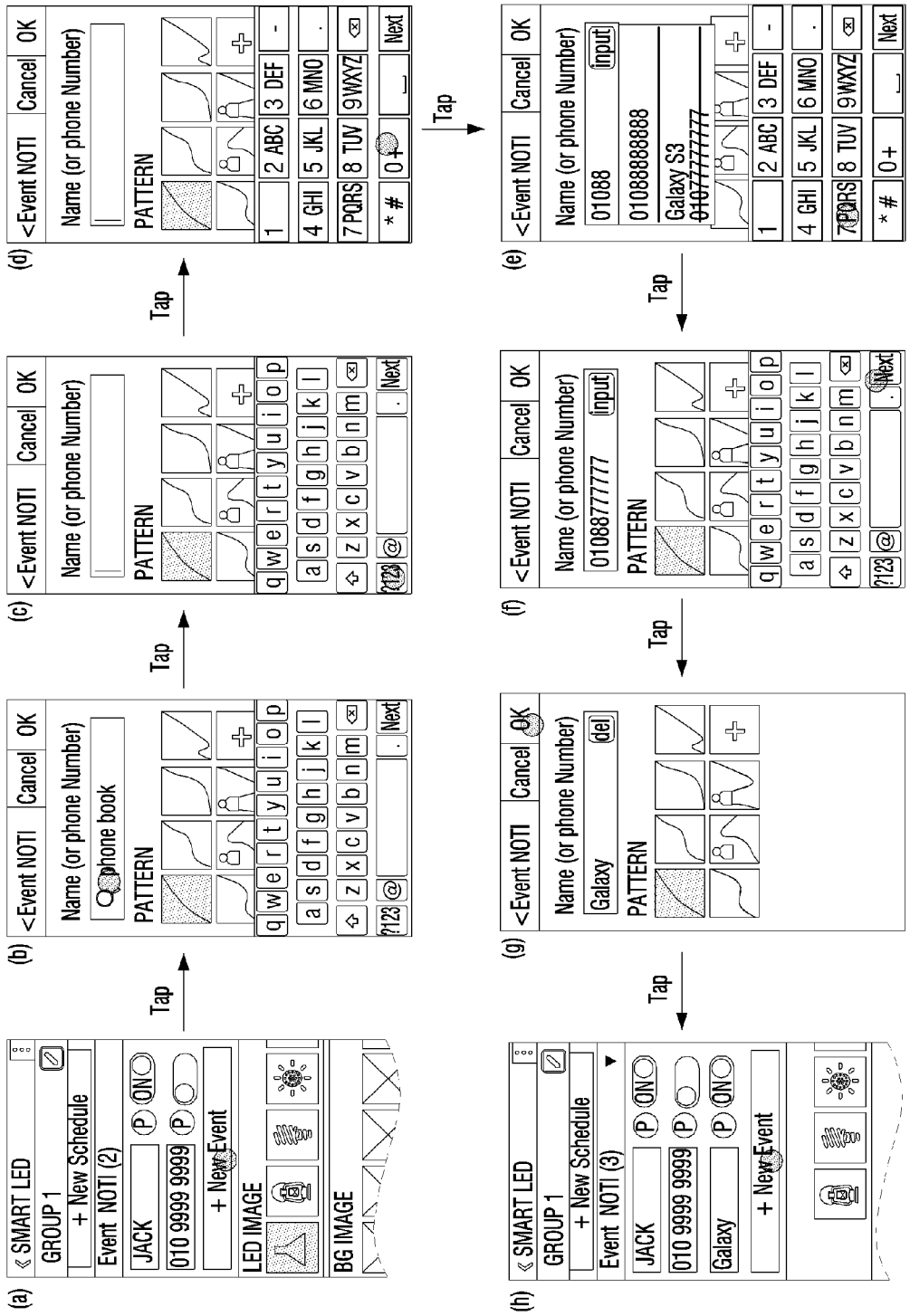
Figure 71:
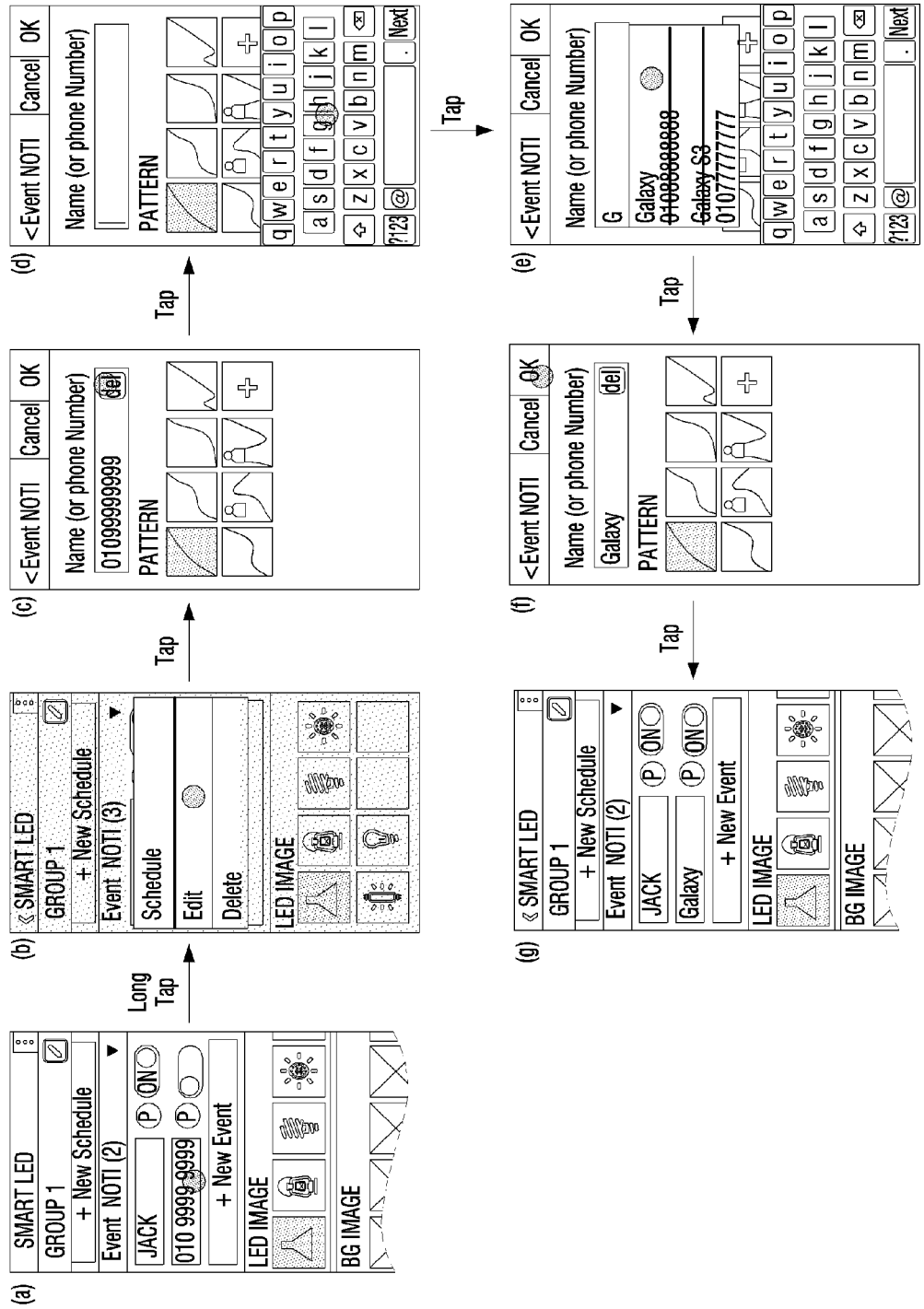
Figure 72:
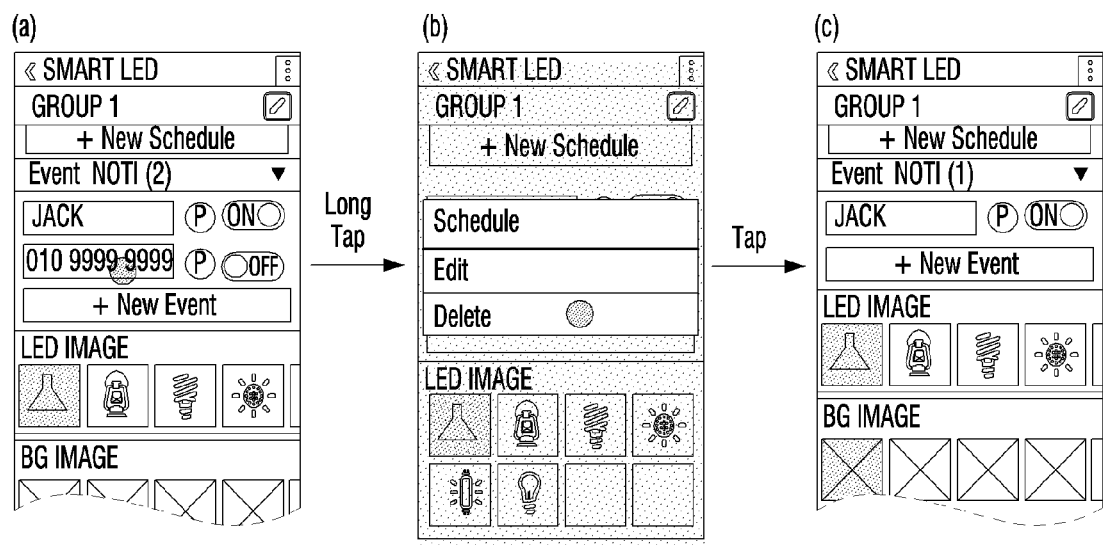

FIG. 63 is a view which illustrates selecting and/or releasing a mode. The mode may be a sleep mode, etc., as shown above in Table 4 of FIGS. 94A and 94B. FIG. 64 illustrates selecting and/or releasing a schedule, and FIG. 65 illustrates a schedule addition screen. As shown in view (a) of FIG. 65, when there is no schedule, a schedule title area does not have folding/unfolding functions. Conversely, as shown in view (h) of FIG. 65, in response to a new schedule being added, the title area generates the folding/unfolding functions. FIG. 66 is a screen illustrating a schedule editing process, and FIG. 67 illustrates a schedule deleting process. FIG. 68 is a screen illustrating selecting and/or releasing an event notice, and, in response to an event notice being set, an event setting icon is generated in an extension view indicator area as shown in view (d) of FIG. 68. In this case, an event notice may be added by using a list of phone numbers as shown in FIG. 69. In addition, an event notice may be added by directly inputting a phone number as shown in FIG. 70. FIG. 71 illustrates a process for correcting the event notice. FIG. 72 illustrates deleting an event notice.

Figure 73:
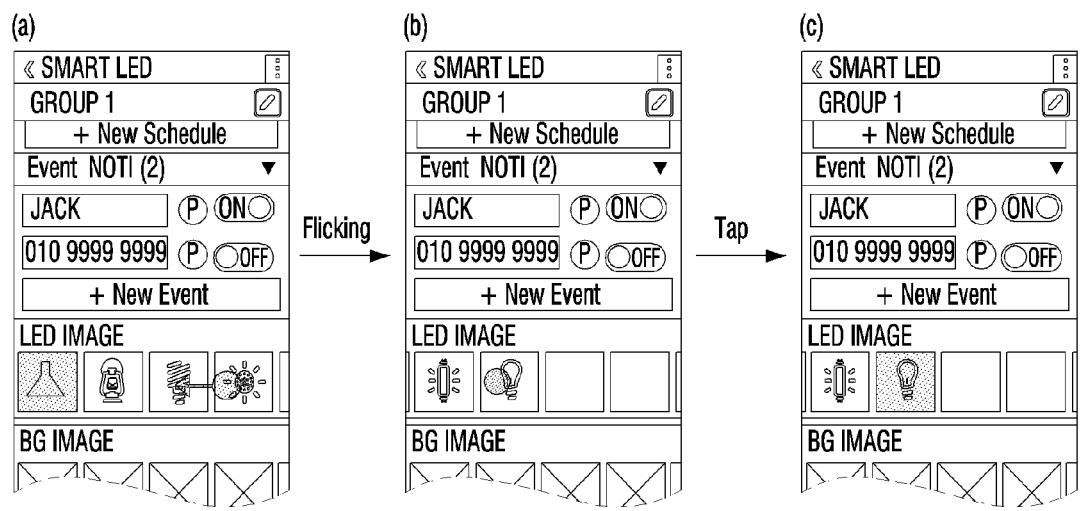
Figure 74:
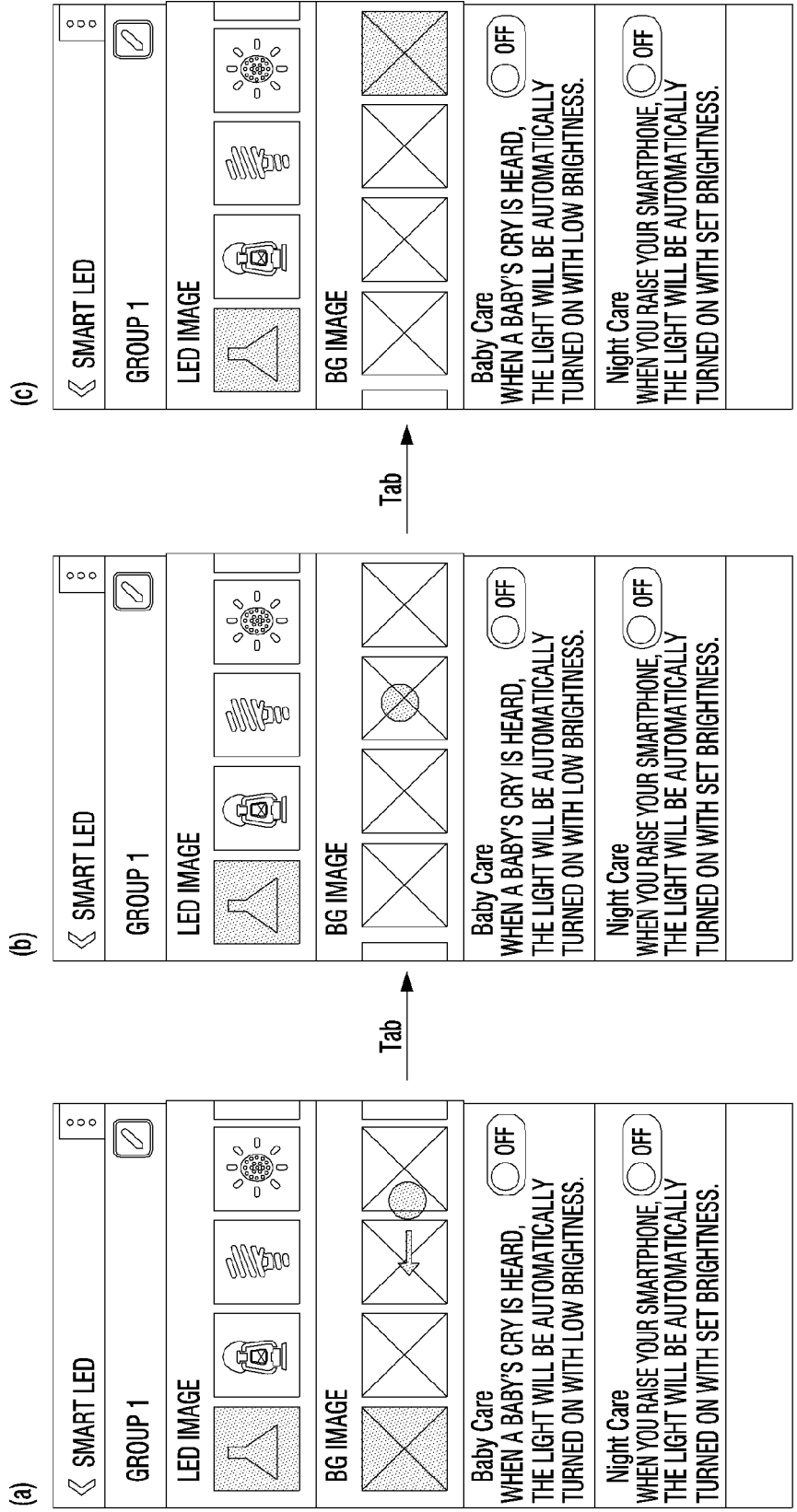
Figure 75:
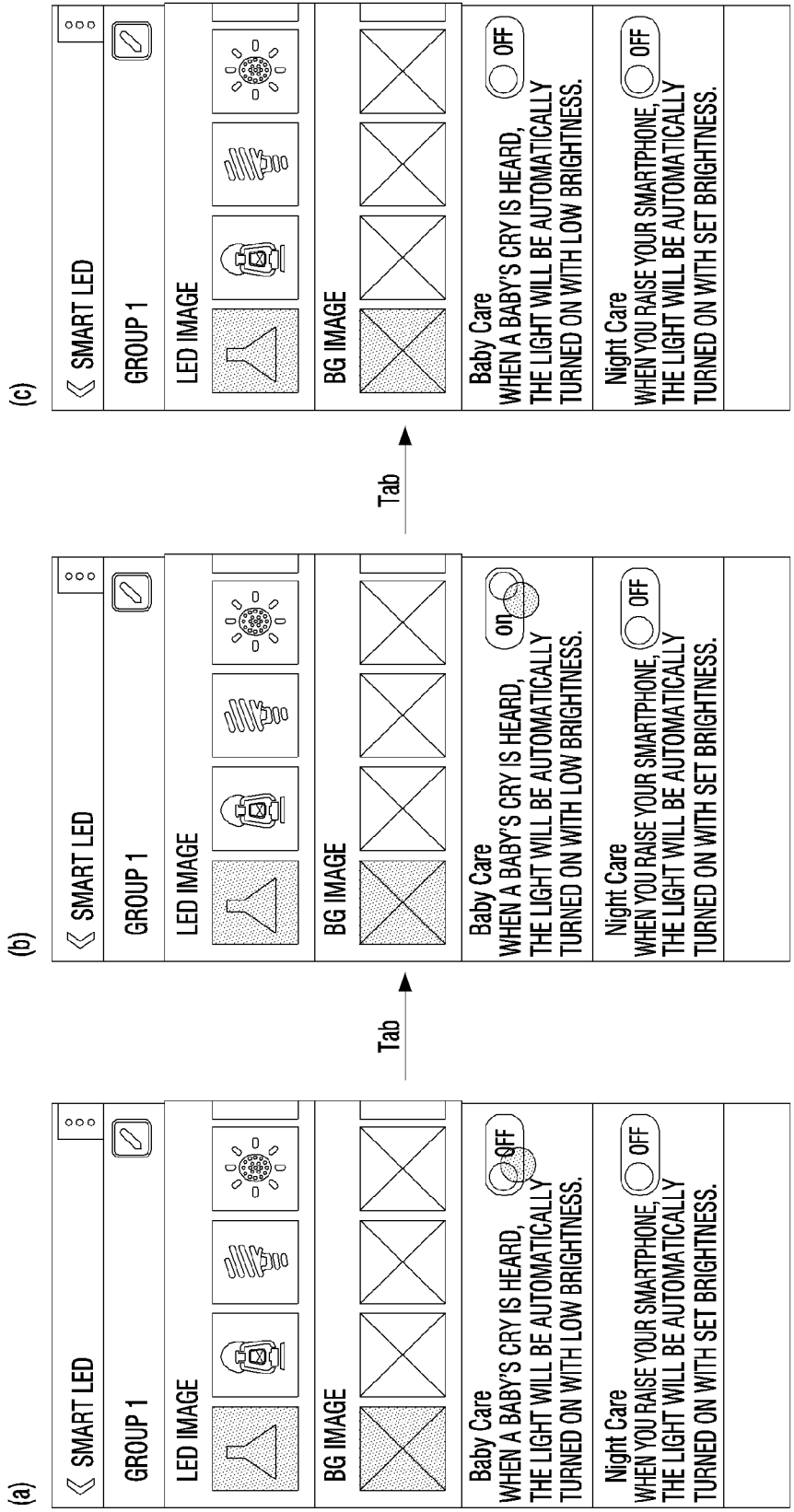
Figure 76:
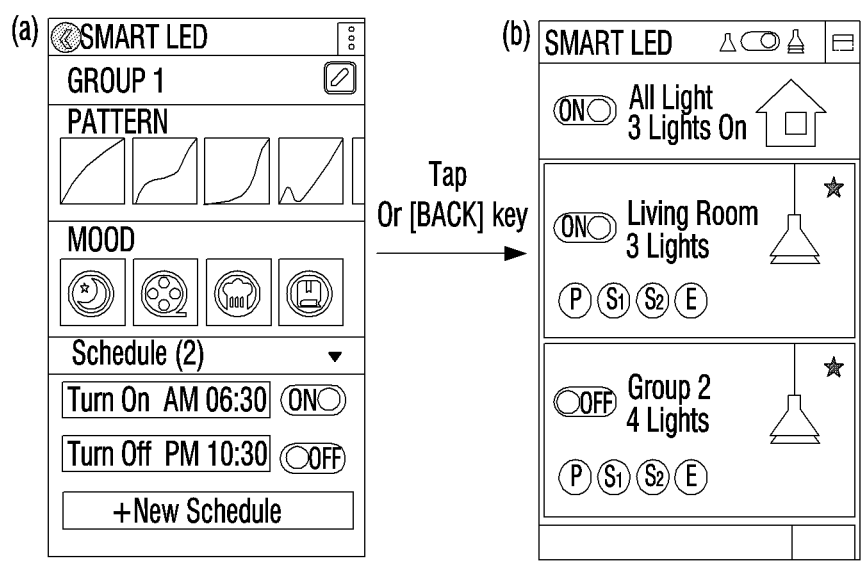

FIG. 73 illustrates a process for selecting an LED image, and FIG. 74 illustrates a process for selecting a BG image. FIG. 75 illustrates selecting and/or releasing a baby/night care. The baby care refers to setting a light to be automatically turned on with low brightness in response to a baby's cry being heard. The night care refers to a function of automatically turning on a light with set brightness in response to the user raising a user's smartphone. In response to details setting being stored as shown in FIG. 76, a previous screen is restored, as shown in view (b) of FIG. 76.

FIGS. 77 to 85 illustrate screens related to a landscape view.

Figure 77:
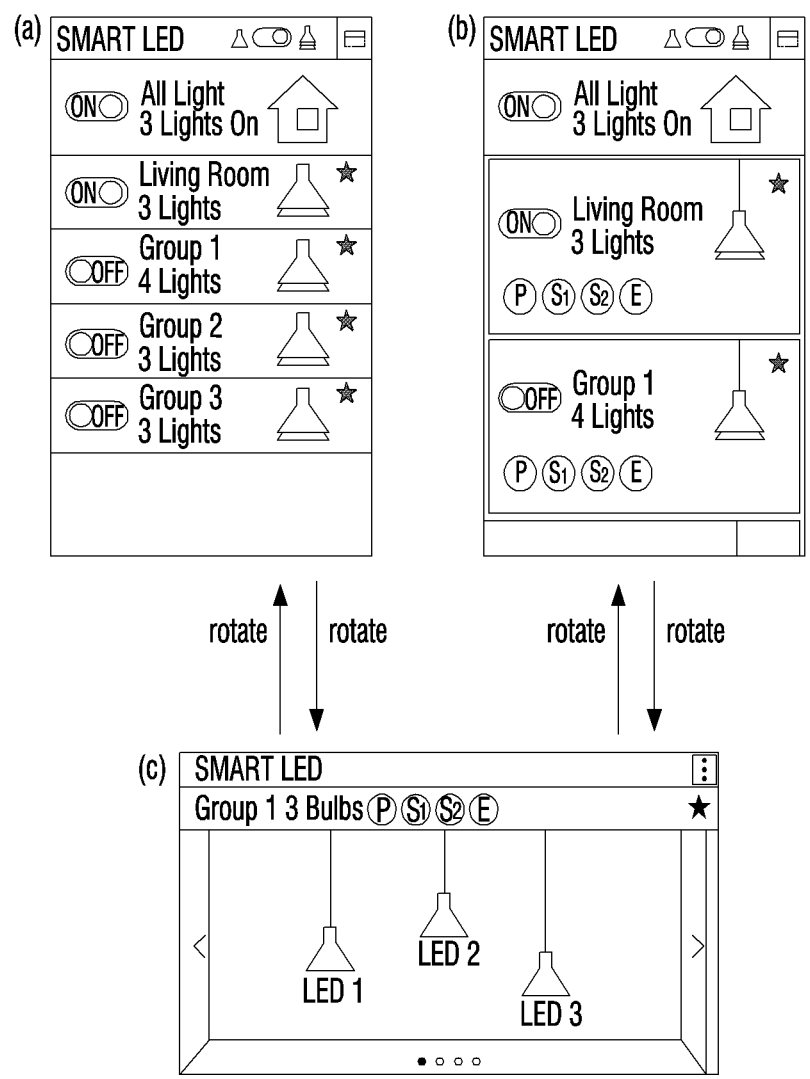
Figure 78:
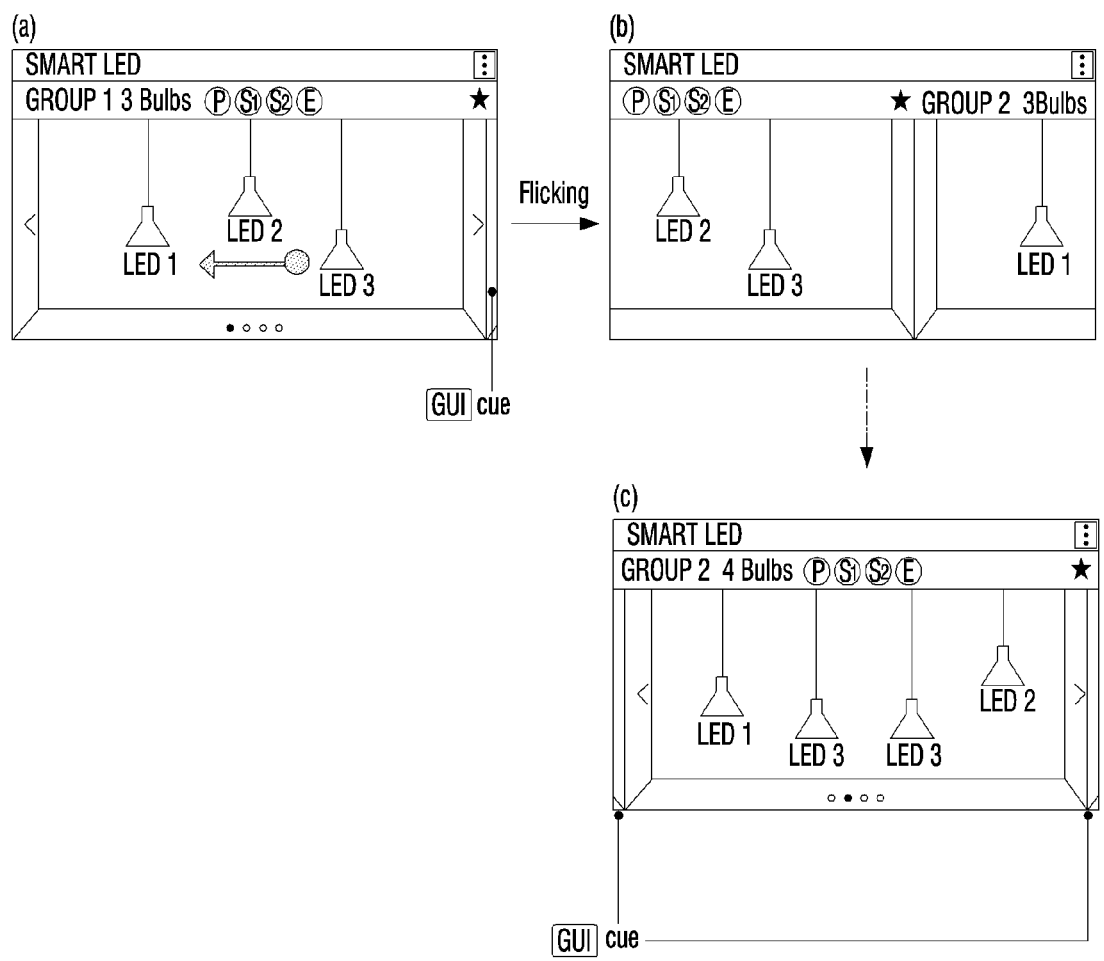
Figure 79:
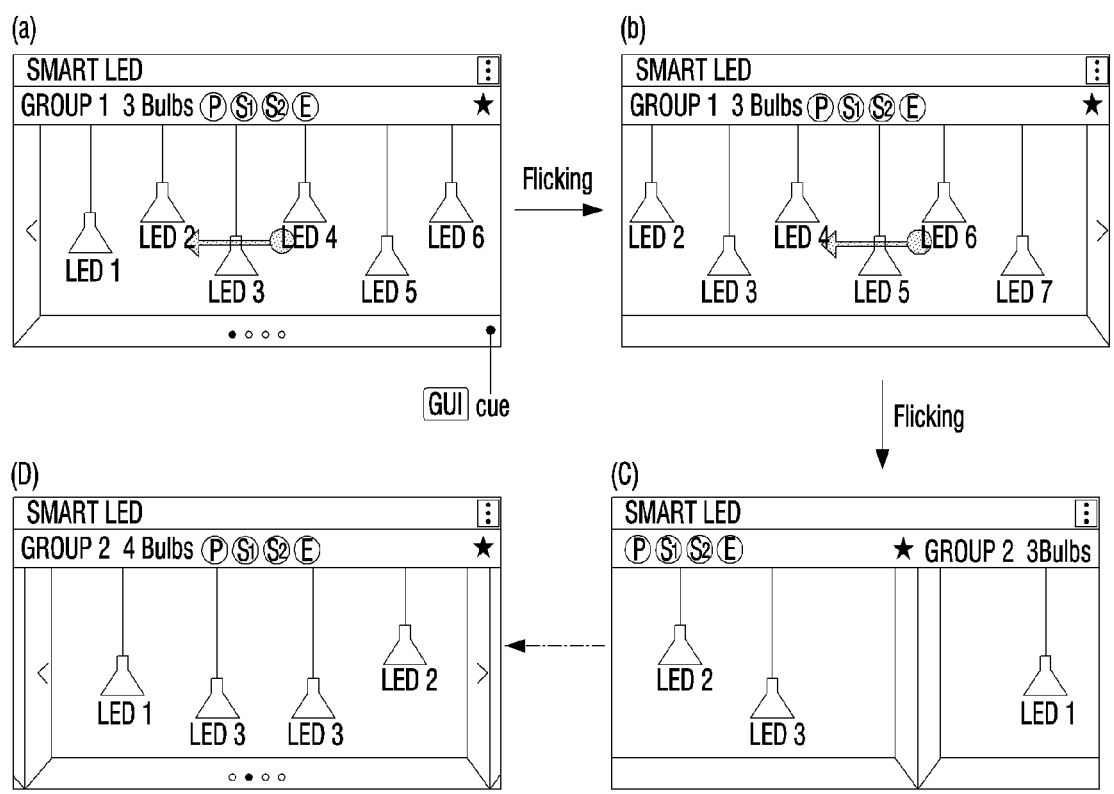
Figure 80:
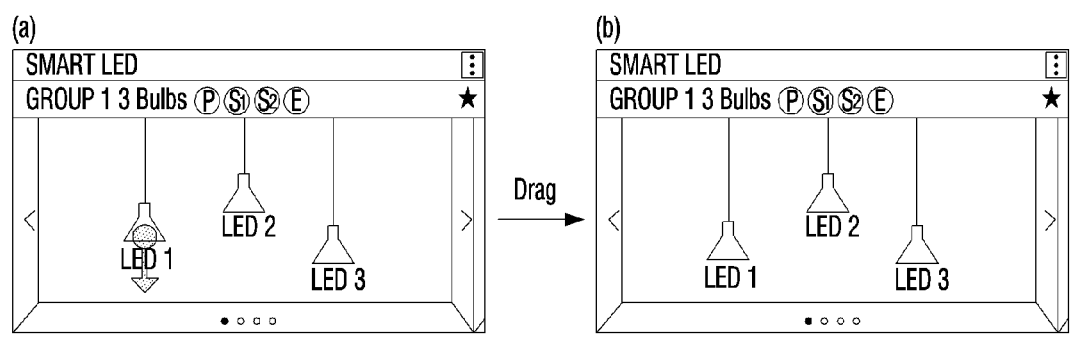
Figure 81:
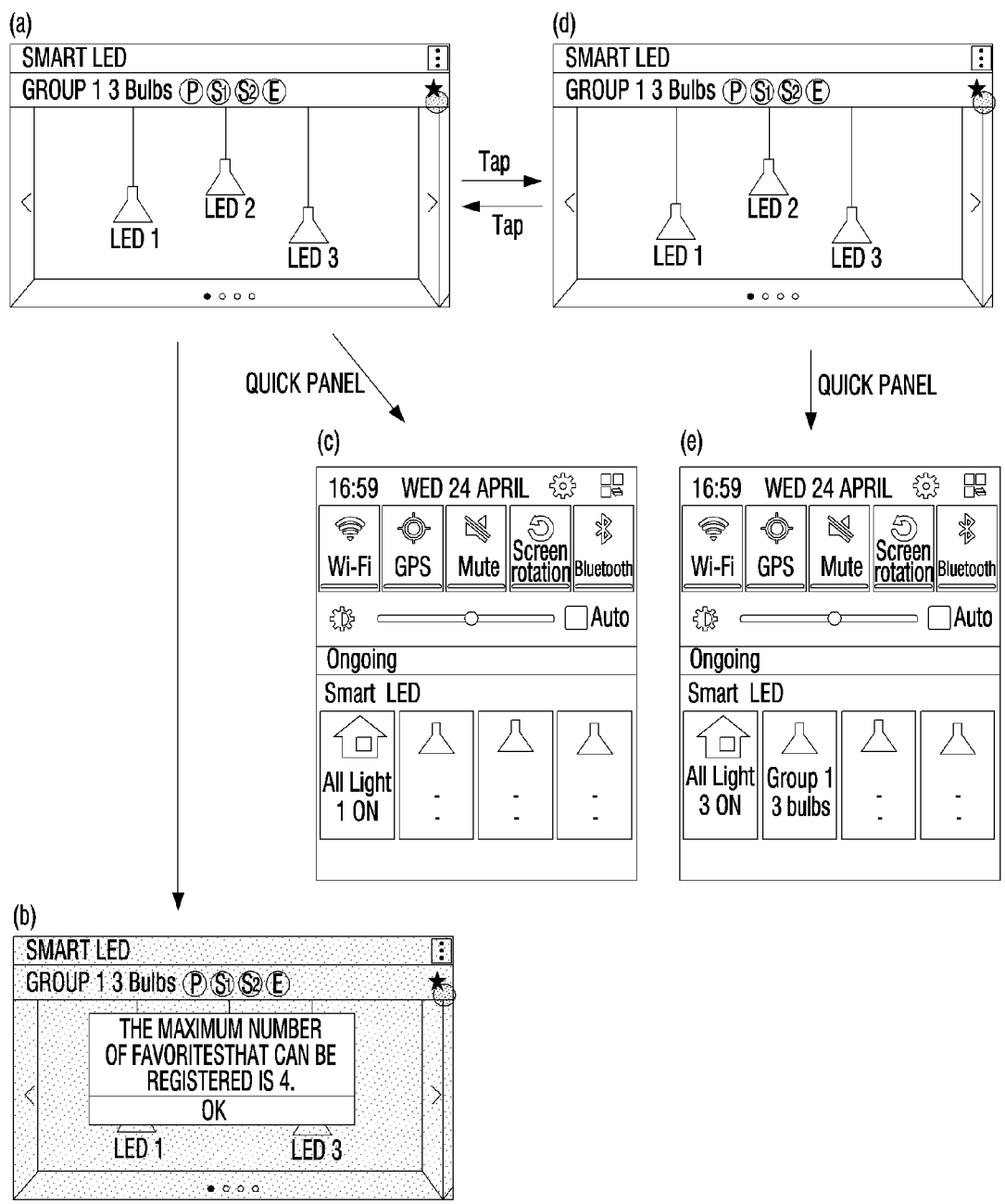
Figure 82:
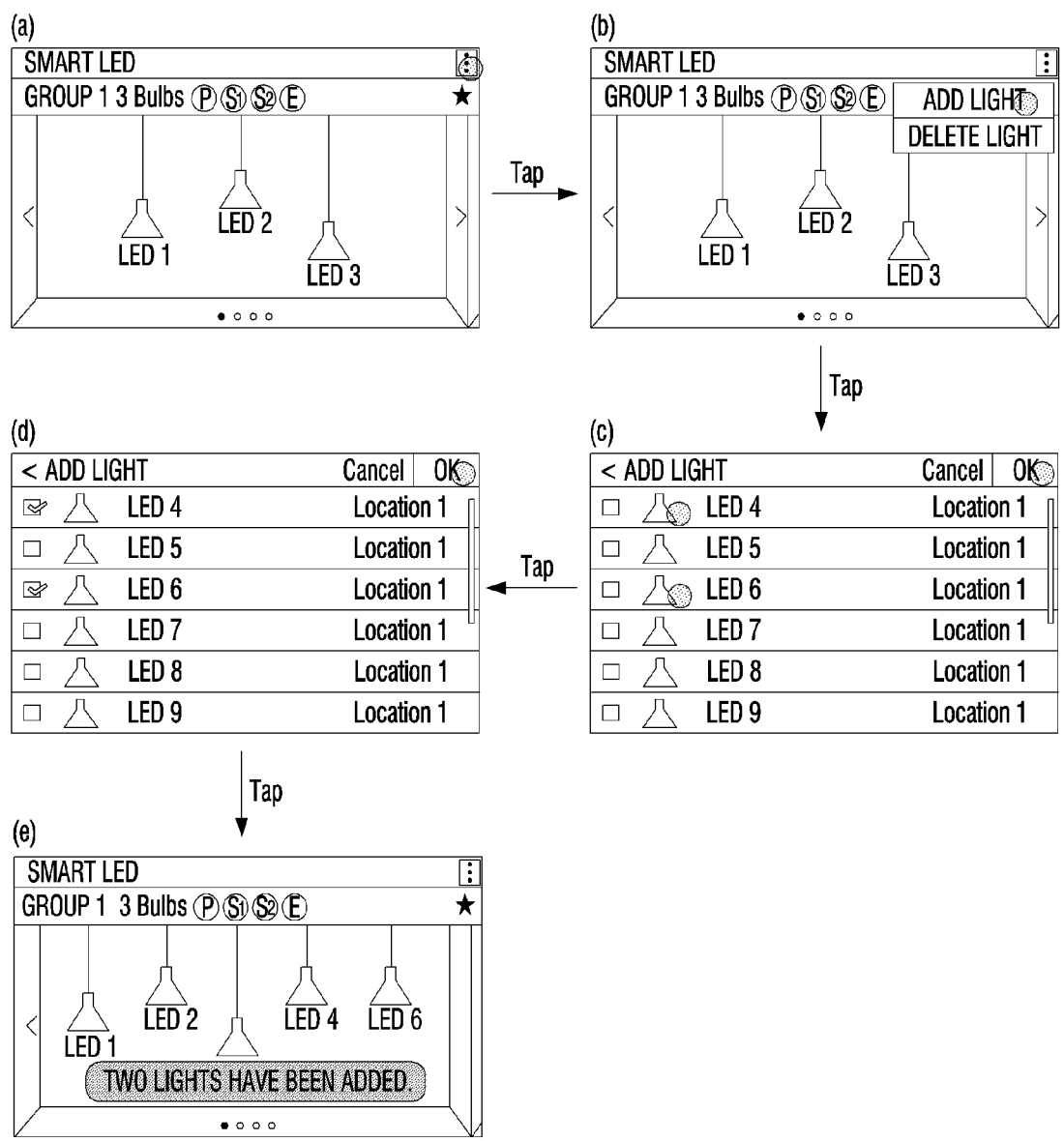
Figure 83:
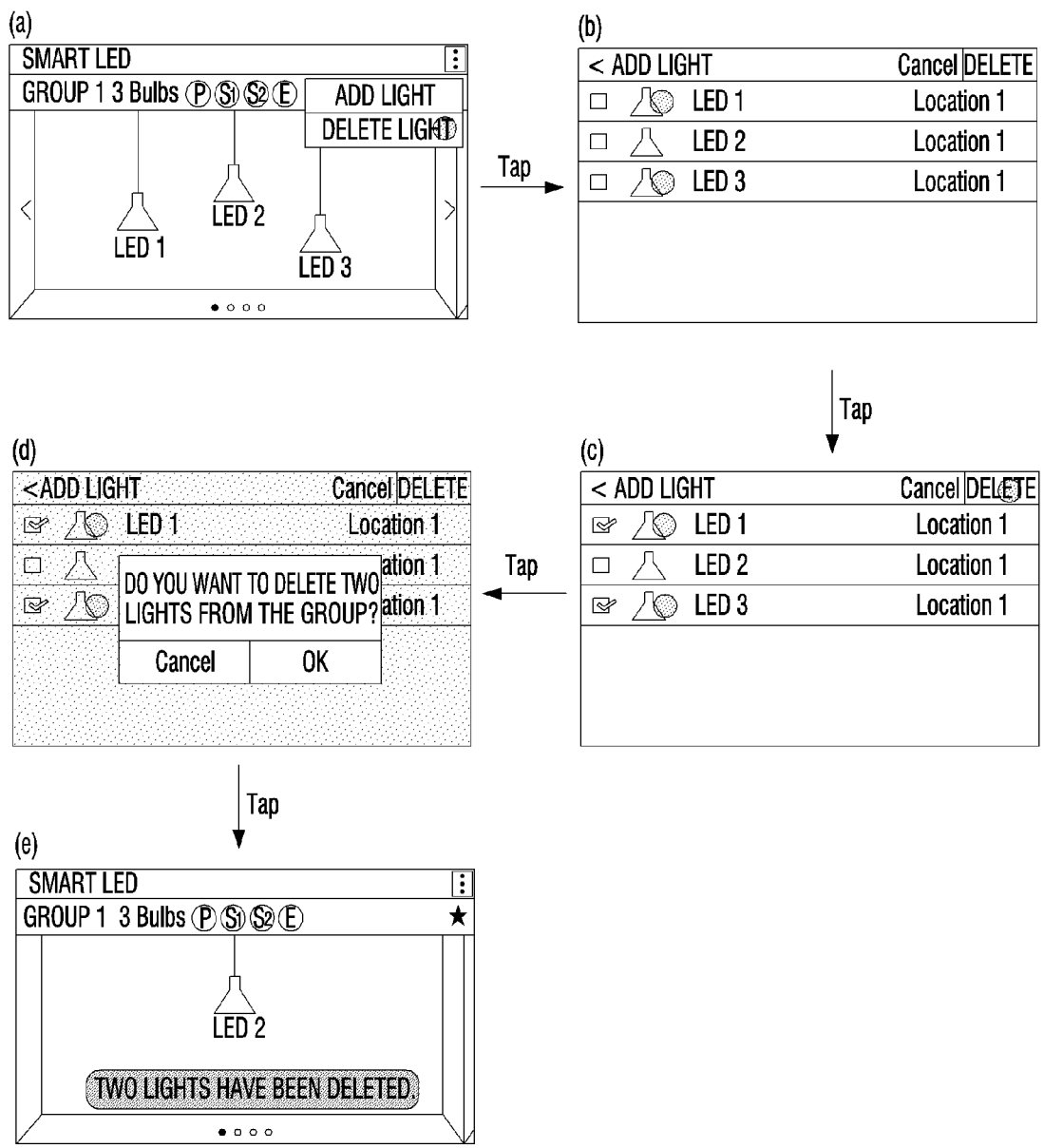
Figure 84:
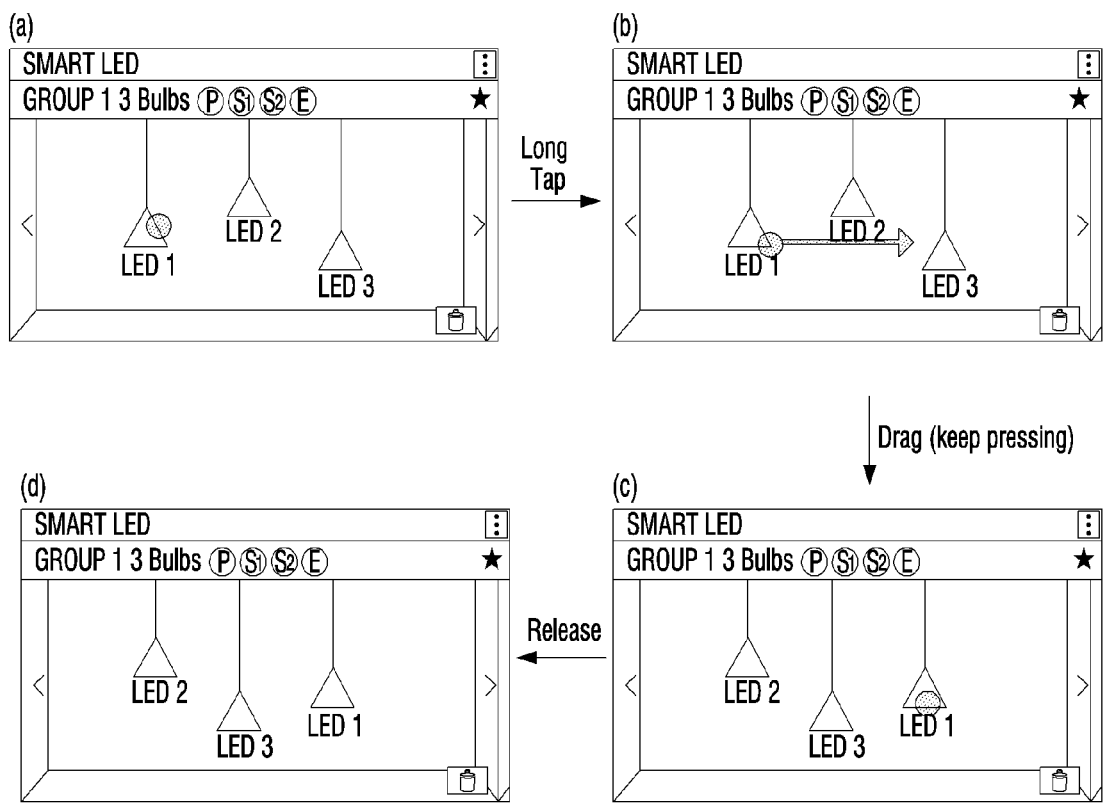
Figure 85:
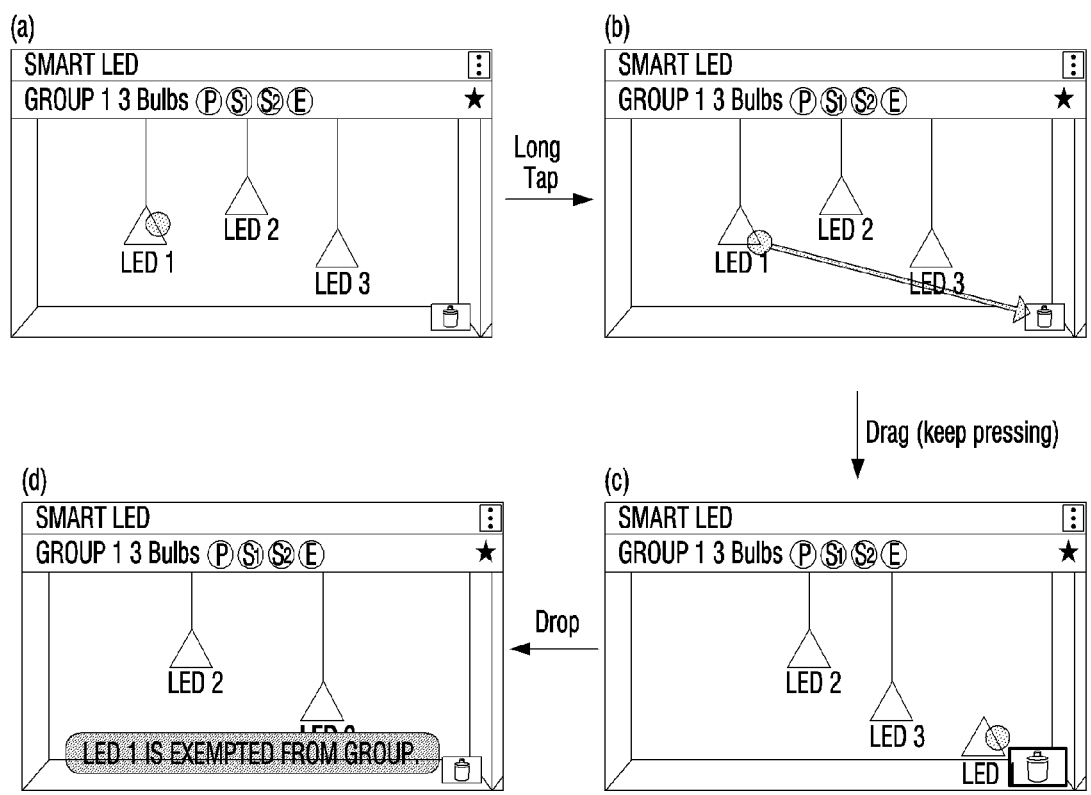

FIG. 77 shows an entry into a landscape view. In response to the screen being rotated in a portrait view shown in views (a) and (b) of FIG. 77, the screen enters the landscape view. In response to the screen being rotated again, the screen returns to its original status. FIG. 78 is a screen which illustrates moving to another room. In views (a) and (c) of FIG. 78, a cue informing that there are different rooms on the left and right is shown. FIG. 79 is a screen which illustrates moving to another room. In the case of a group which has more than the maximum number of LEDs in one page, a cue informing that there is still another room on the left is displayed on a lower end as shown in view (a) of FIG. 79. FIG. 80 illustrates a process for setting dimming in a landscape view. As shown in view (a) of FIG. 80, dimming may be reduced by adjusting LED 1. FIG. 81 is a screen which illustrates adding and/or deleting favorites. When four favorites have been already registered, a pop-up window may be displayed as shown in view (b) of FIG. 81. FIGS. 82 and 83 illustrate a light management screen and adding and/or deleting a light. As shown in view (e) of FIG. 82, in response to a light being added, a group may be set to have an average dimming value and may be added. FIG. 84 illustrates a location movement of an LED in response to a long tapping operation. In view (a) of FIG. 84, in response to the LED 1 being tapped for a relatively long time, the LED 1 is in a movable status. Accordingly, the LED 1 moves to a location desired by the user, and other LEDs are pushed and moved as shown in view (c) of FIG. 84. FIG. 85 is a screen for deleting an LED in response to a long tapping operation. When the LED 1 is in the movable status as shown in view (b) of FIG. 85, the LED 1 may be deleted by being dragged to a deletion button. In this case, the deletion button may be visually different, or a color and/or a size may be changed, as shown in view (c) of FIG. 85. In this case, other LEDs are pushed and moved as shown in view (d) of FIG. 85.

Figure 86:
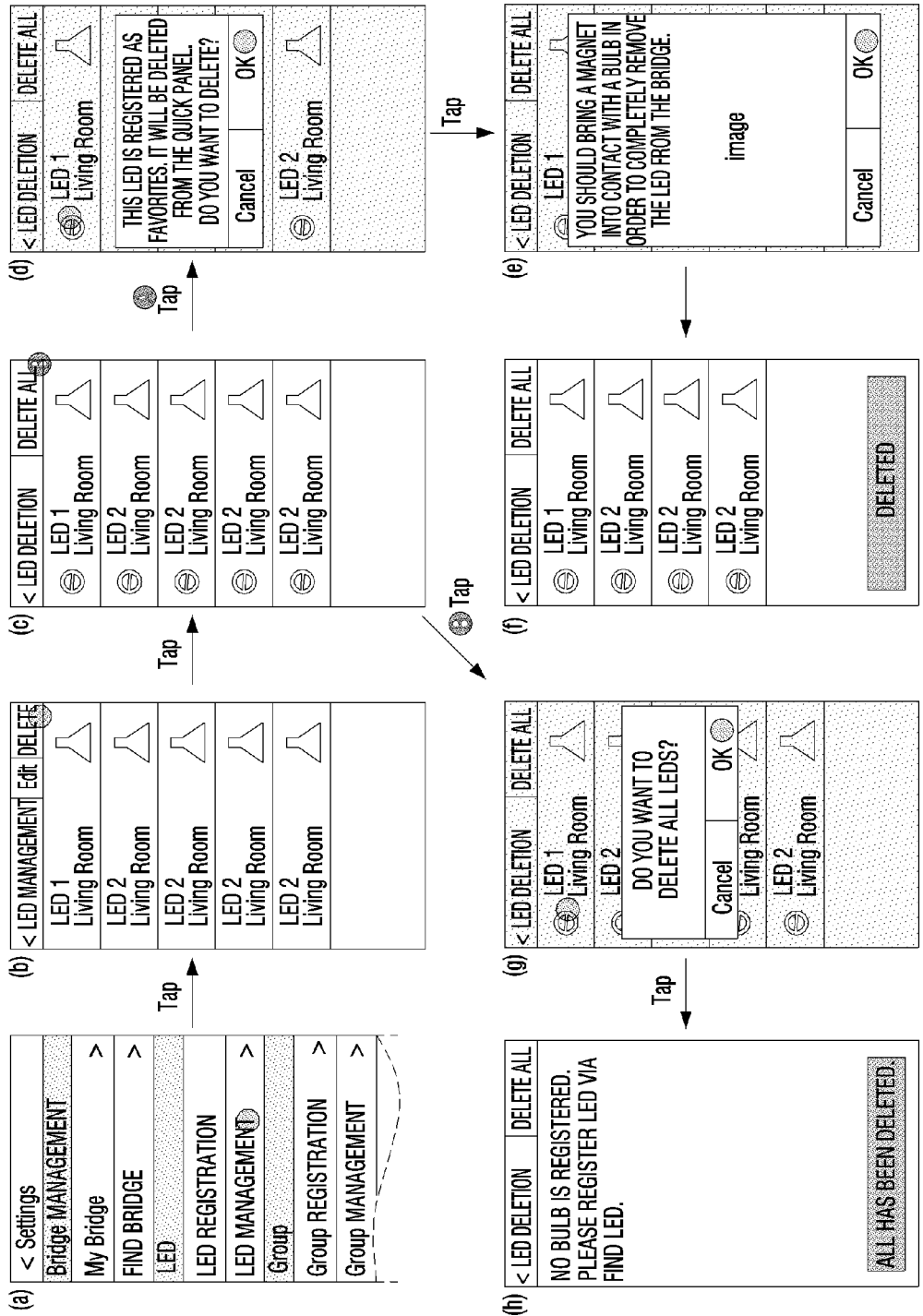
Figure 87A:
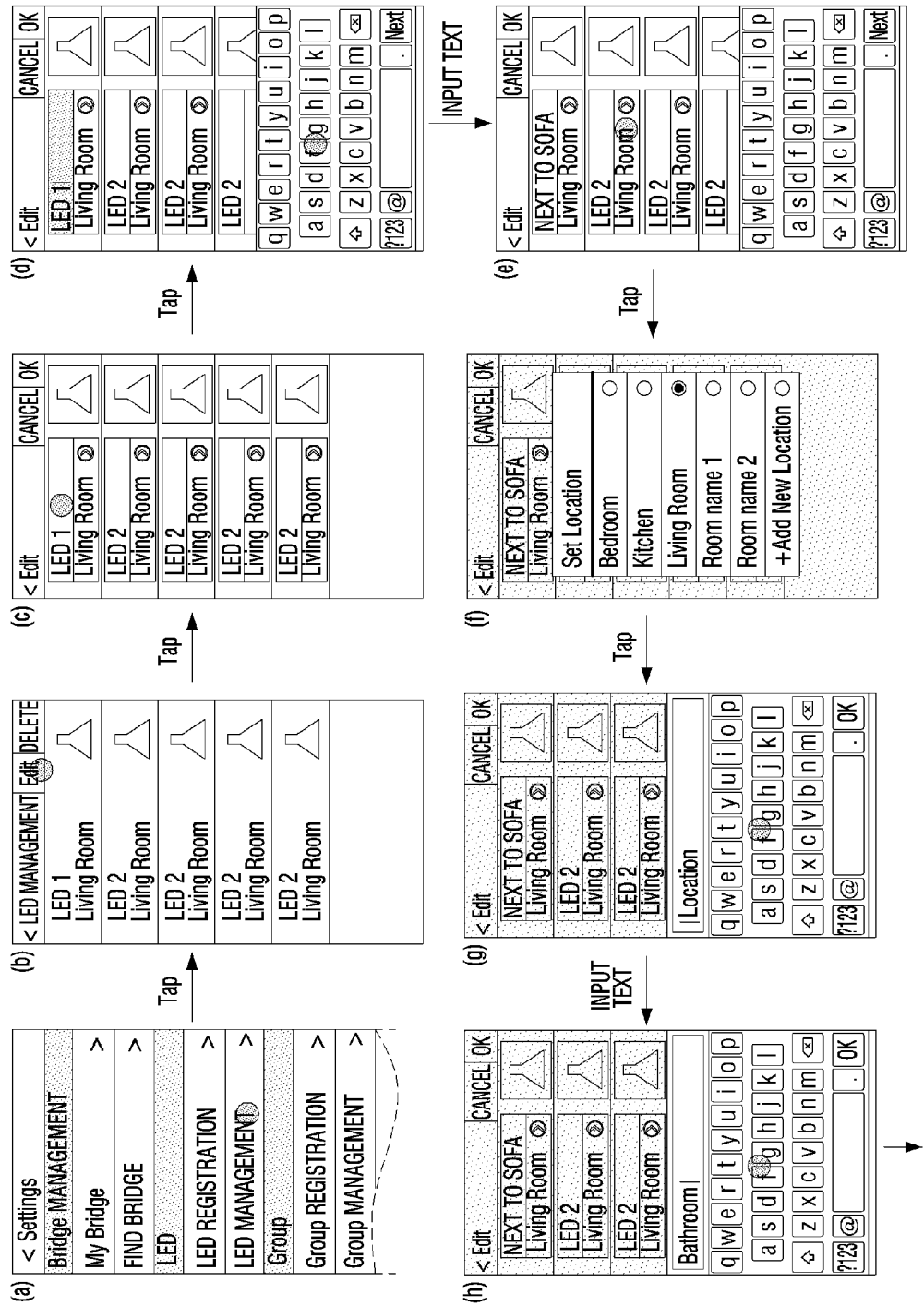
Figure 87B:
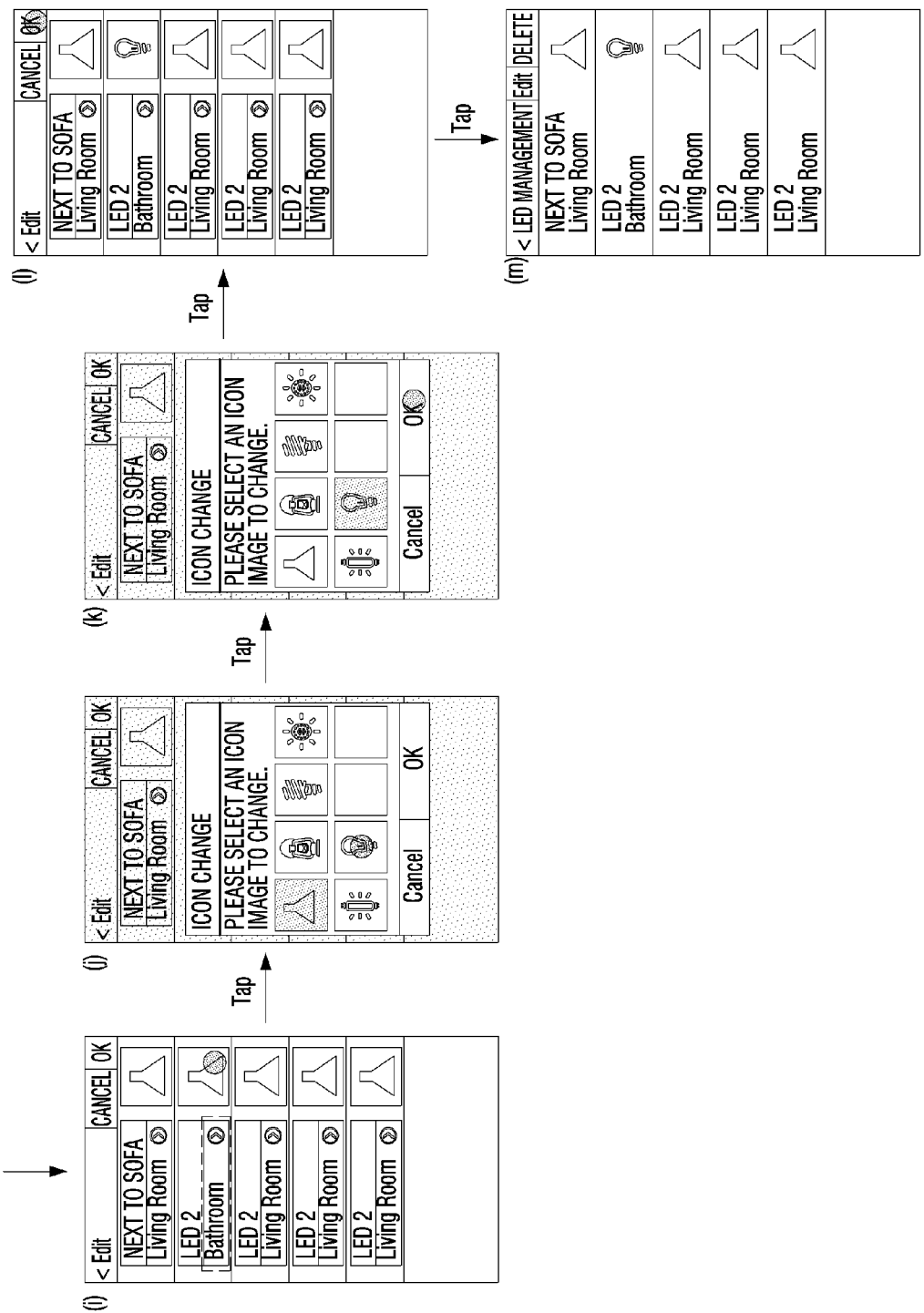

FIGS. 86, 87A, and 87B are setting screens and illustrate deleting and editing an LED.

The deleting process is performed by selecting a deletion item in view (b) of FIG. 86, and pop-up windows related to the LED deletion may be displayed during this process. In response to a place being input as shown in view (e) of FIG. 87A while the LED is edited as shown in FIG. 87B, an already-registered place may be provided in a pop-up window form. In view (f) of FIG. 87A, [+Add New Location] is displayed on a lowermost end.

Figure 88:
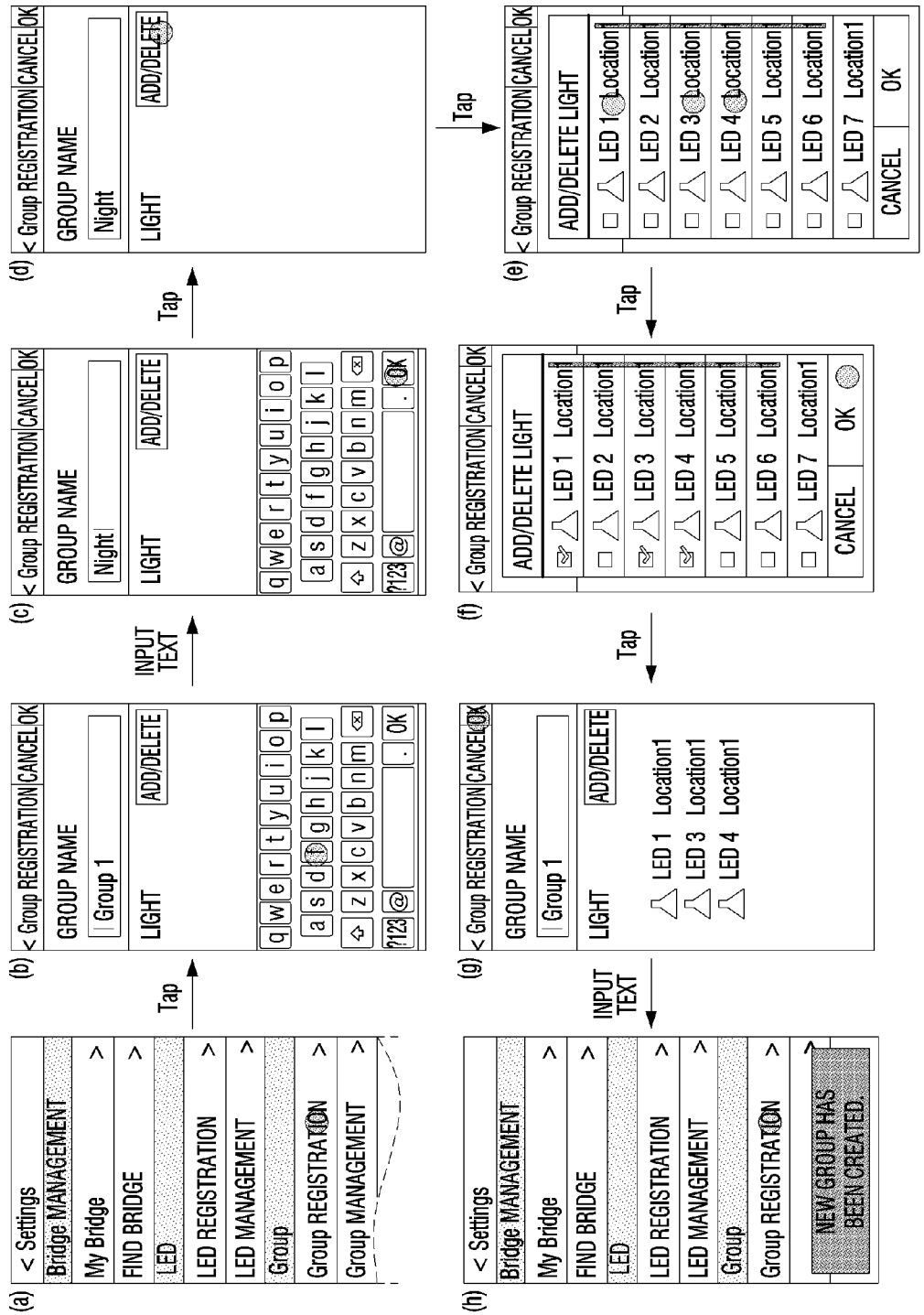
Figure 89:
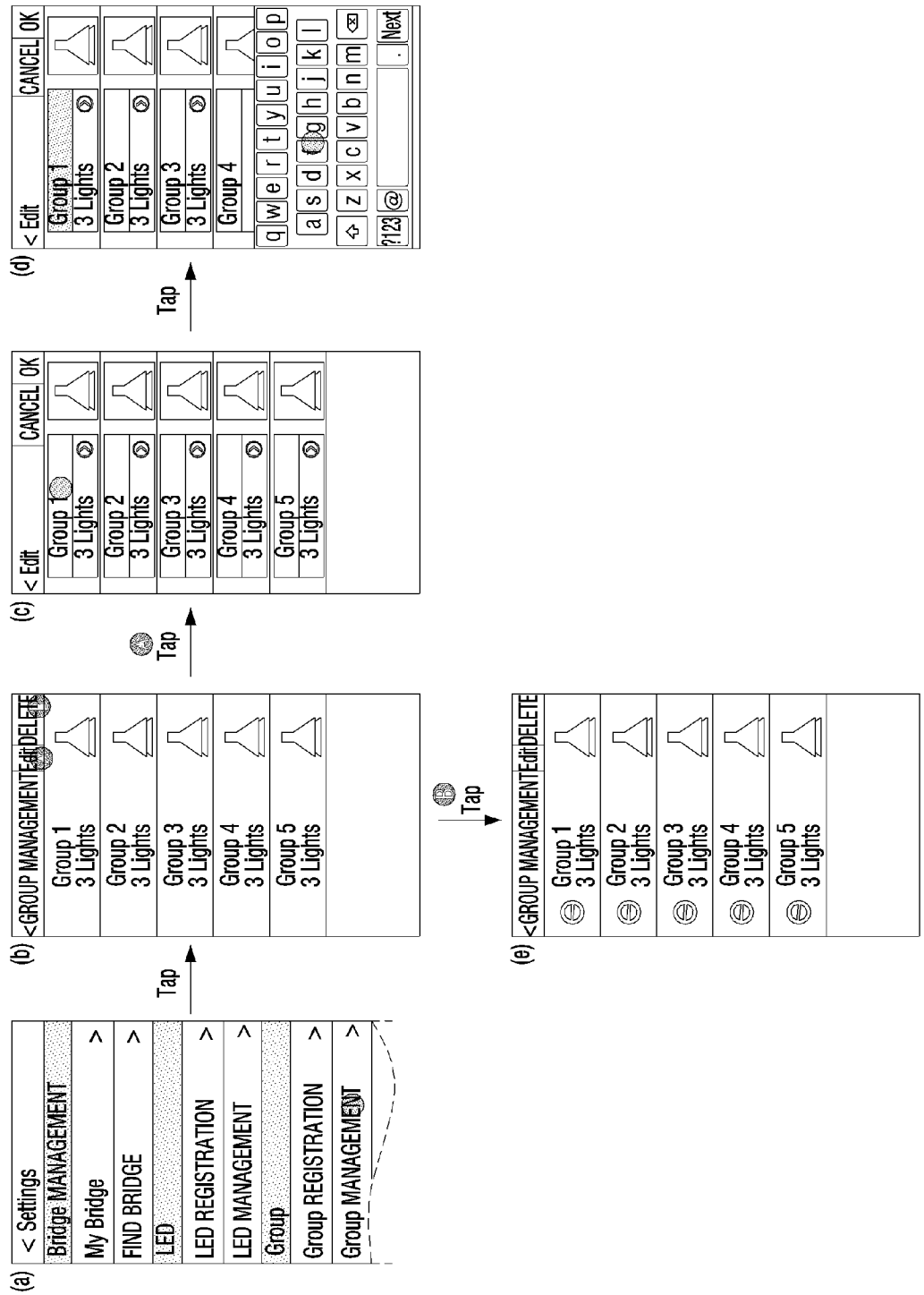

FIGS. 88, 89, and 90 illustrate screens related to group registration and management. The light may be added and/or deleted by the process shown in FIGS. 88 and 89, and the group icon may be changed as shown in FIG. 90.

Although it is described above that all elements of the exemplary embodiments are combined into a single element or operate in combination with one another, the present disclosure is not limited to those exemplary embodiments. In particular, one or more elements may be selectively combined and operate provided that the one or more elements are within the scope of the present disclosure. In addition, although each of the elements may be implemented as a single independent hardware component, some or all of the elements may be selectively combined and may be implemented as a computer program having a program module for performing some or all of functions combined in one or a plurality of hardware components. Codes and code segments constituting the computer program can be easily inferred by an ordinary skilled person in the art. Such a computer program may be stored in a non-transitory computer readable medium, and may be read and executed by a computer, so that the exemplary embodiments can be implemented.

The non-transitory computer readable medium refers to a medium that stores data semi-permanently rather than storing data for a very short time, such as a register, a cache, and a memory, and is readable by an apparatus. Specifically, the above-described programs may be stored in a non-transitory computer readable medium, such as, for example, any one or more of a compact disc (CD), a digital versatile disk (DVD), a hard disk, a Blu-ray disk, a universal serial bus (USB), a memory card, and a read only memory (ROM), and may be provided.

The foregoing exemplary embodiments and advantages are merely exemplary and are not to be construed as limiting the present inventive concept. The exemplary embodiments can be readily applied with respect to other types of apparatuses. In addition, the description of the exemplary embodiments is intended to be illustrative, and not to limit the scope of the claims, and many alternatives, modifications, and variations will be apparent to those skilled in the art.

What is claimed is:
1. A user terminal comprising:
a communication interface configured to communicate with each of a plurality of controlled devices which are operated based on respective individually set setting values;
a user interface configured to receive an adjustment value for controlling the plurality of controlled devices; and
a controller configured to adjust each of the setting values based on a ratio which relates to the received adjustment value, and to control the plurality of controlled devices based on the adjusted setting values,
wherein the controller is further configured to change the ratio based on a result of sensing a respective environmental quality of each of the controlled devices, so that different ratios are used to adjust each of the setting values.

2. The user terminal of claim 1, wherein the controller is further configured to calculate an average value based on the setting values, to calculate at least one from among a ratio of the received adjustment value to the calculated average value and a ratio of the received adjustment value to a value which is obtainable by subtracting the calculated average value from a maximum setting value, and to individually adjust each of the setting values based on the calculated at least one ratio.

3. The user terminal of claim 2, wherein the user interface is further configured to display a user interface (UI) window which displays the plurality of controlled devices as a group and displays a collective control object which is usable for collectively controlling operations of the controlled devices, and wherein, when the displayed collective control object is adjusted by a user manipulation, the controller is further configured to determine the adjustment value based on an adjustment status of the collective control object.

4. The user terminal of claim 3, wherein the UI window additionally displays an individual control object which is usable for individually controlling one device from among the plurality of controlled devices, and wherein, when a lock is set for the displayed individual control object, the controller is further configured to not adjust the setting value of the one device which corresponds to the individual control object for which the lock is set.

5. The user terminal of claim 4, wherein, when the collective control object is adjusted to a minimum, the controller is further configured to adjust each of the setting values to a respective minimum, and when the collective control object is adjusted to a maximum, the controller is further configured to adjust each of the setting values to a respective maximum, and wherein, when a user reset request is received, the controller is further configured to reset each of the setting values which have been adjusted to at least one from among the respective minimum and the respective maximum to the corresponding setting values which had been set prior to being adjusted.

6. The user terminal of claim 1, wherein when each of the setting values has a same value, the controller is further configured to adjust each of the setting values based on an absolute value of the adjustment value.

7. The user terminal of claim 1, wherein each one of the plurality of controlled devices comprises at least one from among a lighting device, a sound device, a blind device, and a temperature control device, and wherein each of the setting values comprises at least one from among a target dimming value, a target volume, a blind adjustment status, and a target temperature.

8. A control device comprising:
a communication interface configured to communicate with each of a plurality of controlled devices which are operated based on respective individually set setting values, and with a user terminal; and
a controller configured to, when an adjustment value for controlling the plurality of controlled devices is received from the user terminal, adjust each of the setting values based on a ratio which relates to the received adjustment value, and to control the plurality of controlled devices based on the adjusted setting values,
wherein the controller is further configured to change the ratio based on a result of sensing a respective environmental quality of each of the controlled devices, so that different ratios are used to adjust each of the setting values.

9. The control device of claim 8, wherein the controller is further configured to calculate an average value based on the setting values, to calculate at least one from among a ratio of the received adjustment value to the calculated average value and a ratio of the received adjustment value to a value which is obtainable by subtracting the calculated average value from a maximum setting value, and to individually adjust each of the setting values based on the calculated at least one ratio.

10. The control device of claim 9, wherein the user terminal is configured to display a user interface (UI) window which displays the plurality of controlled devices as a group and displays a collective control object which is usable for collectively controlling operations of the controlled devices, and wherein, in response to the displayed collective control object being adjusted by a user manipulation, the controller is further configured to determine the adjustment value based on an adjustment status of the collective control object.

11. The control device of claim 10, wherein the UI window additionally displays an individual control object which is usable for individually controlling one device from among the plurality of controlled devices, and wherein, in response to a lock being set for the displayed individual control object, the controller is further configured to not adjust the setting value of the one device which corresponds to the individual control object for which the lock is set.

12. The control device of claim 11, wherein, in response to the collective control object being adjusted to a minimum by the user manipulation, the controller is further configured to adjust each of the setting values to a respective minimum, and in response to the collective control object being adjusted to a maximum by the user manipulation, the controller is further configured to adjust each of the setting values to a respective maximum, and wherein, in response to a user reset request, the controller is further configured to reset each of the setting values which have been adjusted to at least one from among the respective minimum and the respective maximum to the corresponding setting values which had been set prior to being adjusted.

13. The control device of claim 8, wherein, in response to each of the setting values having a same value, the controller is further configured to adjust each of the setting values based on an absolute value of the adjustment value.

14. The control device of claim 8, wherein each one of the plurality of controlled devices comprises at least one from among a lighting device, a sound device, a blind device, and a temperature control device, and wherein each of the setting values comprises at least one from among a target dimming value, a target volume, a blind adjustment status, and a target temperature.

15. A driving method which is executable by a user terminal for controlling a plurality of controlled devices which are set, the method comprising:
displaying an individual control object via which respective setting values for each of the plurality of controlled devices are individually set;
displaying a collective control object which indicates an average value of the respective setting values of the plurality of controlled devices; and when the displayed collective control object is adjusted based on an adjustment value which is received by the user terminal, adjusting the displayed individual control object based on an adjustment ratio which relates to the collective control object, wherein the adjusting the displayed individual control object further comprises changing the adjustment ratio based on a result of sensing a respective environmental quality of each of the controlled devices, so that different adjustment ratios are used to adjust each of the setting values.

16. The method of claim 15, wherein the adjustment ratio includes at least one from among a ratio of the adjustment value to an average value which is calculated based on the respective setting values and a ratio of the adjustment value to a value which is obtainable by subtracting the calculated average value from a maximum setting value.

17. The method of claim 15, wherein the adjusting the individual control object comprises, in response to each of the respective setting values of the plurality of controlled devices having a same value, adjusting the individual control object based on an absolute value of the adjustment value.

18. The method of claim 15, further comprising setting a lock for the individual control object, and wherein the adjusting the individual control object comprises refraining from adjusting the individual control object for which the lock is set.

19. A driving method which is executable by a control device for controlling a plurality of controlled devices, the method comprising:

receiving, from a user terminal, an adjustment value for controlling the plurality of controlled devices;

adjusting each of a plurality of setting values which are individually set for a respective one of the plurality of controlled devices based on a ratio which relates to the received adjustment value; and controlling the plurality of controlled devices based on the adjusted setting values, wherein the adjusting comprises changing the ratio based on a result of sensing a respective environmental quality of each of the controlled devices, so that different ratios are used to adjust each of the setting values.

20. The method of claim 19, wherein the adjusting comprises calculating an average value based on the plurality of setting values, calculating at least one from among a ratio of the received adjustment value to the calculated average value and a ratio of the received adjustment value to a value which is obtainable by subtracting the calculated average value from a maximum setting value, and individually adjusting each of the plurality of setting values based on the calculated at least one ratio.

21. The method of claim 19, further comprising, in response to the adjustment value being received from the user terminal, determining whether each of the plurality of setting values has a same value, wherein the controlling the plurality of controlled devices comprises, in response to a determination that each of the plurality of setting values has a same value, adjusting each of the plurality of setting values based on an absolute value of the received adjustment value.

22. A control system of a first controlled device, comprising:

a plurality of controlled devices configured to operate based on individually set setting values; and a controller configured to, when an adjustment value for controlling the plurality of collected devices is received from a user terminal, adjust each of the setting values based on a ratio which relates to the received adjustment value, and to control the plurality of controlled devices based on the adjusted setting values, wherein the controller is further configured to change the ratio based on a result of sensing a respective environmental quality of each of the controlled devices, so that different ratios are used to adjust each of the setting values.

* * * * *